United States Patent
Sasa

(10) Patent No.: US 12,236,461 B2
(45) Date of Patent: Feb. 25, 2025

(54) MATCHING SUPPORT DEVICE, MATCHING SUPPORT SYSTEM, AND PROGRAM

(71) Applicant: NEEDSTOMATCH CORPORATION, Tokyo (JP)

(72) Inventor: Koichi Sasa, Tokyo (JP)

(73) Assignee: NEEDSTOMATCH CORPORATION, Tokyo (JP)

( * ) Notice: Subject to any disclaimer, the term of this patent is extended or adjusted under 35 U.S.C. 154(b) by 218 days.

(21) Appl. No.: 17/841,190

(22) Filed: Jun. 15, 2022

(65) Prior Publication Data

US 2022/0309550 A1  Sep. 29, 2022

Related U.S. Application Data

(63) Continuation of application No. 17/102,839, filed on Nov. 24, 2020, now Pat. No. 11,393,003, which is a
(Continued)

(30) Foreign Application Priority Data

Dec. 27, 2011  (JP) ................................. 2011-285459
Aug. 11, 2012  (JP) ................................. 2012-179098

(51) Int. Cl.
*G06Q 30/00* (2023.01)
*G06Q 10/0631* (2023.01)
(Continued)

(52) U.S. Cl.
CPC ... *G06Q 30/0605* (2013.01); *G06Q 10/06311* (2013.01); *G06Q 30/06* (2013.01)

(58) Field of Classification Search
CPC ......... G06Q 30/0605; G06Q 10/06311; G06Q 30/06
See application file for complete search history.

(56) References Cited

U.S. PATENT DOCUMENTS

2004/0059723 A1  3/2004 Hasegawa et al.
2006/0205001 A1* 9/2006 Zhang .................... G16H 40/67
435/6.12
(Continued)

FOREIGN PATENT DOCUMENTS

CN    101557567 A   10/2009
JP    2001-282841 A  10/2001
(Continued)

OTHER PUBLICATIONS

Childerhouse, Paul, and Denis Towill. "Engineering supply chains to match customer requirements." Logistics information management 13.6 (2000): 337-346.*
(Continued)

*Primary Examiner* — Kathleen Palavecino
(74) *Attorney, Agent, or Firm* — STAAS & HALSEY LLP

(57) ABSTRACT

A matching support device which achieve matching between demand information and supply information, quickly and accurately reflecting changes in information. The matching support device acquires supply information and/or demand information, performs a matching between the demand information and the supply information, and transmits results of the matching to a supplier terminal and a consumer terminal. The matching support device, during a period specified from the supplier terminal and/or the consumer terminal, continues reception of the supply information and/or the demand information to reflect the changes in information and to continue matching. The matching support device may calculate, based on information of matchings, a schedule-to-result difference ratio of the supply plan information and/or the demand plan information.

11 Claims, 24 Drawing Sheets

Related U.S. Application Data continuation of application No. 16/570,485, filed on Sep. 13, 2019, now Pat. No. 10,878,468, which is a continuation of application No. 16/379,262, filed on Apr. 9, 2019, now Pat. No. 10,438,255, which is a continuation of application No. 14/369,013, filed as application No. PCT/JP2012/083688 on Dec. 26, 2012, now Pat. No. 10,304,100.

(51) Int. Cl.
  *G06Q 30/06* (2023.01)
  *G06Q 30/0601* (2023.01)

(56) References Cited

U.S. PATENT DOCUMENTS

| | | | | |
|---|---|---|---|---|
| 2007/0244768 A1* | 10/2007 | Nguyen | ............ | G06Q 30/0635 |
| | | | | 705/26.81 |
| 2008/0195428 A1* | 8/2008 | O'Sullivan | .......... | G06Q 10/025 |
| | | | | 705/6 |
| 2009/0106078 A1* | 4/2009 | Boris | ..................... | G06Q 30/08 |
| | | | | 705/7.17 |
| 2009/0187441 A1 | 7/2009 | Richardson et al. | | |
| 2012/0130756 A1* | 5/2012 | Agrawal | ............. | G06Q 10/063 |
| | | | | 705/7.11 |

FOREIGN PATENT DOCUMENTS

| | | | |
|---|---|---|---|
| JP | 2002-041869 | A | 2/2002 |
| JP | 2002-024124 | A | 7/2002 |
| JP | 2002-304492 | A | 10/2002 |
| JP | 2003-108794 | A | 4/2003 |
| JP | 2003-216835 | A | 7/2003 |
| JP | 2003-256684 | A | 9/2003 |
| JP | 2004-030428 | A | 1/2004 |
| JP | 2005-092845 | A | 4/2005 |
| JP | 2005-222333 | A | 8/2005 |
| JP | 2006-059195 | | 3/2006 |
| JP | 2006-338678 | | 12/2006 |
| JP | 2007-164675 | | 6/2007 |
| JP | 2008-102756 | | 5/2008 |
| JP | 2008-276425 | A | 11/2008 |
| JP | 2010-146538 | | 7/2010 |

OTHER PUBLICATIONS

Gallager, T.L (2006). TL capacity grows in may. Traffic World, , 1. Retrieved from http://search.proquest.com/docview/195704881?accountid=14753.

Japanese Office Action dated Sep. 9, 2014 in related Japanese Patent Application No. 2013-551749 (2 pages).

PCT Form PCT/IB/301 mailed Jan. 22, 2013 in corresponding International Application No. PCT/JP2012/083688 (1 page).

PCT Form PCT/IB/304 mailed Feb. 18, 2013 in corresponding International Application No. PCT/JP2012/083688 (1 page).

PCT International Search Report, Form PCT/ISA/210, mailed Apr. 2, 2013 in corresponding International Application No. PCT/JP2012/083688 (3 pages) (2 pages English Translation).

PCT Written Opinion, Form PCT/ISA/237, dated Apr. 2, 2013 in corresponding International Application No. PCT/JP2012/083688 (3 pages).

Form PCT/RO/101 mailed in corresponding International Application No. PCT/JP2012/083688 (4 pages).

Non-Final Office Action dated Sep. 19, 2017 in parent U.S. Appl. No. 14/369,013 (23 pages).

Final Office Action dated Aug. 24, 2018 in parent U.S. Appl. No. 14/369,013 (18 pages).

Notice of Allowance mailed Jan. 9, 2019 in parent U.S. Appl. No. 14/369,013 (11 pages).

Notice of Allowance mailed May 30, 2019 in corresponding U.S. Appl. No. 16/379,262 (16 pages).

Restriction Office Action mailed Nov. 4, 2019 in corresponding U.S. Appl. No. 16/570,485 (9 pages).

Non-Final Office Action mailed Feb. 25, 2020 in corresponding U.S. Appl. No. 16/570,485 (25 pages).

Notice of Allowance mailed Aug. 24, 2020 in corresponding U.S. Appl. No. 16/570,485 (35 pages).

Notice of Allowance mailed Mar. 16, 2022 in corresponding U.S. Appl. No. 17/102,839 (12 pages).

U.S. Appl. No. 14/369,013, filed Jun. 26, 2014, Koichi Sasa, Needstomatch Corporation Tokyo Japan.

U.S. Appl. No. 16/379,262, filed Apr. 9, 2019, Koichi Sasa, Needstomatch Corporation Tokyo Japan.

U.S. Appl. No. 16/570,485, filed Sep. 13, 2019, Koichi Sasa, Needstomatch Corporation Tokyo Japan.

U.S. Appl. No. 17/102,839, filed Nov. 24, 2020, Koichi Sasa, Needstomatch Corporation Tokyo Japan.

* cited by examiner

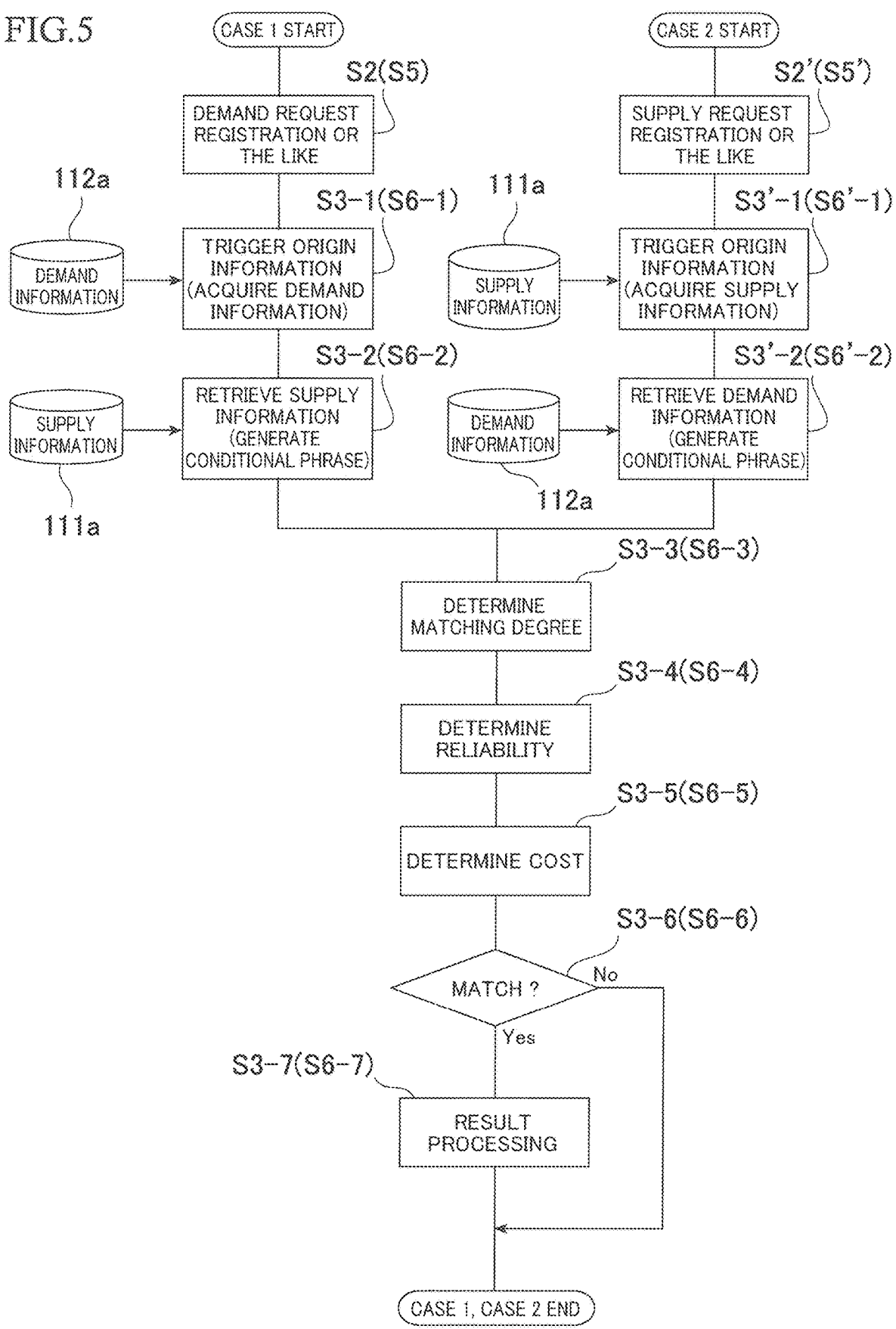

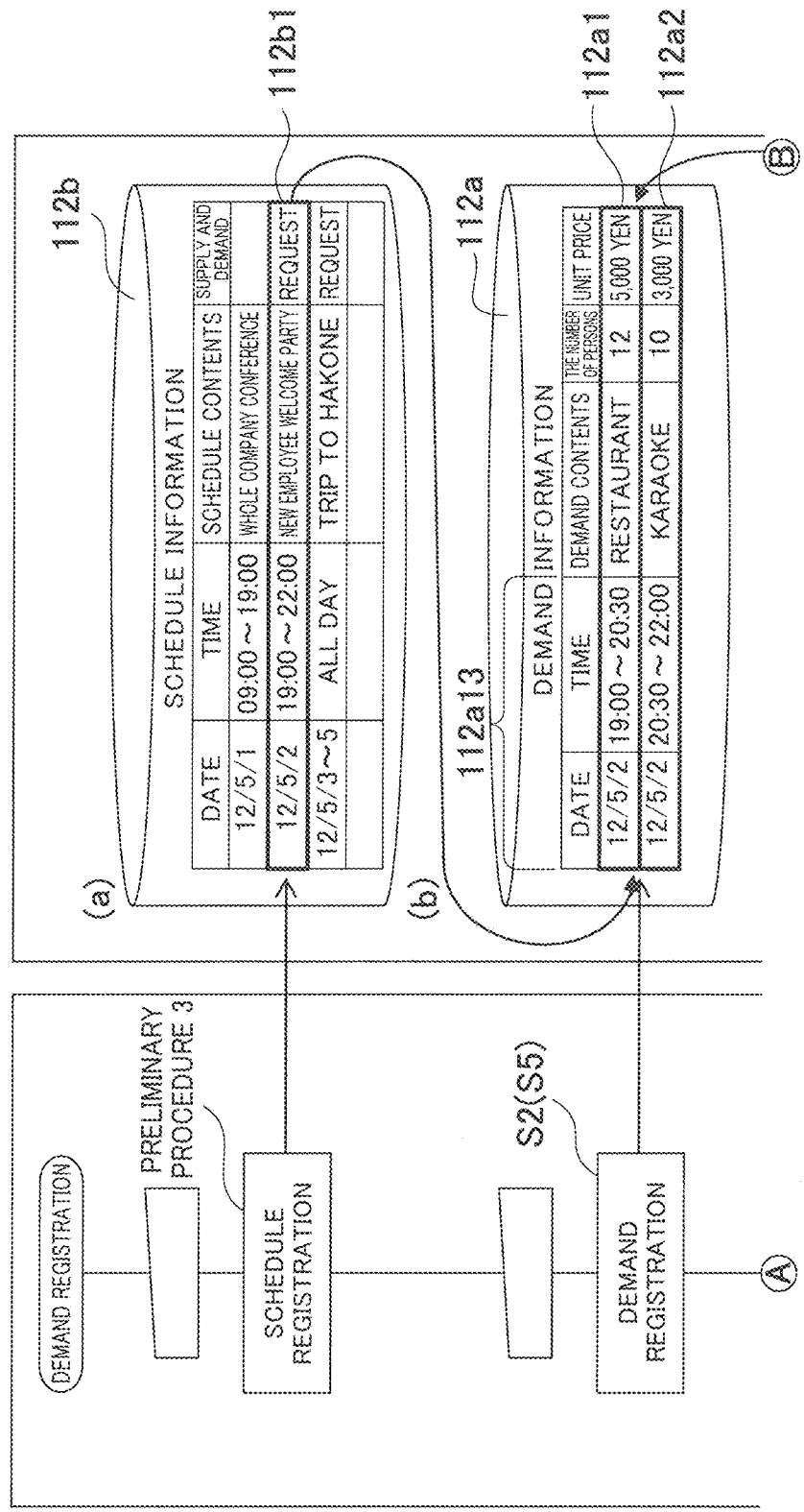

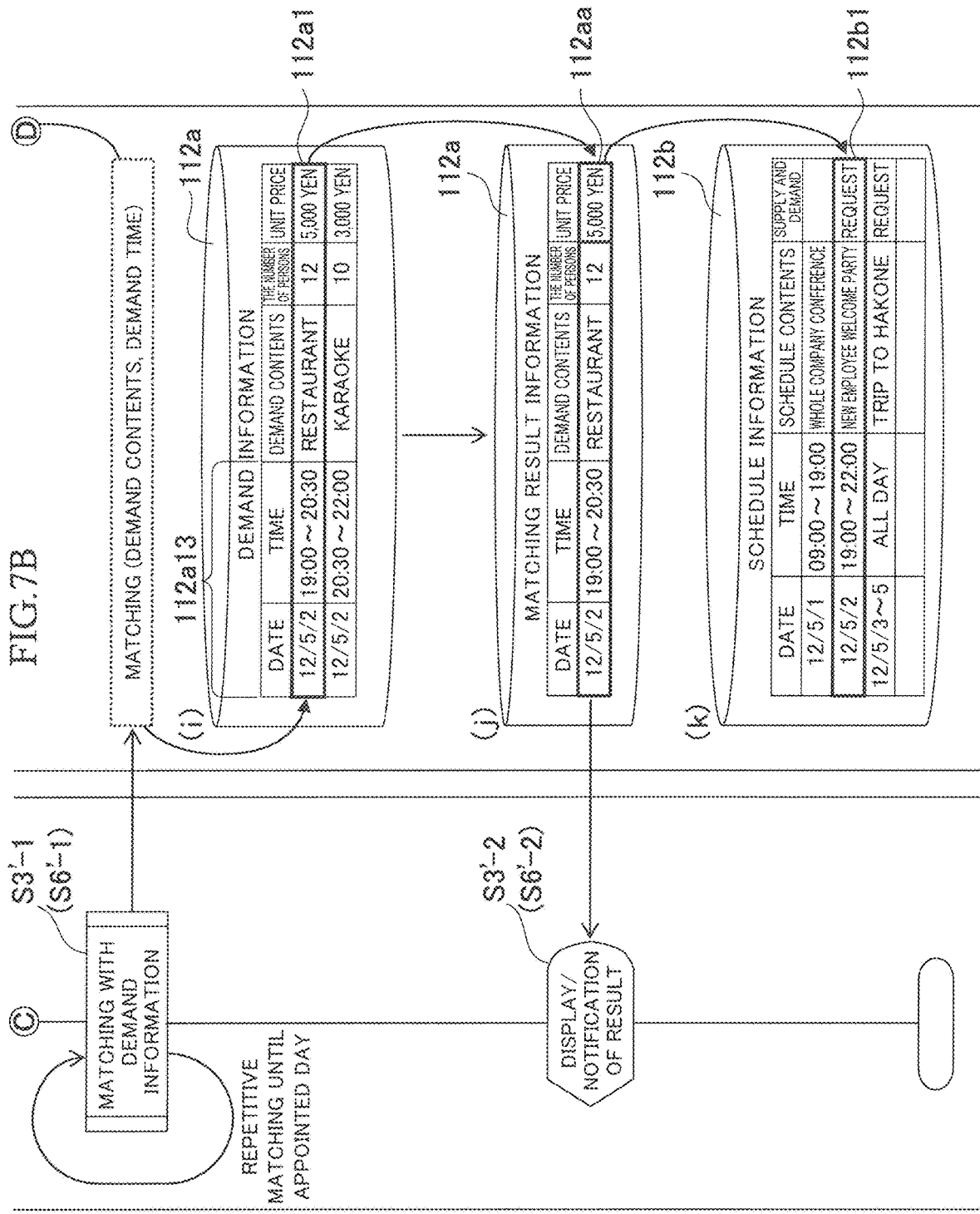

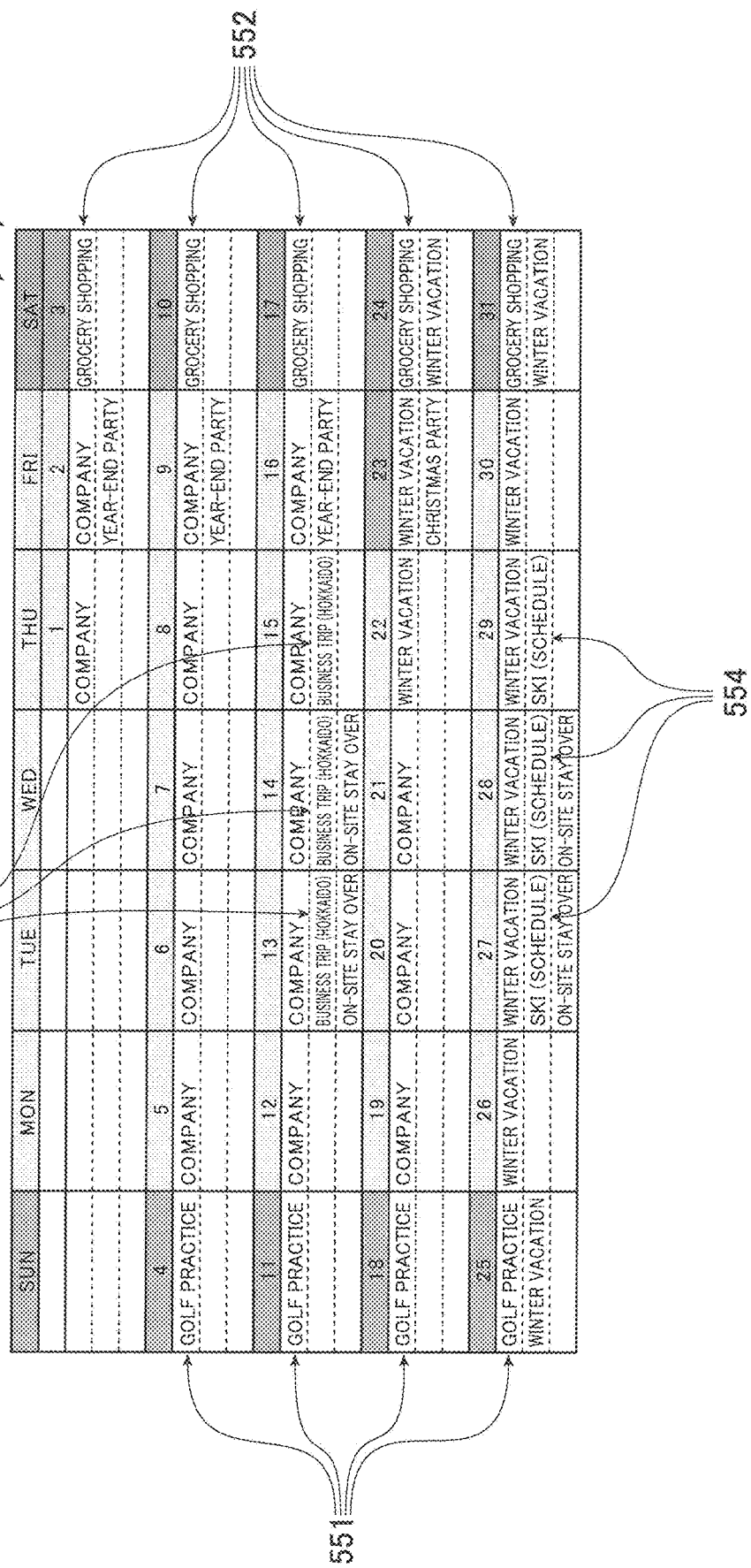

MATCHING SUPPORT DEVICE, MATCHING SUPPORT SYSTEM, AND PROGRAM

CROSS-REFERENCE TO RELATED APPLICATIONS

This application is a continuation application of U.S. patent application Ser. No. 17/102,839, filed on Nov. 24, 2020, which is a continuation application of U.S. patent application Ser. No. 16/570,485, filed on Sep. 13, 2019, now U.S. Pat. No. 10,878,468, which is a continuation application of U.S. Ser. No. 16/379,262, filed Apr. 9, 2019, now U.S. Pat. No. 10,438,255, which is a continuation application of U.S. patent application Ser. No. 14/369,013, filed Jun. 26, 2014, now U.S. Pat. No. 10,304,100, which is a 35 USC 371 PCT National Stage Entry of International Patent Application No. PCT/JP2012/083688, filed Dec. 26, 2012, which claims the foreign priority benefit of Japanese Patent Application No. 2012-179098, filed Aug. 11, 2012, and Japanese Patent Application No. 2011-285459, filed Dec. 27, 2011, the disclosures of which are incorporated herein entirety by reference.

TECHNICAL FIELD

The present invention relates to a technology of performing matching between demand information of a consumer and supply information of a supplier for services and articles and the like.

BACKGROUND ART

Conventionally, there exists a system for matching a supply condition of a supplier who supplies services and articles and the like (called a "supplier", hereinafter) and requirement by a consumer who demands the services and articles and the like (called a "consumer", hereinafter) by using various kinds of networks such as the Internet. For instance, conventionally, a system is known in which, when an agent from a request origin of a service sends a retrieval request of a desired service to a web service matchmaker where supply information is recorded, condition item presentation information is outputted from the web service matchmaker to the request origin, the request origin narrows down conditions utilizing an original retrieval request and requests the retrieval of the service again, and matching is performed by repeating that (for instance, see Patent Literature 1). Also, conventionally, a system is known in which a retrieval request from a client terminal is registered as a pattern, and the pattern is utilized when retrieval is requested for two or more times (for instance, see Patent Literature 2 and Patent Literature 3). Also, conventionally, a system is known in which perishable commodity information transmitted from a perishable commodity producer terminal managed by a producer is recorded in a perishable commodity information provision server, and a consumer terminal managed by a consumer accesses the perishable commodity information provision server and acquires the perishable commodity information (for instance, see patent Literature 4).

CITATION LIST

Patent Literature

Patent Literature 1: Japanese Patent Laid-Open No. 2004-30428

Patent Literature 2: Japanese Patent Laid-Open No. 2001-282841

Patent Literature 3: Japanese Patent Laid-Open No. 2005-92845

Patent Literature 4: Japanese Patent Laid-Open No. 2008-276425

SUMMARY OF INVENTION

Technical Problem

However, supply information of services and commodities often changes successively. In contrast, in configurations described in Patent Literatures 1-4 above, a consumer accesses a server or the like using a terminal, only matches demand on the basis of the supply information stored in the server or the like at one point of time in the past, and is incapable of matching adapted to a present or future supply condition.

In view of such a problem, an object of the present invention is to provide a matching support device, a matching support system, and a program for achieving matching between demand information and supply information, quickly and accurately reflecting the changes in information.

Solution to Problem

A matching support device according to the present invention is the matching support device formed mutually communicably between a supplier terminal used by a supplier supplying services and articles or the like and a consumer terminal used by a consumer demanding provision of the services and charged or free transfer of the articles or the like, and includes information recording means that acquires supply information of the services and the articles or the like transmitted from the supplier terminal and/or demand information of the services and the articles or the like transmitted from the consumer terminal, and records the supply information and/or the demand information, matching means that performs matching between the demand information and the supply information, and result transmission means that transmits a result of the matching to the supplier terminal and the consumer terminal. The information recording means continues reception of the supply information and/or the demand information during an arbitrary period specified from the supplier terminal and/or the consumer terminal, and holds a record of the supply information and/or the demand information for the arbitrary period, and the matching means performs the matching between the supply information and/or the demand information already received and the supply information and/or the demand information that is newly received during the arbitrary period.

In the matching support device according to the present invention, the matching means, when the matching between the demand information and the supply information is established during the arbitrary period, records the established matching information in the information recording means, holds the established matching information, and continues the matching for the demand information and/or the supply information related to the established matching information, and the matching means performs processing assuming that a transaction is established for the held demand information and/or the held supply information, that is transmitted to the supplier terminal and/or the consumer terminal by the result transmission means during the arbitrary period or after the end of the arbitrary period, and selected by the supplier terminal and/or the consumer terminal, and/or, the supplier using the supplier terminal and/or the consumer using the consumer terminal.

In the matching support device according to the present invention, the matching means ends the matching at the point of time of acquiring an instruction to end the matching from the supplier terminal and/or the consumer terminal even during the arbitrary period.

The matching support device according to the present invention includes trigger means that monitors an adapting situation of an arbitrary condition, and when adapted to the arbitrary condition, makes the matching means perform the matching with the adaptation as a trigger, and the trigger means, when at least one of the new supply information, the new demand information and updating information which updates the already acquired supply information or the already acquired demand information is acquired from the supplier terminal and/or the consumer terminal, makes the matching means perform the matching with at least one of the supply information, the demand information and the updating information as the trigger.

In the matching support device according to the present invention, the result transmission means transmits the supply information for which the matching is not established and/or the demand information for which the matching is not established to the consumer terminal and/or the supplier terminal.

The matching support device according to the present invention includes schedule management means that has a time-sequential schedule preparation function and a schedule management function, and performs schedule preparation and schedule management for a schedule of the consumer using the consumer terminal and/or the supplier using the supplier terminal, the matching means sends the result of the matching to the schedule management means, and the schedule management means prepares the schedule using the result of the matching.

In the matching support device according to the present invention, the matching means performs the matching on the basis of a request of the schedule management means.

In the matching support device according to the present invention, the matching means calculates a schedule-to-result difference ratio of the consumer and/or the supplier and plan reliability based on the schedule-to-result difference ratio, by an arbitrary operation performed for past demand plan information as a plan to perform a transaction on the basis of the demand information before an arbitrary point of time by the consumer and a result of an actual transaction performed on the basis of the demand information and/or an arbitrary operation performed for past supply plan information as a plan to perform supply or the like of commodities on the basis of the supply information before the arbitrary point of time by the supplier and a result of an actual transaction performed on the basis of the supply information, and forms statistical information for measuring reliability and a trend value of future demand plan information as a plan to perform a transaction on the basis of the demand information after the arbitrary point of time by the consumer and/or future supply plan information as a plan to perform the supply or the like of commodities on the basis of the supply information after the arbitrary point of time by the supplier, on the basis of the calculated schedule-to-result difference ratio and plan reliability.

In the matching support device according to the present invention, the matching means forms the statistical information using various kinds of information including at least an evaluation by a third person on the transaction of the consumer and/or the transaction of the supplier, in addition to the schedule-to-result difference ratio and the plan reliability.

A matching support system according to the present invention includes the supplier terminal used by the supplier supplying services and articles or the like, the consumer terminal used by the consumer demanding provision of the services and charged or free transfer of the articles or the like, and the matching support device formed mutually communicably between the supplier terminal and the consumer terminal. The matching support device includes the information recording means that acquires the supply information of the services and the articles or the like transmitted from the supplier terminal and/or the demand information of the services and the articles or the like transmitted from the consumer terminal, and records the supply information and/or the demand information, the matching means that performs the matching between the demand information and the supply information, and the result transmission means that transmits a result of the matching to the supplier terminal and the consumer terminal, the information recording means continues the reception of the supply information and/or the demand information during the arbitrary period specified from the supplier terminal and/or the consumer terminal, and holds the record of the supply information and/or the demand information for the arbitrary period, and the matching means performs the matching between the supply information and/or the demand information already received and the supply information and/or the demand information that is newly received during the arbitrary period.

A program according to the present invention makes a computer function as the matching support device according to any one of claims 1 to 9.

Advantageous Effects of Invention

By the matching support device and the matching support system according to the present invention, the information recording means continues the reception of the supply information and/or the demand information during the arbitrary period specified from the supplier terminal and/or the consumer terminal, and holds the record of the supply information and/or the demand information for the arbitrary period, and the matching means performs the matching between the supply information and/or the demand information already received in the arbitrary period and the supply information and/or the demand information that is newly received, so that not only the matching between the supply information and the demand information already received and recorded in the information recording means but also the matching using the supply information and the demand information updated at all times can be performed. Thus, it is possible to achieve the matching between the demand information and the supply information quickly and surely reflecting changes in information.

By the matching support device according to the present invention, the matching means records, during the arbitrary period, the established matching information in the information recording means, holds the established matching information, and continues the matching for the demand information and/or the supply information related to the established matching information, and the matching means performs processing assuming that a transaction is established for the demand information and/or the supply information, that is transmitted to the supplier terminal and/or the consumer terminal by the result transmission means during the arbitrary period or after the end of the arbitrary period, and selected by the supplier terminal and/or the consumer terminal, and/or, the supplier using the supplier terminal and/or the consumer using the consumer terminal, so that the supplier and the consumer can tentatively hold the demand information and the supply information for which the matching is established during the arbitrary period, and select the best one of the held demand information and supply information during the arbitrary period or after the end of the arbitrary period, and the transaction can be established for the demand information and the supply information selected by the supplier and the consumer. Thus, it is possible to provide the supplier and the consumer with an opportunity to select the best one from the services and the commodities or the like adapted to the condition of the matching and establish the transaction.

By the matching support device according to the present invention, the matching means ends the matching at the point of time of acquiring the instruction to end the matching from the supplier terminal and/or the consumer terminal even during the arbitrary period, thereby preventing the situation that the matching is performed again for the supply information and the demand information for which the matching is not desired by the supplier and the consumer of the services and the commodities and information processing and transactions are obstructed. Thus, it is possible to achieve the accurate information processing and transactions, and surely achieve the matching between the demand information and the supply information quickly and accurately reflecting the changes in the information.

By the matching support device according to the present invention, the matching between the demand information and the supply information can be performed with a set arbitrary condition as a trigger. Also, the trigger means, when at least one of the new supply information, the new demand information and the updating information which updates the already acquired supply information or the already acquired demand information is acquired from the supplier terminal and/or the consumer terminal, makes the matching means perform the matching with at least one of the supply information, the demand information and the updating information as the trigger, so that the matching quickly reflecting the changes generated in the information transmitted from a supplier side and/or a consumer side is performed, and a quick transaction opportunity can be given to the supplier and the consumer who have provided the information. Also, by transmitting the result of the matching to the consumer terminal and/or the supplier terminal successively, a further transaction opportunity based on establishment or non-establishment of the matching can be quickly and accurately given to the consumer and the supplier.

By the matching support device according to the present invention, the result transmission means transmits the supply information for which the matching is not established and/or the demand information for which the matching is not established to the consumer terminal and/or the supplier terminal, so that both of the consumer using the consumer terminal and the supplier using the supplier terminal are made to recognize contents of the service and the commodity for which matching establishment is being waited for at present and desires of the consumer waiting for the matching establishment at present or the like, and notification of the supply information and transmission of the supply information according to the demand information are accelerated. Thus, it is possible to increase the possibility of the matching establishment.

By the matching support device according to the present invention, the matching means sends the result of the matching to the schedule management means, and the schedule management means prepares the schedule using the result of the matching, so that the schedule management of the consumer and the supplier and the matching are linked, and the schedule of the consumer and the supplier can be prepared using the result of the matching. Thus, it is possible to improve convenience when preparing the schedule on the basis of the result of the matching between the demand information and the supply information.

By the matching support device according to the present invention, the matching means performs the matching on the basis of a request of the schedule management means so that it is made possible to perform the matching for the demand information and the supply information required in the process of preparing the schedule and establish the matching. In particular, when setting is such that the matching can be requested from a schedule preparation screen displayed at the consumer terminal and the supplier terminal, the consumer and the supplier can request the matching between the demand information and the supply information to the matching support device from the schedule preparation screen. Thus, it is possible to further improve the convenience when requesting the matching between the demand information and the supply information on the basis of schedule contents.

By the matching support device according to the present invention, by calculating the schedule-to-result difference ratio of the consumer and/or the supplier and the plan reliability based on the schedule-to-result difference ratio, and forming the statistical information for measuring the reliability and the trend value of the future demand plan information and/or future supply plan information on the basis of the calculated schedule-to-result difference ratio and plan reliability, it is made possible to predict and analyze, with high accuracy and a high probability, what kind of purchase and supply are to be actually performed for a transaction plan registered by the individual consumer and the individual supplier, and it is possible to improve convenience when the consumer and the supply make the transaction plan.

By the matching support device according to the present invention, by using various kinds of information including at least an evaluation by a third person on the transaction of the consumer and/or the transaction of the supplier for the formation of the statistical information, it is made possible to improve accuracy of the statistical information and predict and analyze, with higher accuracy and a higher probability, what kind of purchase and supply are to be actually performed for the transaction plan registered by the individual consumer and the individual supplier.

By the program according to the present invention, the matching support device according to the present invention can be achieved on various kinds of computer hardware.

BRIEF DESCRIPTION OF DRAWINGS

FIG. 5 is a flowchart illustrating a main part of the procedure of the matching, in the matching support device and the matching support system according to the embodiment.

FIG. 6A is a diagram schematically illustrating transition of data in the matching performed with demand information as a trigger, in the matching support device and the matching support system according to the embodiment.

FIG. 7B is a diagram schematically illustrating the transition of the data in the matching performed with the supply information as a trigger, in the matching support device and the matching support system according to the embodiment.

FIG. 22 is a conceptual diagram of a state of displaying a monthly schedule display screen at the display unit of the consumer terminal, in the matching support system according to the embodiment.

DESCRIPTION OF EMBODIMENTS

Embodiments of the present invention are illustrated in FIG. 1 to FIG. 22.

<Basic Configuration of Network and Function>

Figure 1:
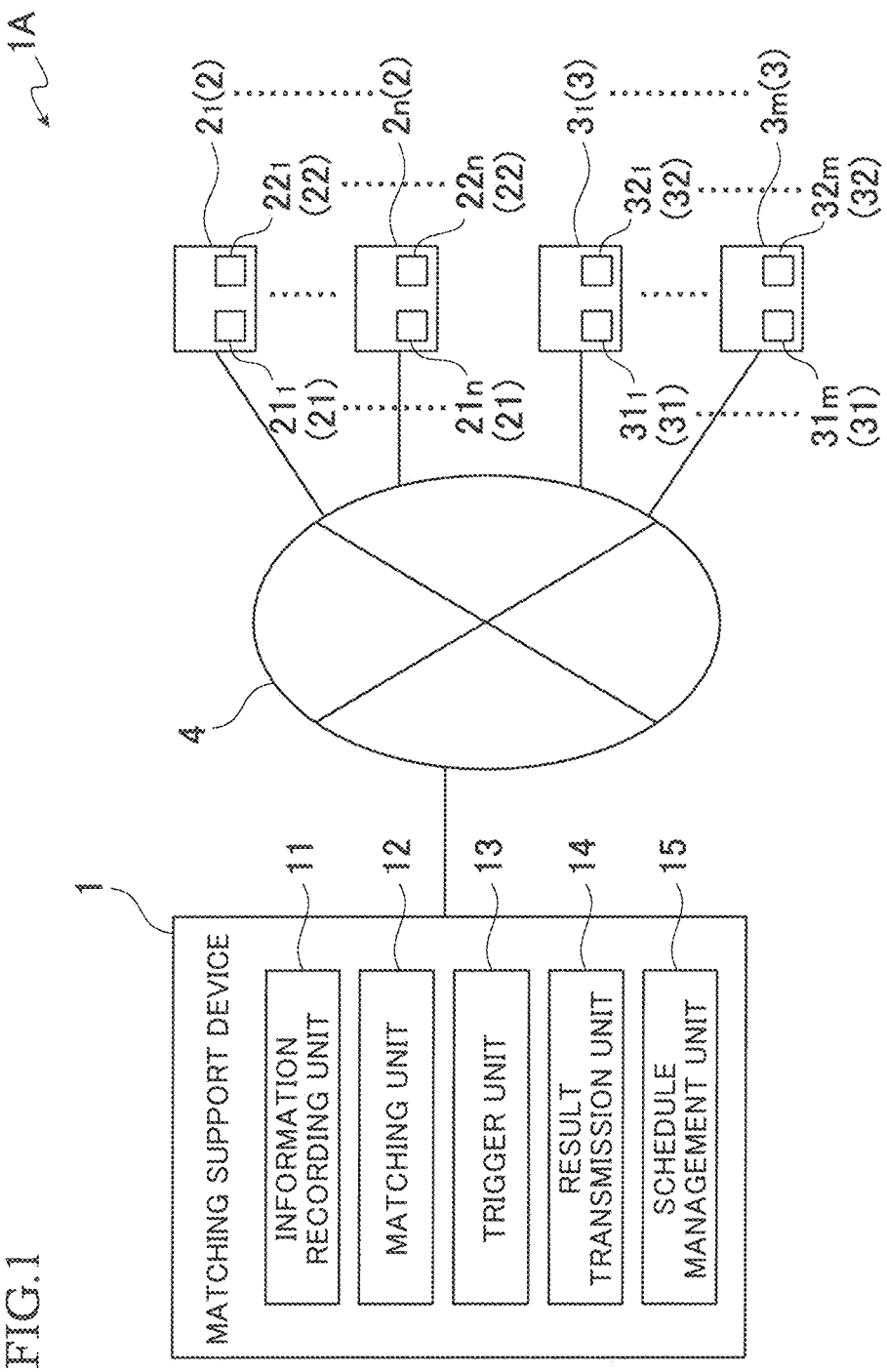
FIG. 1 is a diagram illustrating a network configuration and a functional block illustrating an overall configuration of the matching support device and the matching support system according to an embodiment of the present invention.

FIG. 1 is a diagram illustrating a network and a functional block illustrating an overall configuration of a matching support device 1 and a matching support system 1A according to the embodiment of the present invention. Hereinafter, on the basis of the diagram, the basic configuration of the network and functions of the matching support system 1A will be described.

The matching support system 1A includes the matching support device 1, n (n≥1) supplier terminals $2_1, \ldots, 2_n$, and m (m≥1) consumer terminals $3_1, \ldots, 3_m$. The matching support device 1, the supplier terminals $2_1, \ldots, 2_n$, and the consumer terminals $3_1, \ldots, 3_m$ are mutually communicable through a network 4. The network 4 is data communication means for performing mutually communicable connection regardless of a configuration device type such as a network device, a server, a PC, a smart phone and a cellular phone. Specifically, an example is the Internet, however it is not limited to the Internet. That is, the network 4 may be any network form whether it is open or closed or the like, and may be any network area whether it is a LAN or a WAN or the like.

Also, in the matching support system 1A, there is the case that one terminal is used as both of the supplier terminal (the supplier terminal $2_1$, for instance) and the consumer terminal (the consumer terminal $3_1$, for instance) (see [notation of terminal] described later), however, in this <basic configuration of network and function> and <basic configuration of data>, in order to simplify descriptions, the case that one terminal function as each of the supplier terminals $2_1, \ldots, 2_n$ or each of the consumer terminals $3_1, \ldots, 3_m$ will be described without including the case that it is used as both.

The matching support system 1A illustrated in FIG. 1 is used for performing matching between demand information 112a (see FIG. 2) of a consumer and supply information 111a (see FIG. 2) of a supplier, for services and articles or the like. The supplier and the consumer here each are one party of so-called B to B, B to C, and C to C. That is, the matching support system 1A is used in any of inter-business transactions, business-to-individual transactions, and individual-to-individual transactions.

Also, the matching support system 1A is used for managing a schedule of the supplier and the consumer. Specifically, the matching support system 1A is used for recording schedule information 111b (see FIG. 2) and/or schedule information 112b (see FIG. 2) on the basis of the schedule or the like provided from the respective suppliers and the respective consumers, and supplying reminder information (not shown in the figure) based on the recorded schedule information 111b and 112b. Also, the matching support system 1A is used for reflecting the result of the matching on the schedule information 111b and/or the schedule information 112b.

Further, the matching support system 1A is also capable of linking a function of the schedule management and a function of the matching. Specifically, the matching support system 1A is used for matching one or both of the supply information 111a and the demand information 112a on the basis of the schedule information 111b and 112b recorded by the supplier and the consumer.

The matching support device 1 illustrated in FIG. 1 is a server computer for performing the matching between the demand information 112a of the consumer and the supply information 111a of the supplier, and is used for performing the matching between the demand information 112a transmitted and registered from the consumer terminals $3_1, \ldots, 3_m$ and the supply information 111a transmitted and registered from the supplier terminals $2_1, \ldots, 2_n$. Also, the matching support device 1 is the server computer for managing the schedule as well, and is used for recording the schedule information 111b and 112b on the basis of the schedule or the like inputted from the respective consumer terminals $3_1, \ldots, 3_m$ and the respective supplier terminals $2_1, \ldots, 2_n$, and transmitting the reminder information (not shown in the figure) to the consumer terminals $3_1, \ldots, 3_m$ and the supplier terminals $2_1, \ldots, 2_n$ on the basis of the recorded schedule information 111b and 112b. Also, the matching support device 1 is used for performing the matching for one or both of the supply information 111a and the demand information 112a on the basis of the recorded schedule information 111b and 112b. Also, the matching support device 1 may be formed of one computer or may be formed of a plurality of computer systems interconnected by the network 4.

The matching support device 1 includes, though not shown in the figure, at least one CPU (Central Processing Unit), a RAM (Random Access Memory) that functions as a work area of the CPU, a ROM (Read Only Memory) where a boot program for activation or the like is recorded, an auxiliary storage device such as a hard disk where various kinds of programs and data or the like are recorded, and a communication interface used for transmitting and receiving the data, etc. In the auxiliary storage device, a program for an OS (Operating System), various kinds of application programs, and the data recorded in a database 11a (see FIG. 2) or the like are recorded. These programs and data, by arithmetic processing of the CPU, cooperate with hardware resources to achieve various kinds of functions.

The supplier terminals $2_1, \ldots, 2_n$ illustrated in FIG. 1 include operation units $21_1, \ldots, 21_n$ and display units $22_1, \ldots, 22_n$. The supplier terminals $2_1, \ldots, 2_n$ are communication terminals having a data communication function, to be used by the supplier who supplies services and articles or the like such as provision of various kinds of services and sales of various kinds of articles, and a personal computer or a cellular phone terminal including a so-called smart phone or the like corresponds to the supplier terminal. The operation units $21_1, \ldots, 21_n$ are a mouse or a keyboard or the like and used for inputting various kinds of instructions. The display units $22_1, \ldots, 22_n$ are composed of an LCD (Liquid Crystal Display) or the like, and display various kinds of instructions or the like and various kinds of images inputted from the operation units $21_1, \ldots, 21_n$. Also, the operation units $21_1, \ldots, 21_n$ may be configured as a touch panel function on the display units $22_1, \ldots, 22_n$.

The consumer terminals $3_1, \ldots, 3_m$ illustrated in FIG. 1 include operation units $31_1, \ldots, 31_m$ and display units $32_1, \ldots, 32_m$. The consumer terminals $3_1, \ldots, 3_m$ are communication terminals having a data communication function, to be used by the consumer who demands the provision of services and charged or free transfer of articles or the like, and a personal computer or a cellular phone terminal including a so-called smart phone or the like corresponds to the consumer terminal. The operation units $31_1, \ldots, 31_m$ and the display units $32_1, \ldots, 32_m$ have the same configuration as the operation units $21_1, \ldots, 21_n$ and the display units $22_1, \ldots, 22_n$ of the supplier terminals $2_1, \ldots, 2_n$.

Since the supplier terminals $2_1, \ldots, 2_n$, the operation units $21_1, \ldots, 21_n$, the display units $22_1, \ldots, 22_n$, the consumer terminals $3_1, \ldots, 3_m$, the operation units $31_1, \ldots, 31_m$, and the display units $32_1, \ldots, 32_m$ have the same configuration, hereinafter, except for the case that they need to be discriminated, they are described as the supplier terminal 2, the operation unit 21, the display unit 22, the consumer terminal 3, the operation unit 31, and the display unit 32.

As illustrated in FIG. 1, the matching support device 1 includes functional means that is achieved on the basis of the above described various kinds of programs and the hardware resources. Specifically, the matching support device 1 includes an information recording unit 11 as the "information recording means", a matching unit 12 as the "matching means", a trigger unit 13 as the "trigger means", a result transmission unit 14 as the "result transmission means", and a schedule management unit 15 as the "schedule management means".

The information recording unit 11 illustrated in FIG. 1 acquires the supply information 111a of the services and articles or the like transmitted from the supplier terminal 2, the demand information 112a of the services and articles or the like transmitted from the consumer terminal 3, and various kinds of information transmitted from the supplier terminal 2 and/or the consumer terminal 3, and records the supply information 111a, the demand information 112a and the schedule information 111b and 112b.

The information recording unit 11 is composed of the database 11a and a database management device (not shown in the figure). In the database 11a, various kinds of data for the matching and the schedule management are recorded. The database management device (not shown in the figure) manages the database 11a, and has a function of responding to various kinds of access requests made from the supplier terminal 2 and/or the consumer terminal 3 to the data related to the supply information 111a and/or the demand information 112a, the schedule information 111b and/or the schedule information 112b, and resource element information 111c (see FIG. 2) and/or resource element information 112c (see FIG. 2).

The matching unit 12 includes a language analysis engine which performs keyword extraction processing by language analysis or the like, a classification engine which performs the processing of classifying a single element (individual elements such as a "noun" or an "adjective" or the like when it is a part of speech for instance) of various kinds of information into a plurality of categories, and a matching engine which performs relation analogical reasoning and matching processing between the single elements and composite elements of the various kinds of information, or the like, acquires the supply information 111a of the services and articles or the like transmitted from the supplier terminal 2 and the demand information 112a of the services and articles or the like transmitted from the consumer terminal 3, and performs the matching between the demand information 112a and the supply information 111a. Also, the demand information 112a and the supply information 111a acquired by the matching unit 12 may be recorded together in the information recording unit 11. Also, for the supply information 111a and/or the demand information 112a to be used for the matching by the matching unit 12, the one recorded in the information recording unit 11 may be used and the supply information 111a acquired from the supplier terminal 2 and/or the demand information 112a acquired from the consumer terminal 3 may be used as it is.

The trigger unit 13 monitors an adapting situation of an arbitrary condition, and when adapted to the arbitrary condition, makes the matching unit 12 perform the matching with the adaptation as a trigger (it means a trigger of event execution. The same applies in the present description). The trigger unit 13 uses trigger information 113a (see FIG. 2) of management information 113 (see FIG. 2) as the trigger.

The result transmission unit 14 transmits the result of the matching in the matching unit 12 to the supplier terminal 2 and the consumer terminal 3. The result transmission unit 14 includes a recommendation engine which performs transmission or the like of recommendation information determined to be very likely to be along a preference of the consumer terminal 3 on the basis of the result of the matching and setting information of the consumer terminal 3 or the like. Also, the result transmission unit 14 transmits the supply information 111a for which the matching is not established and/or the demand information 112a for which the matching is not established to the consumer terminal 3 and/or the supplier terminal 2 by using the function of the recommendation engine.

The schedule management unit 15 includes a schedule engine which prepares the schedule information 111b and 112b for which the schedule composed of the single elements and composite elements of the various kinds of information are developed on a time base, and records the prepared schedule information 111b and 112b. The schedule management unit 15 has a time-sequential schedule preparation function and a schedule management function, and performs schedule preparation and schedule management by using the schedule information 111b and/or the schedule information 112b of the consumer using the consumer terminal 3 and/or the supplier using the supplier terminal 2. Also, the schedule management unit 15 records the schedule information 111b and/or the schedule information 112b of the consumer using the consumer terminal 3 and/or the supplier using the supplier terminal 2. Also, the schedule management unit 15 has a time management function for performing various kinds of processing required for the preparation and change of the schedule information 111b and 112b.

[Resource Element Information]

Before describing the basic configuration of the data, "resource element information" in the present description will be described.

The "resource element information" in the present description is not a resource (a supply resource provided by the supplier) in the matching itself, and is element information related to a resource and/or quality, in information defined as an element of the matching by the consumer and/or the supplier.

For instance, the resource element information provided by the supplier indicates the element information of the minimum configuration unit of a suppliable resource or the like. Here, for instance, when the supplier is a manager of a restaurant, information such as "first table: for 5 persons", "second table; for 10 persons" and "third table; for 15 persons" . . . existing in the restaurant corresponds to the "element information of the minimum configuration unit of the suppliable resource". Also, the resource element information sometimes includes, as the resource in the broad sense, default information related to the resource of the supplier used constantly when configuring a supply element, or information for complementing the resource. Specifically, for instance, when the supplier is a manager of a restaurant, information on affiliated stores of the restaurant and information on a group company, and for instance, when the supplier is an individual, individual information of the individual supplier and information on providable skills or the like correspond to it.

Also, for instance, the resource element information provided by the consumer indicates default information or the like of the consumer used constantly when configuring a demand element as the resource in the broad sense. Specifically, individual information of the individual consumer, location information and information on hobbies and preferences or the like correspond to it.

<Basic Configuration of Data>

Figure 2:
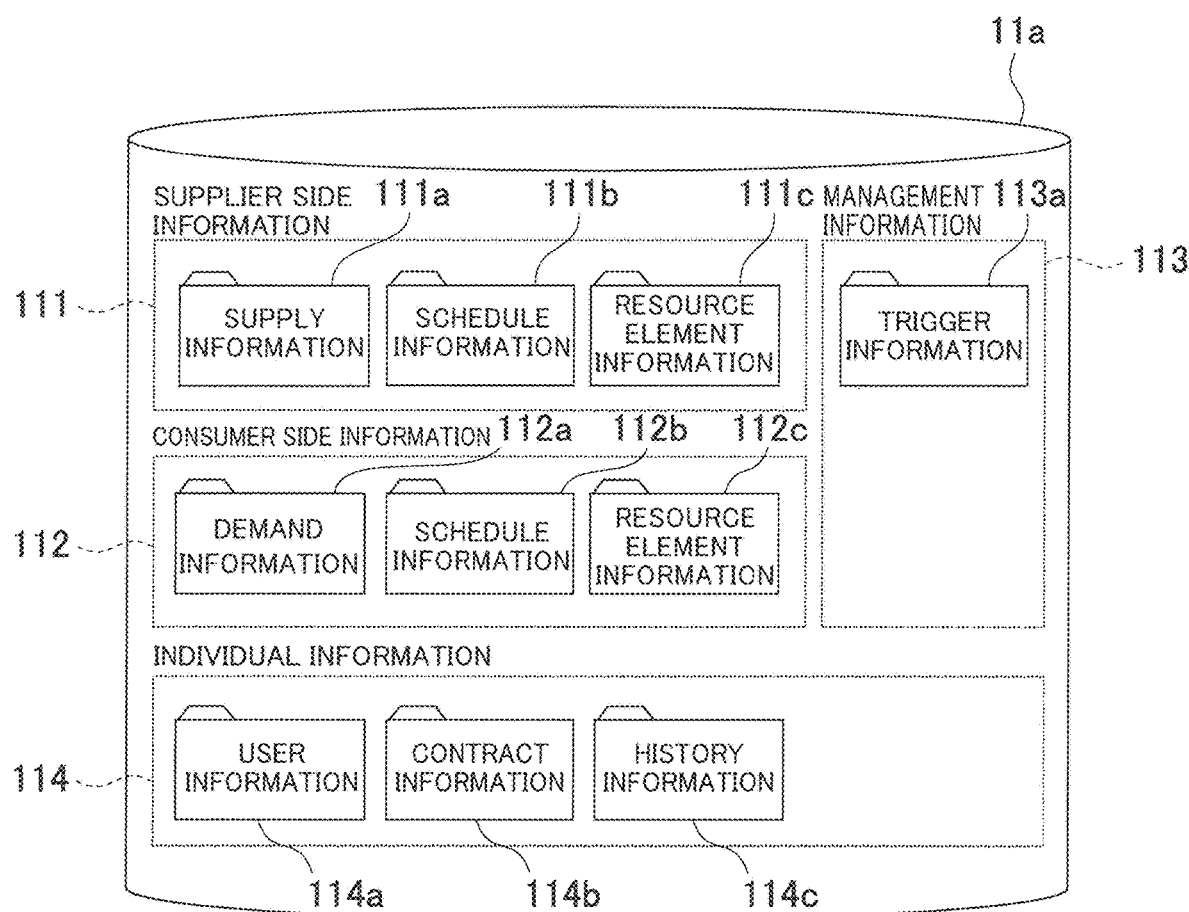
FIG. 2 is a conceptual diagram of a database configuring the matching support device and the matching support system according to the embodiment.
Figure 3:
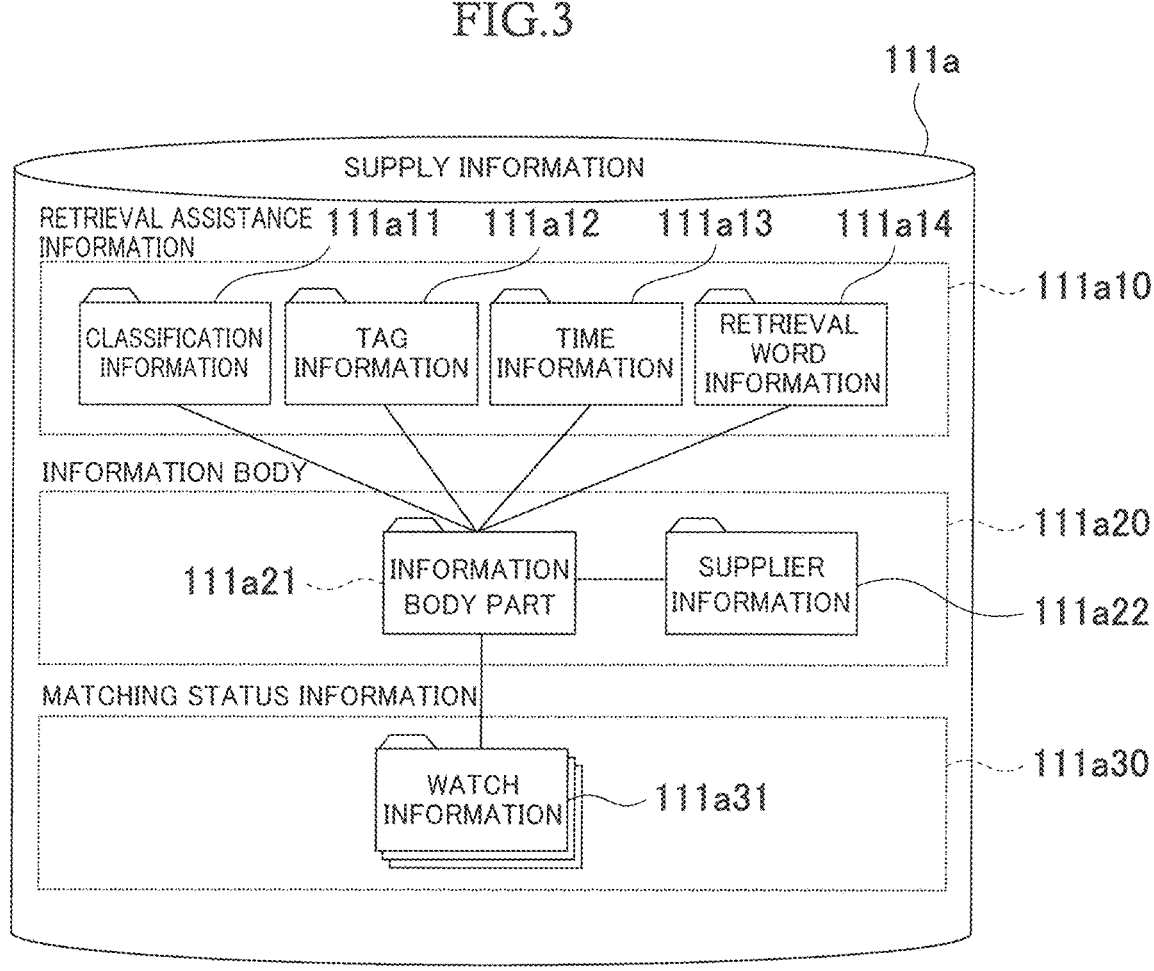
FIG. 3 is a conceptual diagram illustrating a data structure of supply information recorded in the database configuring the matching support device and the matching support system according to the embodiment.

FIG. 2 is a conceptual diagram of the database 11a configuring the matching support device 1, and FIG. 3 is a conceptual diagram illustrating a data structure of the supply information 111a recorded in the database 11a. Hereinafter, based on them, the basic configuration of the data will be described.

As illustrated in FIG. 2, in the database 11a, supplier side information 111, consumer side information 112, management information 113, and individual information 114 are recorded.

The supplier side information 111 includes the supply information 111a, the schedule information 111b, and the resource element information 111c.

The resource element information 111c is, of the "resource element information" mentioned above, the one provided from the supplier.

The schedule information 111b is information related to the schedule of the supplier using the supplier terminal 2.

The supply information 111a is supply element information including information related to the resource, that is transmitted from the supplier side and registered in the matching support device 1, and is used for the matching with the demand information 112a (detail will be described later). The supply information 111a is generated and registered in the state of combining information for which all or part of the resource element information 111c is acquired (by duplication, for instance) and information related to the supply of the individual resources or the like (the articles, the services and the information or the like that can be turned to an object of the matching by the consumer and/or the supplier, and the resources and/or things other than the resources. The same applies in the present description.) transmitted from the supplier terminal 2.

The state that the supply information 111a is "transmitted from the supplier" here includes both of the state that the resource element information 111c for generating the supply information 111a is transmitted from the supplier terminal 2 by the supplier (see step S1 of <operation procedure 1> described later) and the state that direct transmission is performed (not as the resource element information 111c but as the supply information 111a itself) from the supplier terminal 2 by the supplier (see step S2 of <operation procedure 2> described later) in this embodiment.

The supply information 111a also includes matching result information 111aa (see FIG. 6B) as a result of the establishment of the matching with arbitrary demand information 112a.

The consumer side information 112 includes the demand information 112a, the schedule information 112b, and the resource element information 112c.

The resource element information 112c is, of the "resource element information", the one provided from the consumer.

The schedule information 112b is information related to the schedule of the consumer using the consumer terminal 3.

The demand information 112a is demand element information including information related to the resource, that is transmitted from the consumer terminal 3 and registered in the matching support device 1, and is used for the matching with the supply information 111a (detail will be described later). The demand information 112a is generated and registered in the state of combining information for which all or part of the resource element information 112c is acquired and used (duplicated, for instance) and information related to the demand of the consumer for the resources or the like, that is transmitted from the consumer by the consumer terminal 3. The demand information 112a may be generated by one of the information for which all or part of the resource element information 112c is acquired and used and the information related to the demand of the consumer for the resources or the like, that is transmitted from the consumer by the consumer terminal 3.

The state that the demand information 112a is "transmitted from the consumer" here includes both of the state that the resource element information 112c or the like for generating the demand information 112a is transmitted from the consumer terminal 3 by the consumer (see step S1 of <operation procedure 2> described later) and the state that direct transmission is performed (not as the resource element information 112c but as the demand information 112a itself) from the consumer terminal 3 by the consumer (see step S2 of <operation procedure 1> described later) in this embodiment.

The demand information 112a also includes matching result information 112aa (see FIG. 7B) as a result of the establishment of the matching with arbitrary supply information 111a.

The management information 113 includes trigger information 113a. The trigger information 113a is the record of information to be a trigger of the matching between the supply information 111a and the demand information 112a, and log information of the information to be the trigger of the matching, that is acquired by the matching support device 1.

The individual information 114 includes user information 114a, contract information 114b, and history information 114c. The user information 114a includes information (individual information or the like) of a user using the matching support system 1A (including the supplier using the supplier terminal 2 and the consumer using the consumer terminal 3). The contract information 114b includes contract information of the user using the matching support system 1A. The history information 114c includes a system utilization history of the user using the matching support system 1A.

The supply information 111a will be described in detail.

As illustrated in FIG. 3, the supply information 111a includes retrieval assistance information 111a10, an information body 111a20, and matching status information 111a30.

The retrieval assistance information 111a10 is various kinds of information required for classification and retrieval or the like of the supply information 111a, and includes classification information Mall, tag information 111a12, time information 111a13, and retrieval word information 111a14.

The classification information Mall is various kinds of information for classifying the information body 111a20. The tag information 111a12 is various kinds of information (example: a price and quality and the like of the supply information 111a) for complementing the information body 111a20. The time information 111a13 is information related to the past, present or future time of supplying the service (the past, present or future time of performing the matching or the like). The retrieval word information 111a14 is one or a plurality of retrieval words set for each supply information 111a and used for the matching.

The time information 111a13 is the information of the time stipulated by the supply information 111a, that is acquired from the schedule information 111b, and is generated on the basis of the supply information 111a.

Here, periods that can be recorded as the time information 111a13 may be the ones indicated below from (period 1) to (period 3).

(Period 1) Supply Element Period

It is a period during which the supplier desires to provide things registered as the supply information 111a. For instance, when the supply information 111a is the information related to rental of a rental conference room, the date and a time zone during which the rental conference room is to be rented correspond to the supply element period.

(Period 2) Information Reception Period

It is a period during which the matching support device 1 and the matching support system 1A receive distribution of the information corresponding to the supply element period. For instance, When the supply information 111a is the information related to the rental of the rental conference room, the period during which the demand information 112a corresponding to the element of the rental of the rental conference room is distributed to the supplier terminal 2 or the like by the matching support device 1 and the matching support system 1A corresponds to the information reception period.

In this embodiment, the information reception period is stipulated separately from the supply element period and a matching period described later, and each can be set by the supplier using the supplier terminal 2. Thus, on the supplier side, there is an effect of being capable of adjusting quantity of the demand information 112a or the like transmitted from the consumer or the like for the supply information 111a. For instance, when the supply information 111a is the information related to the rental of the rental conference room and the date and the time zone during which the rental conference room is to be rented are several months ahead, by setting start of the information reception period to be late or setting the period to be short, the quantity of the demand information 112a to be transmitted for the supply information 111a is prevented from becoming too much. Also, by setting the information reception period even before the start and after the end of the matching period described later, the supplier using the supplier terminal 2 and the consumer using the consumer terminal 3 receive transmission/reception of the information related to the supply information 111a and the demand information 112a that are the objects of the matching within the information reception period before the start and after the end of the matching, and it is made possible to exchange the information mutually between the supplier and the consumer or between the suppliers or between the consumers.

(Period 3) Matching Period

It is a period from the start to the end of the matching of the supply information 111a, that is performed by the matching unit 12.

In this embodiment, the matching period is stipulated separately from the information reception period and the supply element period, and each can be set by the supplier using the supplier terminal 2. Thus, a period during which the matching between the supply information 111a and the demand information 112a is performed and a period during which various kinds of information are gathered by the consumer using the matching support device 1 and the matching support system 1A or the like for the supply information 111a are separately stipulated, and there is an effect of improving the convenience of the supplier.

The information body 111a20 includes an information body part 111a21, and supplier information 111a22. The information body part 111a21 is a body part of the information configuring the supply information 111a. The information body part 111a21 is constituted of specific contents of the resource or the like supplied by the supplier, and is generated by acquiring and using all or part of the resource element information 111c, mainly. The supplier information 111a22 includes the various kinds of information (individual information or the like) related to the supplier using the supplier terminal 2.

The matching status information 111a30 includes watch information 111a31. The watch information 111a31 includes information related to the user who has tried to perform the matching to the supply information 111a and the user who has performed the matching (such as the consumer who is a user of the consumer terminal 3).

Here, in the state of being recorded in the database 11a, the supply information 111a may or may not include the time information 111a13. It is because that, as described above, the supply information 111a is generated by using all or part of the resource element information 111c, and the resource element information 111c sometimes does not include information for stipulating the time of providing the resource or the like in terms of a property (for instance, when the supplier is the manager of a restaurant, the resource element information 111c sometimes stipulates only the number of tables and the number of seats present in the restaurant).

When generating the supply information 111a having the information for stipulating the time of providing the resource or the like (for instance, when the supplier is the manager of a restaurant, information related to the business days and business hours of the restaurant and reservation time of each seat or the like) by using the resource element information 111c not including the information for stipulating the time of providing the resource or the like, by acquiring the information for stipulating the time of providing the resource or the like from the schedule information 111b, and adding the acquired information to the supply information 111a as the time information 111a13 of the supply information 111a, the supply information 111a including the time information 111a13 is generated. Also, the information for stipulating the time of providing the resource or the like may be acquired from any configuration other than the schedule information 111b and used as the time information 111a13 of the supply information 111a.

Also, though not shown in the figure, the demand information 112a has a data structure similar to that of the supply information 111a illustrated in FIG. 3. An information body (not shown in the figure, corresponding to the information body 111a20 (see FIG. 3) of the supply information 111a) of the demand information 112a is generated as information including consumer information (not shown in the figure, corresponding to the supplier information 111a22 (see FIG. 3) of the supply information 111a) generated by the information using all or part of the resource element information 112c and an information body part (not shown in the figure, corresponding to the information body part 111a21 (see FIG. 3) of the supply information 111a) generated by individual demand elements (for instance, specific demand contents such as dining at a restaurant, a conference, and a travel or the like, and desired conditions of a location and a price or the like).

Here, in the state of being recorded in the database 11a, the demand information 112a includes time information 112a13 (see FIG. 7B) in principle. It is because that the demand element of the consumer includes the information for stipulating the time like "a conference from what time to what time" for instance, in principle. Then, the time information 112a13 (see FIG. 7B) is generated by the information related to the time at which the consumer desires to use the resource or the like in the individual demand information 112a. However, depending on contents of the demand element to be the origin of the demand information 112a, the demand information 112a may not include the time information 112a13 (see FIG. 7B).

Here, periods that can be recorded as the time information 112a13 may be the ones indicated below from (period 4) to (period 6).

(Period 4) Demand Element Period

It is a period during which the consumer desires to receive the provision of things registered as the demand information 112a. For instance, when the demand information 112a is the information related to dining of a small party, a desired time zone to have the dining corresponds to the demand element period.

(Period 5) Information Reception Period

It is a period during which the matching support device 1 and the matching support system 1A receive distribution of the information corresponding to the demand element period. For instance, When the demand information 112a is the information related to the dining of a small party, the period during which the supply information 111a corresponding to the element of the dining is distributed to the consumer terminal 3 or the like by the matching support device 1 and the matching support system 1A corresponds to the information reception period. In this embodiment, the information reception period is stipulated separately from the demand element period and a matching period described later, and each can be set by the consumer using the consumer terminal 3. Thus, there is the same effect as the information reception period of (period 2).

(Period 6) Matching Period

It is a period from the start to the end of the matching of the demand information 112a, that is performed by the matching unit 12. In this embodiment, the matching period is stipulated separately from the information reception period and the supply element period, and each can be set by the consumer using the consumer terminal 3. Thus, there is the same effect as the matching period of (period 3).

The time information 112a13 of the demand information 112a may be included in the resource element information 111c when the consumer registers the resource element information 111c, or the information for stipulating the time corresponding to the demand information 112a may be acquired from the schedule information 112b and used when the demand information 112a is generated. Also, the information for stipulating the time corresponding to the demand information 112a may be acquired from any configuration other than the schedule information 112b and used.

While one, two or more pieces of supply information 111a, one, two or more pieces of demand information 112a, one, two or more pieces of resource element information 111c, and one, two or more pieces of resource element information 112c are recorded in the database 11a, hereinafter, except for the case that they need to be specially discriminated, they are described as the "supply information 111a", the "demand information 112a", the "resource element information 111c" and the "resource element information 112c" regardless of the quantity.

Also, which information is to be the supply information 111a and the resource element information 111c and which information is to be the demand information 112a and the resource element information 112c are preset in the matching support device 1. For instance, in this embodiment, provision information of a rental conference room or a rental hall or the like is the supply information 111a, and application information for the rental is the demand information 112a. Also, working desire information is the supply information 111a, and employment information is the demand information 112a. However, when registering the information to be provided for the matching, the supplier and/or the consumer using the supplier terminal 2 and/or the consumer terminal 3 is also capable of selecting whether to register the information as the supply information 111a or to register the information as the demand information 112a.

<Processing Procedure of Matching>

Figure 4:
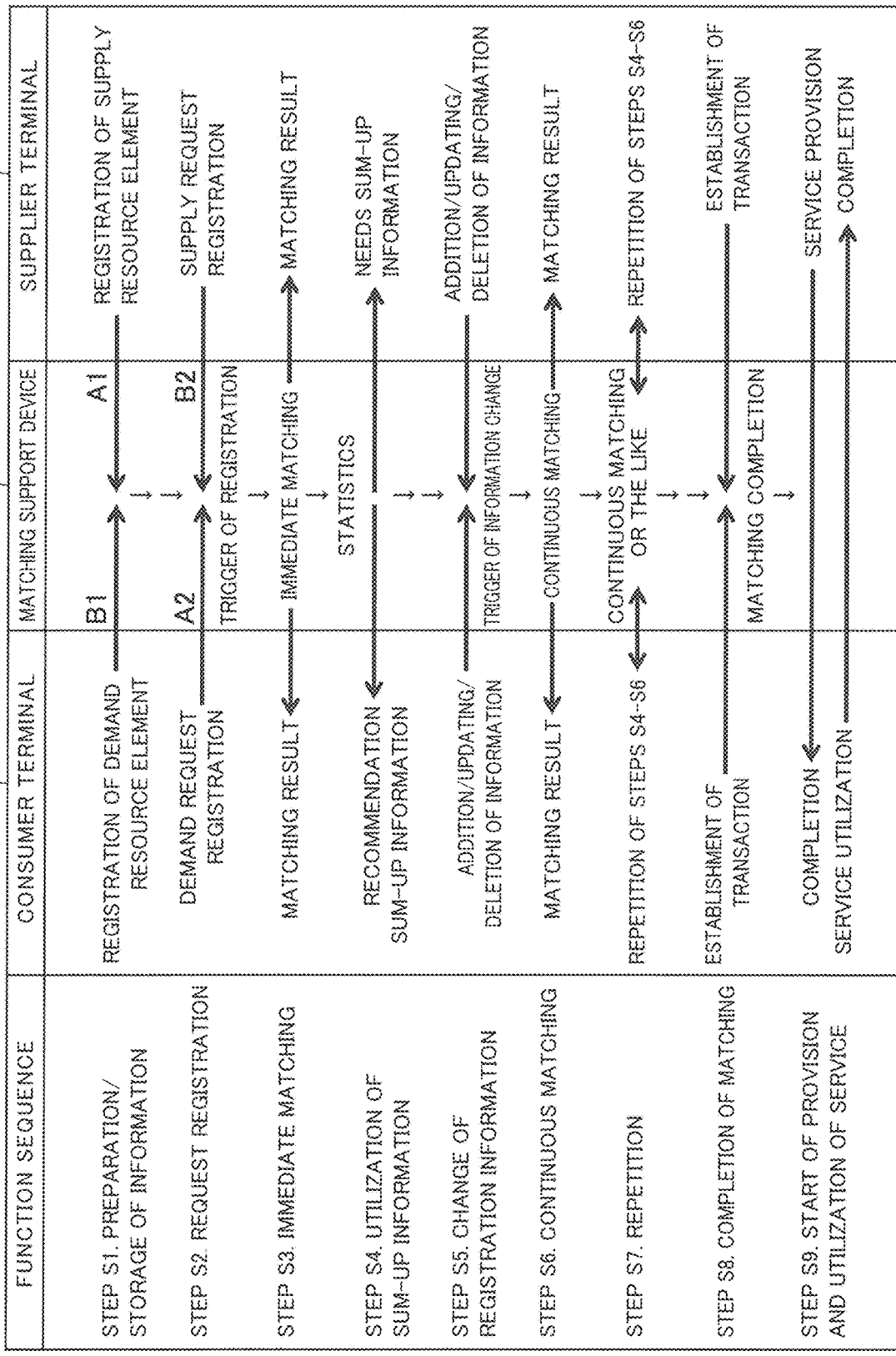
FIG. 4 is a time chart illustrating a processing procedure of matching, in the matching support device and the matching support system according to the embodiment.

FIG. 4 is a time chart illustrating a processing procedure of the matching in the matching support device 1 of this embodiment. FIG. 5 is a flowchart illustrating detail of a matching procedure in the matching support device 1. FIG. 6A, FIG. 6B, FIG. 7A and FIG. 7B are diagrams schematically illustrating transition of the information accompanying the matching. Hereinafter, the processing procedure will be described on the basis of these diagrams and screen conceptual diagrams to be displayed at the supplier terminal 2 and/or the consumer terminal 3.

[For Notation of Terminal]

In the processing procedure indicated below, according to a kind of information and a procedure, there is a case that one terminal is used as the supplier terminal 2 and only the information to be displayed at the supplier terminal 2 or only the information to be displayed at the consumer terminal 3 is displayed on one screen. On the other hand, there is also a case that one terminal is used as the supplier terminal 2 and the consumer terminal 3 and the information to be displayed at the supplier terminal 2 and the information to be displayed at the consumer terminal 3 are displayed together on one screen. In the following description, they are noted as (1)-(4) below.

(1) The case that one terminal is used as the supplier terminal 2: one terminal is noted as the "supplier terminal 2", one operation unit is noted as the "operation unit 21", and one display unit is noted as the "display unit 22".

(2) The case that one terminal is used as the consumer terminal 3: one terminal is noted as the "consumer terminal 3", one operation unit is noted as the "operation unit 31", and one display unit is noted as the "display unit 32".

(3) The case that one terminal is used as the supplier terminal 2 and the consumer terminal 3 and the information to be displayed at the supplier terminal 2 and the information to be displayed at the consumer terminal 3 are displayed together on one screen: one terminal is noted as the "supplier terminal 2 and consumer terminal 3", one operation unit is noted as the "operation unit 21 and operation unit 31", and one display unit is noted as the "display unit 22 and display unit 32".

(4) The case that one terminal is used as the supplier terminal 2 and/or the consumer terminal 3: one terminal is noted as the "supplier terminal 2 and/or consumer terminal 3", one operation unit is noted as the "operation unit 21 and/or operation unit 31", and one display unit is noted as the "display unit 22 and/or display unit 32".

[For User of Terminal]

In the processing procedure indicated below, according to a kind of information and a procedure, a user of one terminal is noted as (5)-(8) below.

(5) The case that one terminal is the "supplier terminal 2": the user of the terminal is noted as the "supplier".

(6) The case that one terminal is the "consumer terminal 3": The user of the terminal is noted as the "consumer".

(7) The case that one terminal is the "supplier terminal 2 and consumer terminal 3": the user of the terminal is noted as the "supplier and consumer".

(8) The case that one terminal is the "supplier terminal 2 and/or consumer terminal 3": the user of the terminal is noted as the "supplier and/or consumer".

[For "Transaction or the Like"]

In this embodiment, "transaction or the like" indicates formation of a state capable of executing the whole action of performing the transfer of commodities and/or the provision of services and/or settlement, and in order to form such a state, acquisition of a state where the consumer using the consumer terminal 3, the supplier using the supplier terminal 2, and the supplier and the consumer using the supplier terminal 2 and the consumer terminal 3 are capable of information provision and/or information exchange to the other consumer and/or the other supplier and/or the other supplier and the consumer.

[Preliminary Procedure 1. Menu Screen Display]

The supplier and the consumer using the matching support system 1A access the matching support device 1 using the supplier terminal 2 and/or the consumer terminal 3. When the matching support device 1 has a login function, the supplier using the supplier terminal 2 and/or the consumer using the consumer terminal 3 operates the operation unit 21 of the supplier terminal 2 and/or the operation unit 31 of the consumer terminal 3 to perform login processing.

Figure 8:
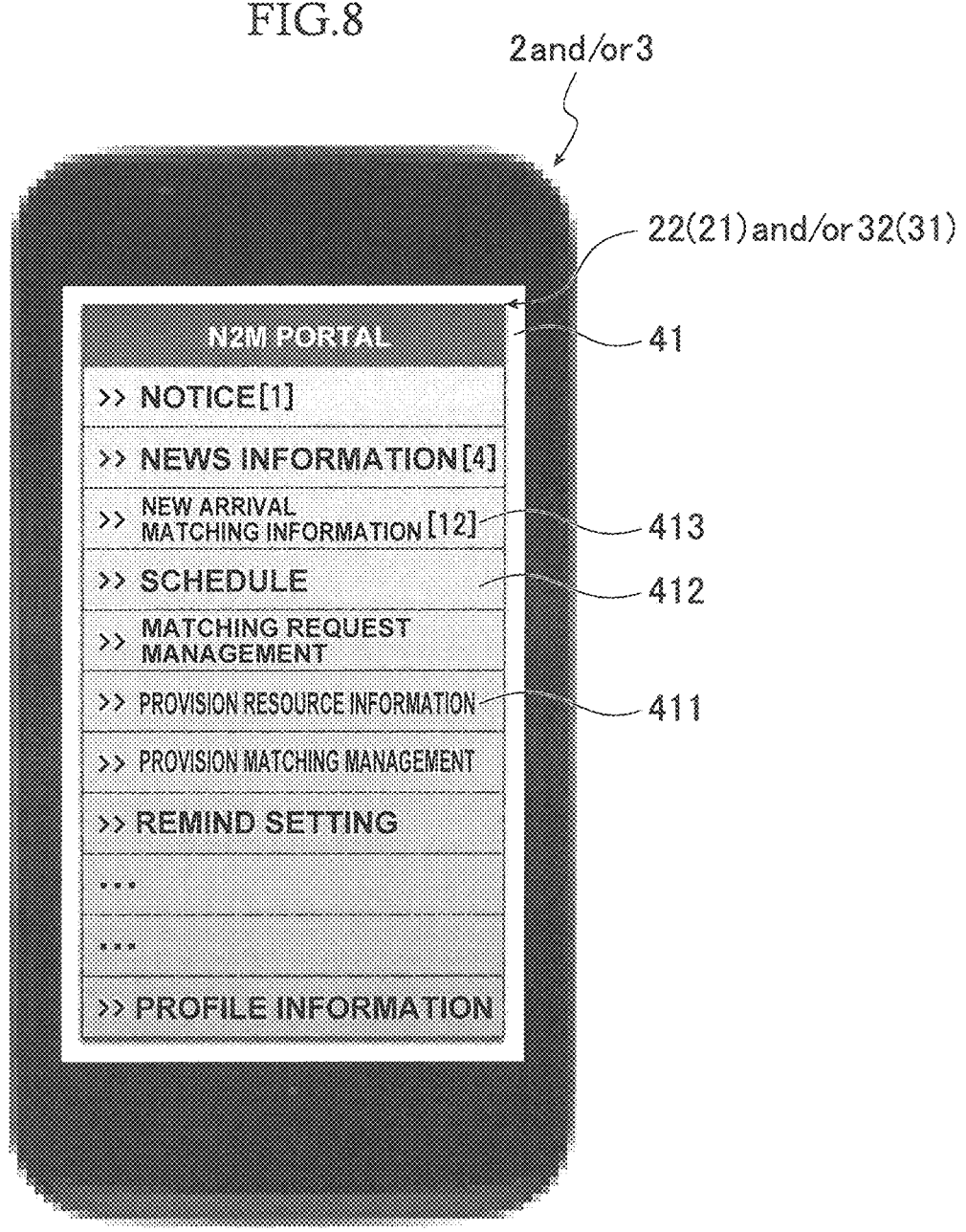
FIG. 8 is a conceptual diagram of a state of displaying a menu screen after login at a display unit of the consumer terminal and/or the supplier terminal, in the matching support device and the matching support system according to the embodiment.

By the access and login, at the display unit 22 and/or the display unit 32 of the supplier terminal 2 and/or the consumer terminal 3, a menu screen 41 whose conceptual diagram is illustrated in FIG. 8 is displayed. On the menu screen 41, buttons for selecting the service provided for the supplier and the consumer by the matching support device 1 and registering and displaying the information required for the service are displayed.

[Preliminary Procedure 2. Prior Registration]

The supplier or the supplier and the consumer using the matching support device 1 register the resource element information 111*c* and/or the resource element information 112*c* by using the supplier terminal 2 or the supplier terminal 2 and the consumer terminal 3.

For instance, when the menu screen 41 illustrated in FIG. 8 is displayed at the display unit 22 of the supplier terminal 2 or the display unit 22 and the display unit 32 of the supplier terminal 2 and the consumer terminal 3 and a resource element information button 411 (in FIG. 8, the button where "provision resource information" is displayed) is tapped, a resource element registration/display selection screen (not shown in the figure) is displayed. When wanting to newly register the resource element to be used as the supply information 111*a*, the supplier or the supplier and the consumer tap a registration button (not shown in the figure) on the resource element registration/display selection screen (not shown in the figure) to display a registration screen (not shown in the figure) at the display unit 22 or the display unit 22 and the display unit 32, and register their own resource element that can be used as the supply information 111*a* to the matching support device 1 as the resource element information 111*c* (see FIG. 2).

Figure 9:
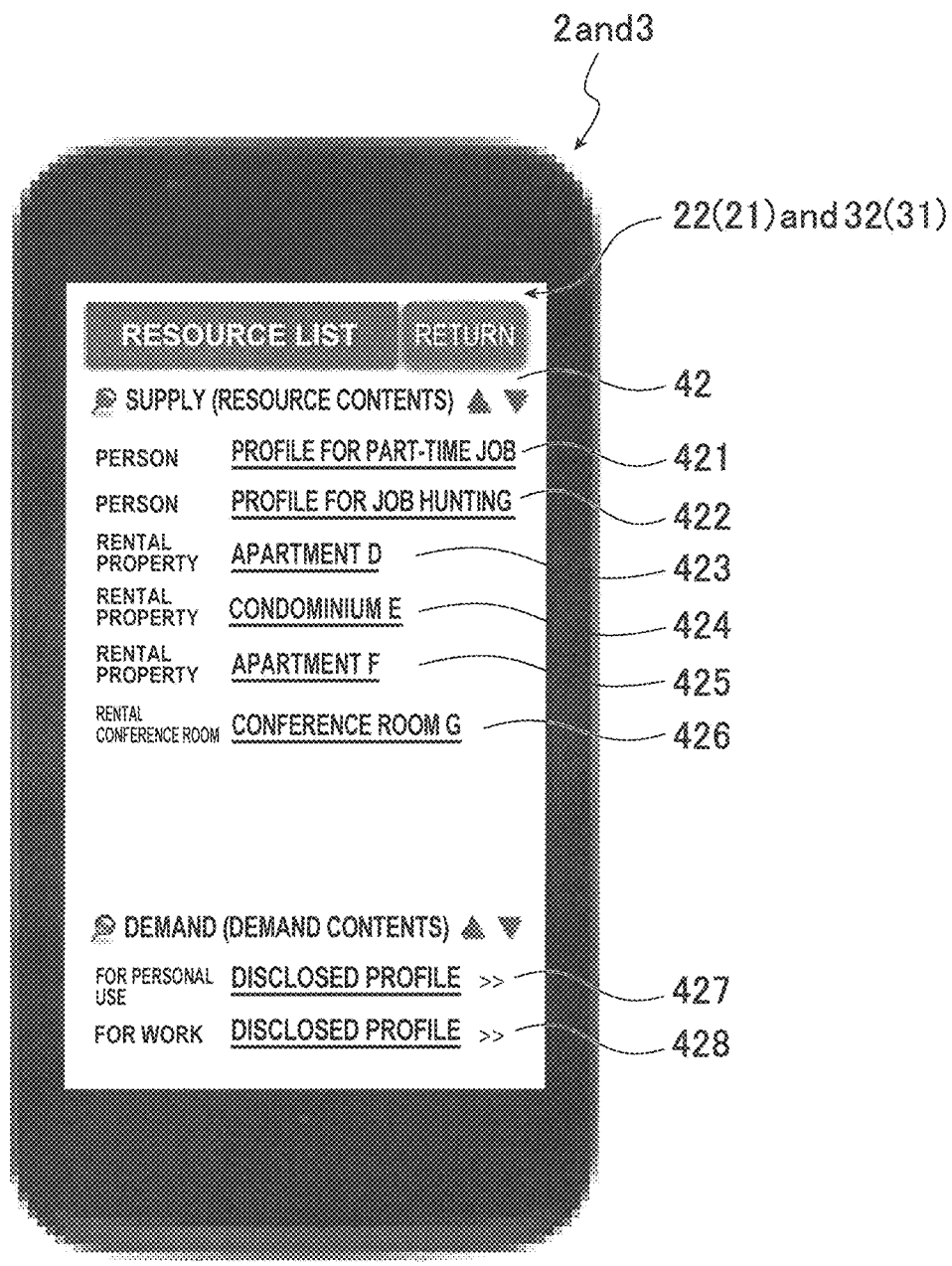
FIG. 9 is a conceptual diagram of a state of displaying a resource element list screen at the display unit of the consumer terminal and the supplier terminal, in the matching support device and the matching support system according to the embodiment.

In the meantime, when the supplier or the supplier and the consumer tap a display button (not shown in the figure) on the resource element registration/selection display screen (not shown in the figure), a resource element list screen 42 whose conceptual diagram is illustrated in FIG. 9 is displayed at the display unit 22 of the supplier terminal 2 or the display unit 22 and the display unit 32 of the supplier terminal 2 and the consumer terminal 3. On the resource element list screen 42, supply resource element titles which are names of individual supply resource elements (displayed as "supply (resource contents)" in FIG. 9) to be presented by the supplier or the supplier and the consumer, that are registered by the individual suppliers or the individual suppliers and consumers, are displayed. For instance, in FIG. 9, six supply resource element titles 421, 422, . . . 426 are displayed.

In the meantime, for instance, on the resource element registration/display selection screen (not shown in the figure), when wanting to newly register the resource element to be used as the demand information 112*a*, the consumer or the supplier and the consumer tap the registration button (not shown in the figure) on the resource element registration/display selection screen (not shown in the figure) to display the registration screen (not shown in the figure) at the display unit 32 or the display unit 22 and the display unit 32, and register their own resource element that can be used as the demand information 112*a* to the matching support device 1 as the resource element information 112*c* (see FIG. 2).

Then, when the consumer or the supplier and the consumer tap the display button (not shown in the figure) on the resource element registration/selection display screen (not shown in the figure), the resource element list screen 42 whose conceptual diagram is illustrated in FIG. 9 is displayed at the display unit 32 of the consumer terminal 3 or the display unit 22 and the display unit 32 of the supplier terminal 2 and the consumer terminal 3. In this case, on the resource element list screen 42, demand resource element titles which are names of individual demand resource elements (displayed as "demand (demand contents)" in FIG. 9) to be presented by the consumer or the supplier and the consumer, that are registered by the individual consumers or the individual suppliers and consumers, are displayed. For instance, in FIG. 9, two demand resource element titles 427 and 428 are displayed.

FIG. 9 illustrates the state of displaying the supply resource element titles 421, 422, . . . 426 and the demand resource element titles 427 and 428 together on one resource element list screen 42 as a result of registering both of the demand resource elements registered as the resource element information 112*c* and the supply resource elements registered as the resource element information 111*c* to be presented by one supplier and consumer to the matching support device 1. However, when the user of the terminal is the supplier and only the resource element information 111*c* that can be used as the supply information 111*a* is registered on the registration screen (not shown in the figure) displayed at the display unit 22 of the supplier terminal 2, only the supply resource element titles 421, 422, . . . 426 are displayed on one resource element list screen 42 illustrated in FIG. 9. Also, when the user of the terminal is the consumer and only the resource element information 112*c* that can be used as the demand information 112*a* is registered on the registration screen (not shown in the figure) displayed at the display unit 32 of the consumer terminal 3, only the demand resource element titles 427 and 428 are displayed on one resource element list screen 42 illustrated in FIG. 9.

Figure 10:
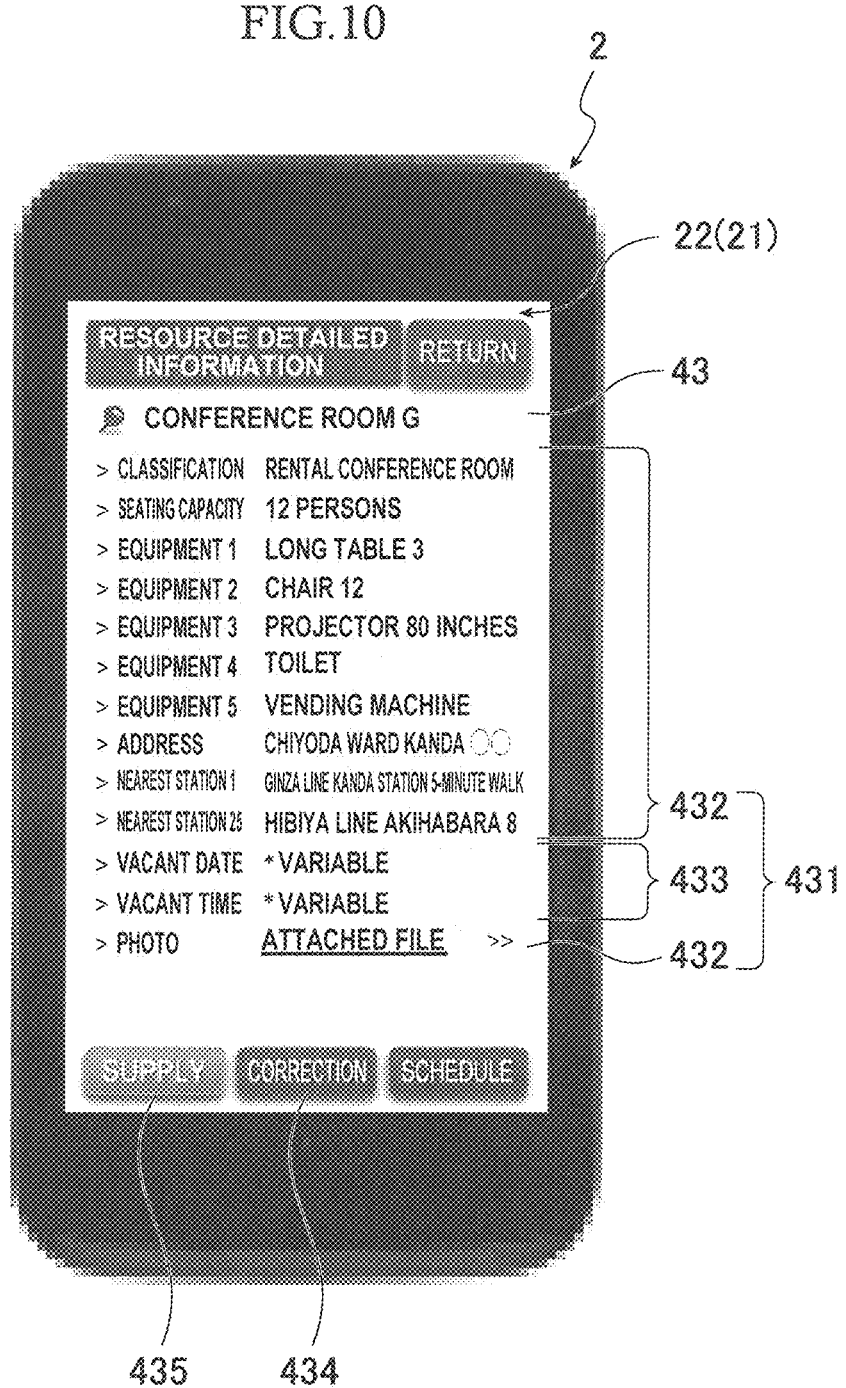
FIG. 10 is a conceptual diagram of a state of displaying a supply resource element individual information screen at the display unit of the supplier terminal, in the matching support device and the matching support system according to the embodiment.

For instance, when the supply resource element title 426 at the bottom is tapped on the resource element list screen 42 illustrated in FIG. 9, a supply resource element individual information screen 43 whose conceptual diagram is illustrated in FIG. 10 is displayed at the display unit 22 of the supplier terminal 2. On the supply resource element individual information screen 43, resource element detailed information 431 which is detailed information (detailed information of a rental conference room in the case of FIG. 10) of the resource element information 111*c* that can be used as the supply information 111*a* of the matching is displayed. The resource element detailed information 431 is composed of invariable information 432 which is information basically without the need of changes and variable information 433 which changes with a transition of the time. When wanting to correct contents of the resource element detailed information 431, the supplier taps a correction button 434 of the supply resource element individual information screen 43 to display a resource element correction screen (not shown in the figure) at the display unit 22, and corrects information contents.

On the other hand, when wanting to perform the matching as the supply information 111*a* by the contents of the resource element detailed information 431, the supplier taps an information registration button 435 (the button where "supply" is displayed in FIG. 10) of the supply resource element individual information screen 43. When the information registration button 435 is tapped, the supply information 111*a* generated by the information (that is, the resource element information 111*c*) displayed in the resource element detailed information 431 is registered to the matching support device 1 illustrated in FIG. 1 and handled as the object of the matching in step S1 and step S2 described later.

Also, when the demand resource element titles 427 and 428 are tapped on the resource element list screen 42 illustrated in FIG. 9, a demand resource element individual information screen (not shown in the figure) is displayed at the display unit 22, and on the demand resource element individual information screen (not shown in the figure), resource element detailed information which is the detailed information of the resource element information 112c that can be used as the demand information 112a of the matching is displayed. When an information registration button (not shown in the figure) of the demand resource element individual information screen (not shown in the figure) is tapped, the demand information 112a generated by the resource element detailed information (that is, the resource element information 112c) displayed on the demand resource element individual information screen (not shown in the figure) is registered to the matching support device 1 and handled as the object of the matching in step S1 and step S2 described later.

[Preliminary Procedure 3. Schedule Registration to Scheduler]

The supplier uses the supplier terminal 2, the consumer uses the consumer terminal 3, and the supplier and the consumer use the supplier terminal 2 and the consumer terminal 3 to register the information related to their own schedule to the matching support device 1 as the schedule information 111b and 112b (see FIG. 2).

Figure 11:
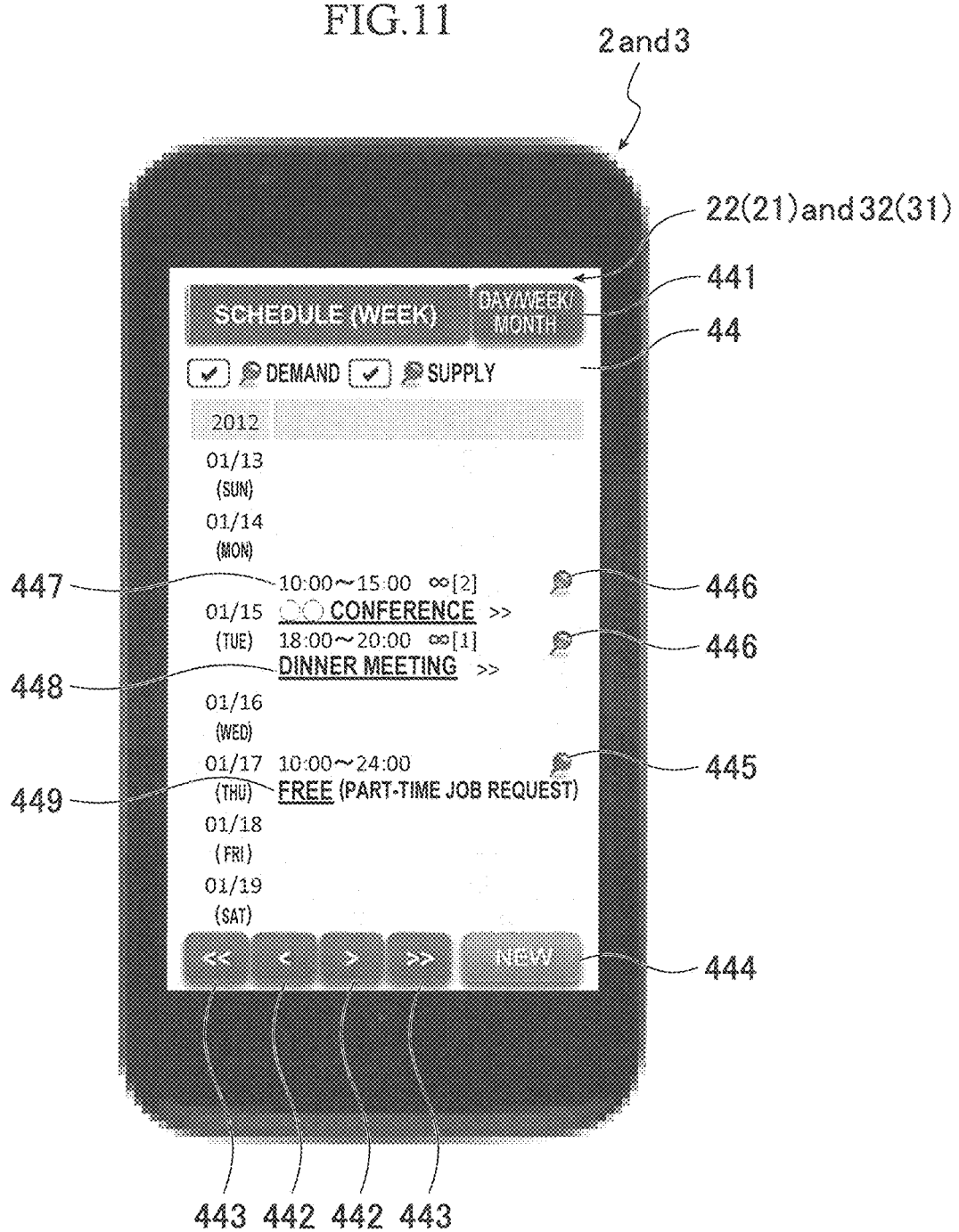
FIG. 11 is a conceptual diagram of a state of displaying a weekly schedule display screen at the display unit of the consumer terminal and the supplier terminal, in the matching support device and the matching support system according to the embodiment.
Figure 12:
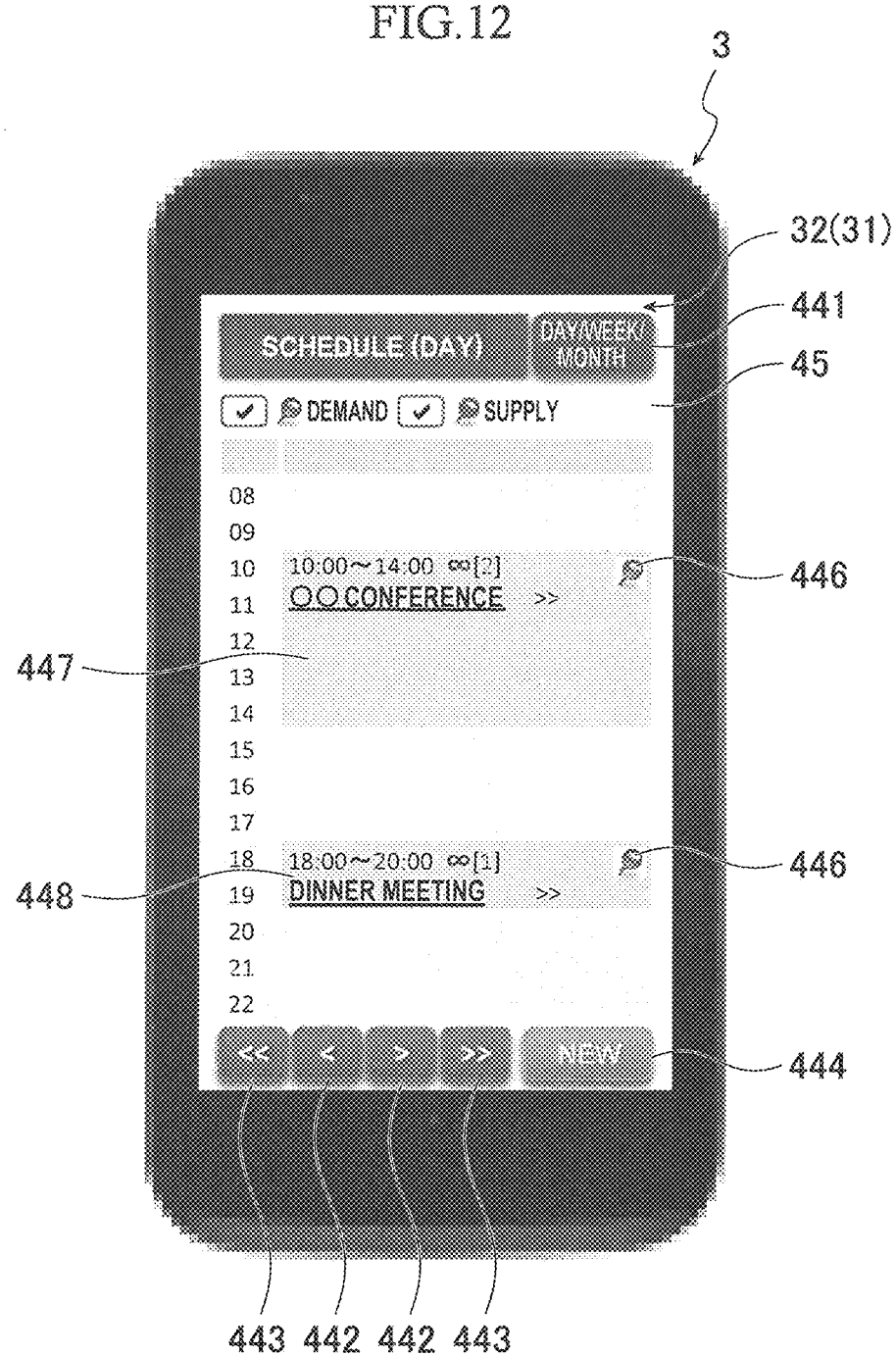
FIG. 12 is a conceptual diagram of a state of displaying a daily schedule display screen at the display unit of the consumer terminal, in the matching support device and the matching support system according to the embodiment.

For instance, when the menu screen 41 illustrated in FIG. 8 is displayed at the display unit 22 and/or the display unit 32 of the supplier terminal 2 and/or the consumer terminal 3 and a schedule button 412 is tapped, a weekly schedule display screen 44 whose conceptual diagram is illustrated in FIG. 11 or a daily schedule display screen 45 whose conceptual diagram is illustrated in FIG. 12 is displayed.

On the weekly schedule display screen 44 illustrated in FIG. 11, a weekly schedule of the consumer and/or the supplier is displayed. On the daily schedule display screen 45 illustrated in FIG. 12, a daily schedule of the consumer and/or the supplier is displayed. Further, at the display unit 32 of the consumer terminal 3, a monthly schedule display screen 55 for displaying a monthly schedule, that is illustrated in FIG. 22, can be displayed as well. On the weekly schedule display screen 44 and the daily schedule display screen 45, as illustrated in FIG. 11 and FIG. 12, a display unit switching button 441 for switching the screen to be displayed at the display unit 32 to the monthly schedule display screen 55, the weekly schedule display screen 44 and the daily schedule display screen 45 in turns, and first movement buttons 442 and 442 and second movement buttons 443 and 443 for moving a month, a week and a day to be displayed at the display unit 32 back and forth are displayed. Also, though not shown in FIG. 22, these buttons 441, 442, 442, 443 and 443 are displayed on the monthly schedule display screen 55 as well. Also, though not shown in the figure, the monthly schedule display screen 55 can be displayed at the display unit 22 of the supplier terminal 2 and the display unit 22 and the display unit 32 of the supplier terminal 2 and the consumer terminal 3.

On the weekly schedule display screen 44 illustrated in FIG. 11 and the daily schedule display screen 45 illustrated in FIG. 12, a new schedule registration button 444 (the button where "new" is displayed in FIG. 11 and FIG. 12) is displayed. Also, though not shown in FIG. 22, the same new schedule registration button 444 is displayed also on the monthly schedule display screen 55. When the new schedule registration button 444 is tapped at the supplier terminal 2 and/or the consumer terminal 3, a schedule registration screen (not shown in the figure) is displayed at the display unit 22 and/or the display unit 32. When the supplier and/or the consumer inputs a new schedule (for instance, the contents, execution time and execution location or the like of the schedule) on the schedule registration screen (not shown in the figure) and taps a registration button (not shown in the figure), the inputted new schedule is registered to the schedule management unit 15 of the matching support device 1, recorded as the schedule information 111b and/or the schedule information 112b, and also displayed on the monthly schedule display screen 55 illustrated in FIG. 22, the weekly schedule display screen 44 illustrated in FIG. 11 or the daily schedule display screen 45 illustrated in FIG. 12 at the supplier terminal 2 and/or the consumer terminal 3.

On the schedule registration screen (not shown in the figure) displayed at the display unit 22 and/or the display unit 32 of the supplier terminal 2 and/or the consumer terminal 3, a matching desire input column (not shown in the figure) for performing arbitrary input when determining the contents of the new schedule to be registered on the basis of the matching is displayed in a form of a checkbox or the like. The supplier and/or the consumer selects by which of the demand information 112a and the supply information 111a the matching is to be performed for the information of the schedule in the matching desire input column (not shown in the figure).

When the registration button (not shown in the figure) is tapped in the state that arbitrary selection is made in the matching desire input column (not shown in the figure), the supply information 111a and/or the demand information 112a generated by the resource element information 111c and/or the resource element information 112c corresponding to the information inputted to the schedule registration screen (not shown in the figure) (that is, the resource element information 111c and/or the resource element information 112c corresponding to the schedule information 111b and/or the schedule information 112b) is registered to the matching support device 1 illustrated in FIG. 1 and handled as the object of the matching in step S1 and step S2 described later.

Also, when the schedule information 111b and/or the schedule information 112b (see FIG. 2) is registered in the state that a check is entered to the matching desire input column (not shown in the figure), the schedule information 111b and/or the schedule information 112b is displayed together with supply information matching association display 445 indicating that the supply information 111a is generated and the matching is being performed, that is illustrated in FIG. 11, and demand information matching association display 446 indicating that the demand information 112a is generated and the matching is being performed, that is illustrated in FIG. 11 and FIG. 12, by the resource element information 111c and/or the resource element information 112c corresponding to the information displayed on the monthly schedule display screen 55 (see FIG. 22), the weekly schedule display screen 44 (see FIG. 11) or the daily schedule display screen 45 (see FIG. 12) displayed at the supplier terminal 2 and/or the consumer terminal 3.

For instance, on the weekly schedule display screen 44 displayed at the display unit 22 and the display unit 32 of the supplier terminal 2 and the consumer terminal 3, whose conceptual diagram is illustrated in FIG. 11, the demand information matching association display 446 is displayed in arbitrary schedules 447 and 448 to perform the matching by the demand information 112a, and the supply information matching association display 445 is displayed in an arbitrary schedule 449 to perform the matching by the supply information 111a. Also, on the daily schedule display screen 45 whose conceptual diagram is illustrated in FIG. 12, the arbitrary schedules 447 and 448 to perform the matching by the demand information 112a displayed at the display unit 32 of the consumer terminal 3 are displayed, and the demand information matching association display 446 is displayed together with the schedules 447 and 448.

The supply information matching association display 445 and the demand information matching association display 446 are displayed in visually different forms. For instance, the supply information matching association display 445 is displayed in blue and the demand information matching association display 446 is displayed in red.

While the weekly schedule display screen 44 illustrates the state of being displayed at the display unit 22 and the display unit 32 of the supplier terminal 2 and the consumer terminal 3 in FIG. 11, and the daily schedule display screen 45 illustrates the state of being displayed at the display unit 32 of the consumer terminal 3 in FIG. 12, the monthly schedule display screen 55, the weekly schedule display screen 44, and the daily schedule display screen 45 are displayed at the display unit 22 and/or the display unit 32 of the supplier terminal 2 and/or the consumer terminal 3. Specifically, when the monthly schedule display screen 55, the weekly schedule display screen 44, and the daily schedule display screen 45 are displayed at the display unit 22 of the supplier terminal 2, the supply information matching association display 445 is displayed together with the arbitrary schedule (the schedule registered as the schedule information 111*b* (see FIG. 2), for instance) that is turned to the object of the matching as the supply information 111*a*. When the monthly schedule display screen 55, the weekly schedule display screen 44, and the daily schedule display screen 45 are displayed at the display unit 32 of the consumer terminal 3, the demand information matching association display 446 is displayed together with the arbitrary schedule (schedule registered as the schedule information 112*b* (see FIG. 2), for instance) that is turned to the object of the matching as the demand information 112*a* (see FIG. 12). When the monthly schedule display screen 55, the weekly schedule display screen 44, and the daily schedule display screen 45 are displayed at the display unit 22 and the display unit 32 of the supplier terminal 2 and the consumer terminal 3, the supply information matching association display 445 is displayed together with the arbitrary schedule (the schedule registered as the schedule information 111*b* and/or the schedule information 112*b* (see FIG. 2), for instance) to perform the matching by the supply information 111*a*, and the demand information matching association display 446 is displayed together with the arbitrary schedule to perform the matching by the demand information 112*a* (see FIG. 11).

After the preliminary procedures above, processing of step S1 to step S9 illustrated in FIG. 4 is performed. However, at least one procedure of [preliminary procedure 1] to [preliminary procedure 3] may be performed in step S1 and/or step S2 described later.

For the processing indicated in step S1 to step S9 illustrated below, depending on difference in processing contents of step S1 and step S2, roughly two operation procedures are considered. They will be described below as <operation procedure 1> and <operation procedure 2>.

<Operation Procedure 1: The Case that Registration from the Supplier Terminal 2 is Performed First>

It is a procedure of starting the matching by registering the supply information 111*a* from the supplier terminal 2 in step S1 and registering the demand information 112*a* from the consumer terminal 3 in step S2. The operation procedure will be described below.

[Step S1 (Arrow A1). Preparation/Storage of Information]

For instance, when the information registration button 435 of the supply resource element individual information screen 43 is tapped in [preliminary procedure 2] or when the schedule information 111*b* and/or the schedule information 112*b* is registered in the state that a check is entered to the matching desire input column (not shown in the figure) in [preliminary procedure 3], the supply information 111*a* is generated and registered on the basis of the resource element information 111*c*.

Figure 13:
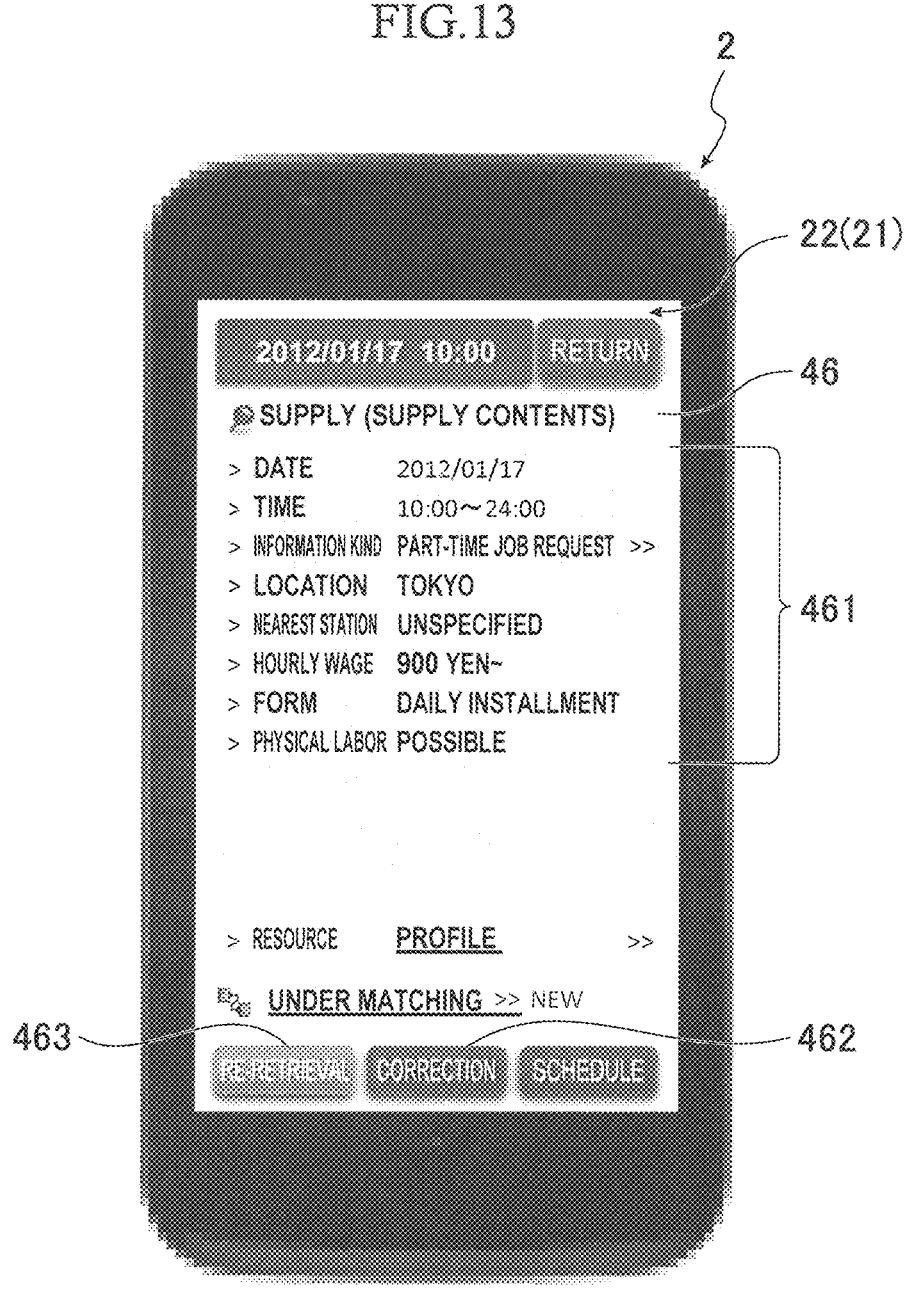
FIG. 13 is a conceptual diagram of a state of displaying a supply information confirmation screen at the display unit of the supplier terminal, in the matching support device and the matching support system according to the embodiment.

In this case, for instance, at the display unit 22 of the supplier terminal 2, a supply information confirmation screen 46 illustrated in FIG. 13 is displayed. The information displayed on the supply information confirmation screen 46 is the information registered as the resource element information 111*c*. On the supply information confirmation screen 46, the information registered as the supply information 111*a* in [preliminary procedure 2] and [preliminary procedure 3] by the supplier is displayed in a desired condition display column 461. For instance, in FIG. 13, the information of a working desired date, the working desired time and a working desired location or the like, which is the information for requesting a part-time job (that is, supplying labor), is displayed in the desired condition display column 461.

Depending on a kind of the supply information 111*a*, in addition to the information exemplified in the desired condition display column 461 in FIG. 13, the information such as a name of the supplier, a kind and contents of an event, details and time of the event, a price of the event and an "information time limit" which is the time information of an "arbitrary period" for turning the information to the object of the matching is displayed. The "information time limit" corresponds to the "(period 3) matching period" described above, and specifically, the start time, end time and duration or the like of the matching period are displayed. Also, in addition to the information of the "information time limit", the information corresponding to the "(period 1) supply element period" or the "(period 2) information reception period" described above may be displayed.

For instance, when the supplier is a rental agent of conference rooms, in the desired condition display column 461, the information such as an agent name, the contents of the event that is "the rental of the conference room", the details and time of the event represented by the number and size of the conference rooms, room types such as "Japanese-style room" and "Western-style room" and a rental time zone or the like, price information such as a rental charge for each room and each hour, and the "information time limit" is displayed.

Also, for instance, when the supplier is a manager or an employee of a restaurant or a hotel and wants to supply a plan of a dinner set or a diner show or the like provided in the restaurant or the hotel, on the supply information confirmation screen 46, the information such as an agent name, the contents of the event that is "reservation of a meal", the details and time of the event represented by a menu of the meal, the time and date of dining, the number of persons to dine or the like, and a charge of each menu is displayed. When correcting the contents displayed on the supply information confirmation screen 46, the supplier taps a correction button 462 to display a correction screen (not shown in the figure) at the display unit 32, and corrects the information. When performing the matching by the contents displayed on the supply information confirmation screen 46, when the supplier taps an execution button 463 (in FIG. 14, the button where "re-retrieval" is displayed), the information displayed on the supply information confirmation screen 46 is recorded in the information recording unit 11 of the matching support device 1, and stored.

In such a manner, the registration of the resource element information 111*c* is completed, and the supply information 111a generated and registered on the basis of the registered resource element information 111c can be turned to the object of the matching (an arrow A1 in step S1).

[Step S2 (Arrow A2). Request Registration]

For instance, when the information registration button (not shown in the figure) of the demand resource element individual information screen (not shown in the figure) is tapped in [preliminary procedure 2] or when the schedule information 111b and/or the schedule information 112b is registered in the state that a check is entered to the matching desire input column (not shown in the figure) in [preliminary procedure 3], the demand information 112a is generated and registered. The demand information 112a may be generated on the basis of the registered resource element information 112c.

Figure 14:
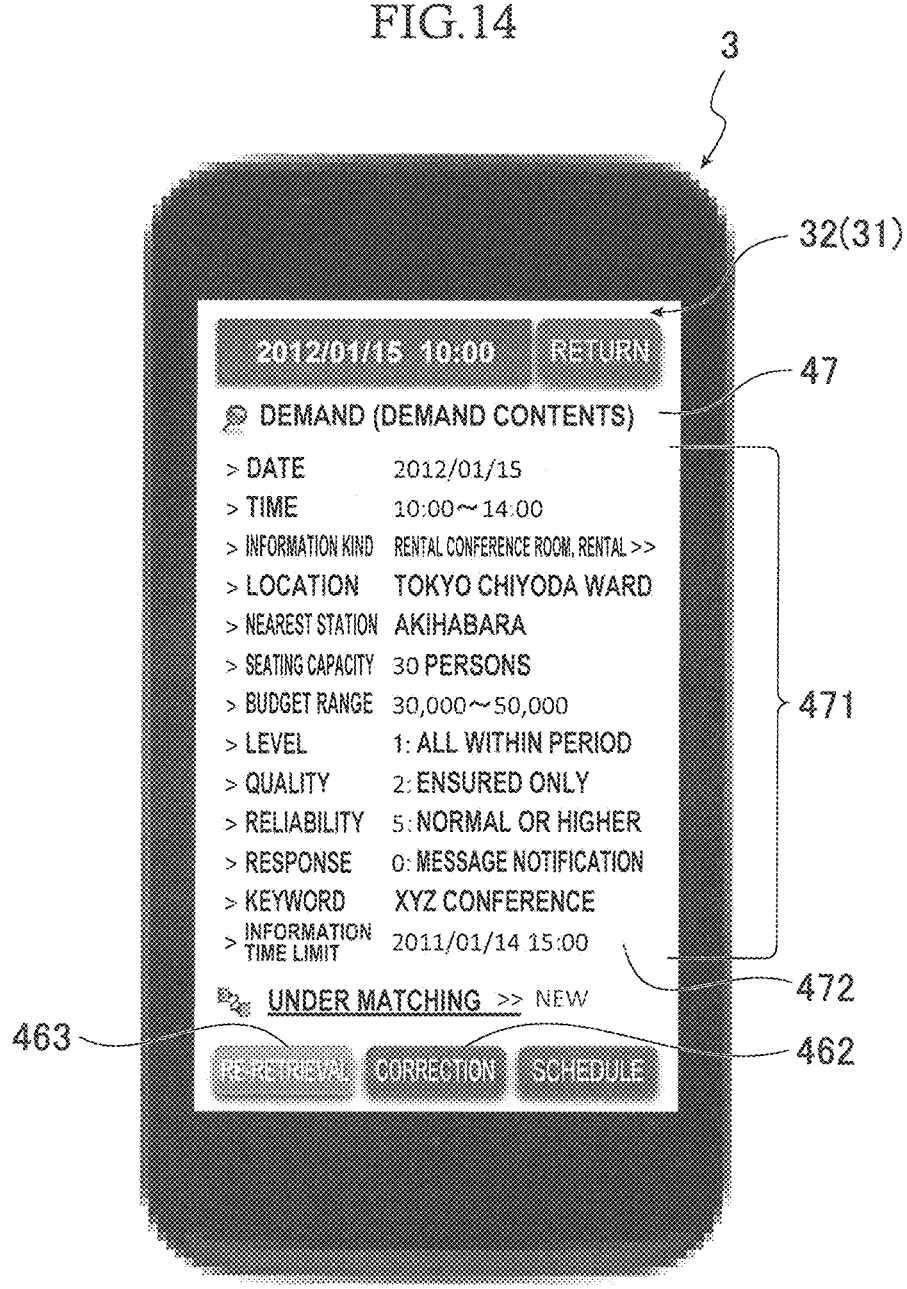
FIG. 14 is a conceptual diagram of a state of displaying a demand information confirmation screen at the display unit of the consumer terminal, in the matching support device and the matching support system according to the embodiment.

In this case, for instance, at the display unit 32 of the consumer terminal 3, a demand information confirmation screen 47 illustrated in FIG. 14 is displayed. On the demand information confirmation screen 47, a desired condition display column 471 for displaying desired conditions such as a date, the time, an information kind, a location, a nearest station, and a seating capacity or the like, that are inputted on a desired condition input screen (not shown in the figure), is displayed. In the displayed desired condition display column 471, an information time limit 472 which is the time information of the "arbitrary period" for turning the information to the object of the matching, that is inputted on the desired condition input screen (not shown in the figure), is also displayed. The "information time limit" corresponds to the "(period 6) matching period" described above, and specifically, the start time, end time and duration or the like of the matching period are displayed. Also, in addition to the information of the "information time limit", the information corresponding to the "(period 4) demand element period" or the "(period 5) information reception period" described above may be displayed. The consumer inputs desired conditions to the desired condition display column 471. When correcting the contents displayed on the demand information confirmation screen 47, the consumer taps the correction button 462 to display the correction screen (not shown in the figure) at the display unit 22, and corrects the information. When performing the matching by the contents displayed on the demand information confirmation screen 47, when the consumer taps the execution button 463, the data displayed in the desired condition display column 471 is transmitted from the consumer terminal 3 to the matching support device 1 as the demand information 112a from the consumer, and is recorded in the information recording unit 11.

In such a manner, request registration is completed, and the registered information is turned to the object of the matching as the demand information 112a (an arrow A2 in step S2). That is, in this embodiment, the matching unit 12 of the matching support device 1 performs the matching on the basis of a request of the schedule management unit 15.

[Step S3. Immediate Matching]

When the request is registered, the matching unit 12 of the matching support device 1 performs immediate matching (step S3). Specifically, the trigger unit 13, with the request registration as a trigger, acquires the supply information 111a adapted to the matching from the supply information 111a registered and recorded in the information recording unit 11, and makes the matching unit 12 immediately perform the matching with the demand information 112a for which the request is registered. In this case, the matching unit 12 performs the matching between the supply information 111a and the demand information 112a in forms indicated in the following (matching example 1) and (matching example 2) or the like, for the demand information 112a and the individual supply information 111a for instance.

(Matching Example 1) Keyword Matching

Keywords such as dates and time, locations and categories included in the supply information 111a and the demand information 112a are compared with each other, and whether or not the matching is established is determined depending on whether or not they match or whether or not they approximate. Specifically, for instance, a comparison is made for items indicated in the following (condition example 1) to (condition example 4), and whether the condition of the demand and the condition of the supply are adapted is determined.

(Condition example 1) Do the "category" of the supply information 111a and the "category" of the demand information 112a match?

(Condition example 2) Are the "date" and "time zone" of the supply information 111a the same as the "date" and "time zone" of the demand information 112a or including them?

(Condition example 3) Are the "location" and "nearest station" of the supply information 111a the same as the "location" and "nearest station" of the demand information 112a?

(Condition example 4) Is the "seating capacity" of the supply information 111a equal to or larger than the "seating capacity" of the demand information 112a?

(Matching Example 2) Group Matching

The plurality of suppliers and the plurality of consumers are grouped or hierarchized to form arbitrary supplier group and consumer group, and the supply information 111a and the demand information 112a as the whole group are formed. Then, by comparing the supply information 111a and the demand information 112a, whether or not the matching is established is determined. As a specific method of the matching, similarly to the (matching example 1), the items described in the (condition example 1) to (condition example 4) are compared.

[Specific Processing Contents of Matching Support System 1A, in Matching]

Figure 6B:
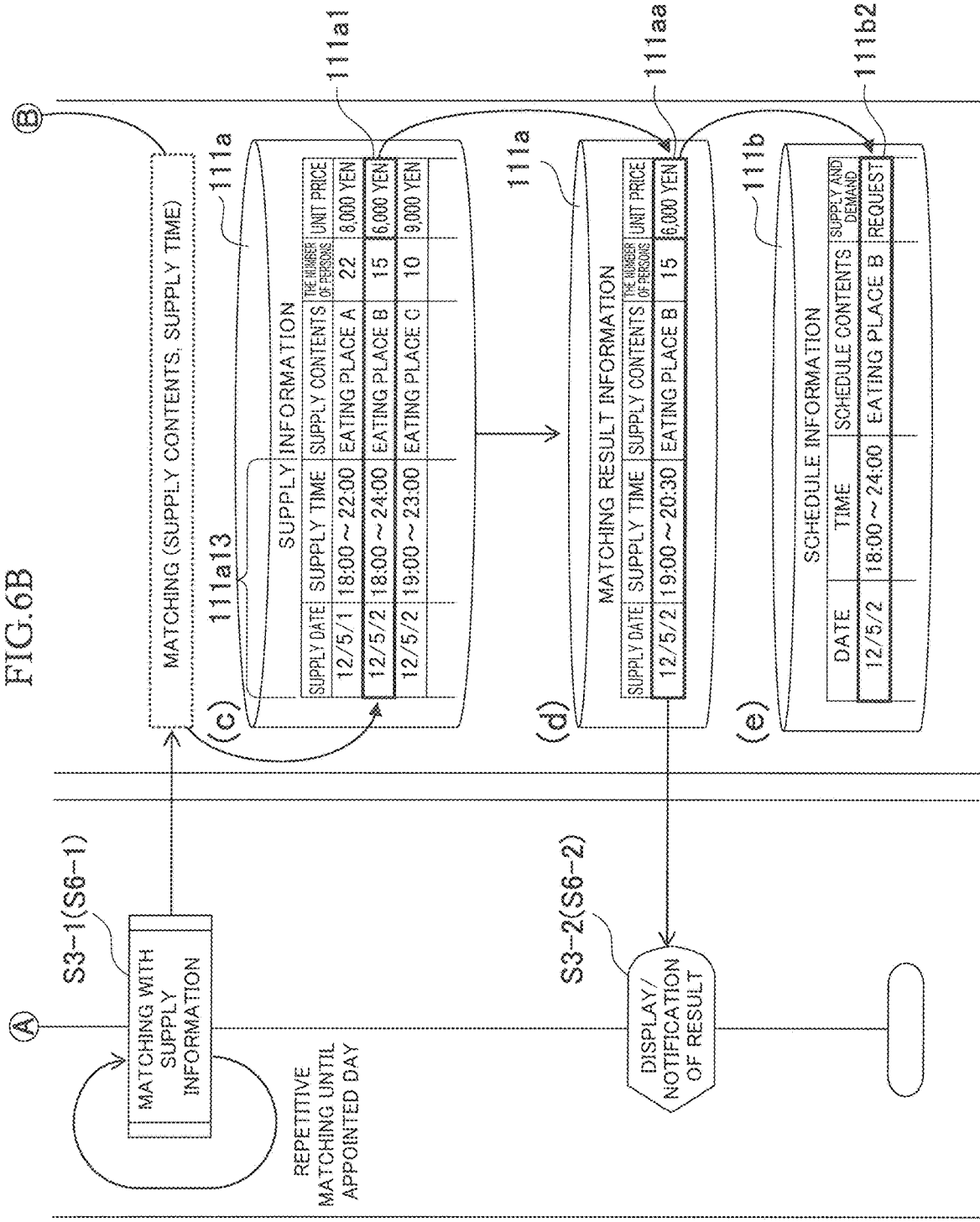
FIG. 6B is a diagram schematically illustrating the transition of the data in the matching performed with the demand information as a trigger, in the matching support device and the matching support system according to the embodiment.

Hereinafter, with reference to FIG. 5 to FIG. 7A and FIG. 7B, specific processing contents of the matching support system 1A in the matching will be described. In these figures, the first numeral in a flowchart coincides with a step number of the time chart illustrated in FIG. 4, and indicates that the processing is related to each other. For instance, it is indicated that both of the processing procedures indicated in "S3-1" and S3-2" in the flowchart illustrated in FIG. 6B are the processing related to "S3" of the time chart in FIG. 4.

FIG. 5 is a flowchart illustrating a main part of the procedures of the matching. In the figure, the figure describes both of the processing procedure of performing the matching in step S3 with the registration of the demand information 112a in step S2 as a trigger from the state that the supply information 111a is registered first in step S1 (step S1 and step S2 in <operation procedure 1>, for instance) as <case 1>, and the processing procedure of performing the matching in step S3 with the registration of the supply information 111a in step S2 as a trigger from the state that the demand information 112a is registered first in step S1 (step S1 and step S2 in <operation procedure 2> to be described later, for instance) as <case 2>.

In FIG. 5, for the convenience of the description, the processing performed only in <case 1> and the processing performed in common in <case 1> and <case 2>, the step numbers are noted the same as the time chart in FIG. 4 (for instance, the descriptions of "step S3-1" and "step S3-2" in the flowchart in FIG. 5 indicate that they are the processing related to "step S3" of the time chart in FIG. 3). For the processing performed only in <case 2>, the step number is indicated by notation for which "'" is attached to the step number of the time chart in FIG. 4 (for instance, the descriptions of "step S3'-1" and "step S3'-2" in the flowchart in FIG. 5 indicate that they are the processing related to "step S3" of the time chart in FIG. 4).

First, <case 1> will be described. After step S1, when a demand request is registered from the consumer terminal 3 or the supplier terminal 2 and the consumer terminal 3 (step S2), the matching unit 12 in FIG. 1 acquires the demand information 112a as trigger origin information (step S3-1), and retrieves the supply information 111a (step S3-2). The matching unit 12 in FIG. 1 determines a matching degree of the demand information 112a and the supply information 111a that are comparison objects with each other (step S3-3), determines reliability (step S3-4), and determines a cost (step S3-5). When both match ("Yes" in step S3-6), the matching unit 12 performs result processing on the basis of a matching result (step S3-7, to be described later), and when they do not match ("No" in step S3-6), the result processing is not performed.

As illustrated in FIG. 5, the similar processing is performed also in steps S5 and S6 (change of registration information and continuous matching) to be described later. However, in the case of steps S5 and S6, in addition to the case of retrieving the supply information 111a with the demand information 112a as the trigger origin information (steps S5, S6-1, and S6-2), the case of retrieving the demand information 112a with the supply information 111a as the trigger origin information (steps S5', S6'-1, and S6'-2) is also possible.

Next, <case 2> will be described. After step S1, when a supply request is registered from the supplier terminal 2 or the supplier terminal 2 and the consumer terminal 3 (step S2'), the matching unit 12 in FIG. 1 acquires the supply information 111a as trigger origin information (step S3'-1), and retrieves the demand information 112a (step S3'-2). The following processing is the same as <case 1> (steps S3-3, S3-4, S3-5, S3-6, and S3-7).

Also, as illustrated in FIG. 5, the similar processing is performed also in steps S5 and S6 (the change of the registration information and the continuous matching) to be described later. However, in the case of steps S5 and S6, in addition to the case of retrieving the demand information 112a with the supply information 111a as the trigger origin information (steps S5', S6'-1, and S6'-2), the case of retrieving the supply information 111a with the demand information 112a as the trigger origin information (steps S5, S6-1, and S6-2) is also possible.

FIG. 6A and FIG. 6B are diagrams schematically illustrating the transition of the data in the matching performed with the demand information 112a as a trigger. A display method of the step numbers in the figures is the same as the flowchart in FIG. 5. Schedule registration of the schedule information 112b is performed in the consumer terminal 3 or the supplier terminal 2 and the consumer terminal 3 (the preliminary procedure 3 in FIG. 6A). After the processing of step S1 (see FIG. 4), in the consumer terminal 3 or the supplier terminal 2 and the consumer terminal 3, when the demand request is registered (step S2 in FIG. 6A) from the schedule registration screen (not shown in the figure) through the weekly schedule display screen 44 (see FIG. 11) or the daily schedule display screen 45 (see FIG. 12), arbitrary schedule information 112b illustrated in (a) in FIG. 6A and arbitrary demand information 112a generated by the demand request registered, which is illustrated in (b) in FIG. 6A, are linked (associated). In the figure, "new employee welcome party" 112b1 included in the schedule information 112b and "restaurant" 112a1 and "karaoke (meaning a shop providing a service of letting a customer sing songs along instrumental accompaniment)" 112a2 included in the demand information 112a (which is a place of the new employee welcome party) are linked. Also, as illustrated in FIG. 6A and FIG. 6B, the "restaurant" 112a1 and the "karaoke" 112a2 have the time information 112a13.

When the matching is performed in this state (step S3-1 in FIG. 6B), the "restaurant" 112a1 included in the demand information 112a and "eating place B" 111a1 included in the supply information 111a, which is illustrated in (c) in FIG. 6B, and for which conditions of the date and the time and contents are adapted to the "restaurant" 112a1 (the matching is established), are linked. As shown in FIGS. 6A and 6B, matching is performed for "eating place B" 111a1 in a state where time information 111a13 is included. That is, in the matching, the matching between the time information 112a13 of the "restaurant" 112a1 and the time information 111a13 of the "eating place B" 111a1 is performed as well.

Then, the "eating place B" 111a1 and the matching result information 111aa illustrated in (d) in FIG. 6B are linked, and the matching result information 111aa is displayed/notified to the supplier terminal 2 and/or the consumer terminal 3 (step S3-2 in FIG. 6B).

The matching result information 111aa is linked with schedule information 111b2 illustrated in (e) in FIG. 6B. From the above, the demand information 112a is generated on the basis of the information of the schedule information 112b registered by the consumer or the supplier and the consumer, and the result of performing the matching with the supply information 111a is reflected on the schedule information 111b of the supplier or the supplier and the consumer.

As illustrated in the figure, the similar processing is performed in steps S5 and S6 as well (step S5 in FIG. 6A, and steps S6-1 and S6-2 in FIG. 6B).

Figure 7A:
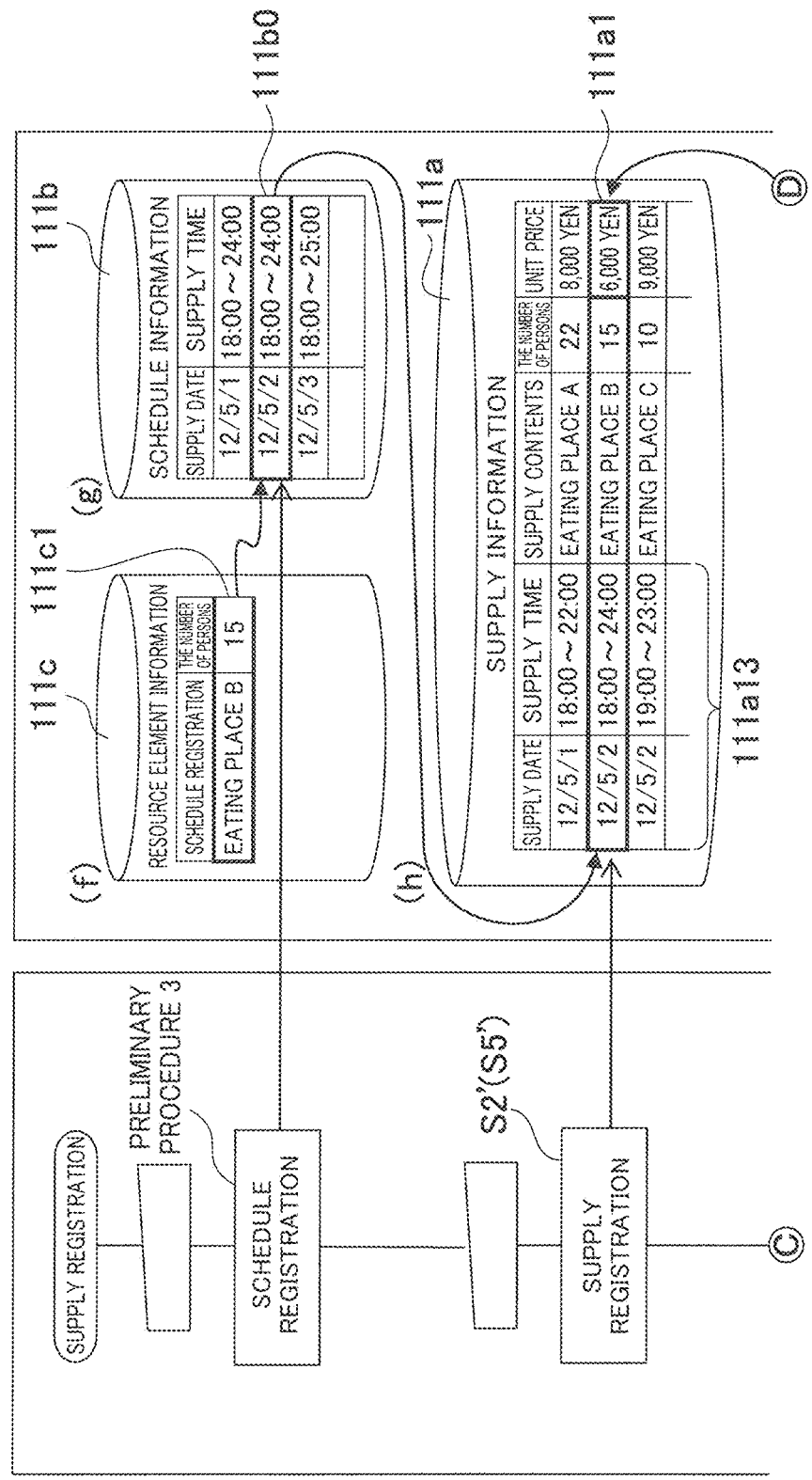
FIG. 7A is a diagram schematically illustrating the transition of the data in the matching performed with the supply information as a trigger, in the matching support device and the matching support system according to the embodiment.

FIG. 7A and FIG. 7B are diagrams schematically illustrating the transition of the data in the matching performed with the supply information 111a as a trigger. The display method of the step numbers in the figures is the same as the flowchart in FIG. 5.

First, in the supplier terminal 2 or the supplier terminal 2 and the consumer terminal 3, the resource element information 111c illustrated in (f) in FIG. 7A is registered (see [preliminary procedure 2]), and the schedule information 111b illustrated in (g) in FIG. 7A is registered (preliminary procedure 3 in FIG. 7A). After the processing of step S1 (see FIG. 4), when the supply request is registered (step S2' in FIG. 7A) from the schedule registration screen (not shown in the figure) through the weekly schedule display screen 44 (see FIG. 11) or the daily schedule display screen 45 (see FIG. 12) or the like, on the basis of arbitrary resource element information 111c and arbitrary schedule information 111b, the supply information 111a illustrated in (h) in FIG. 7A is generated. In FIG. 7A, "eating place B" 111c1 as the resource element information 111c illustrated in (f) in FIG. 7A and "12/5/2, 18:00-24:00" 111b0 which is the information related to the time of the schedule information 111b illustrated in (g) in FIG. 7A are acquired, and they are linked. Also, the figure illustrates the case of generating the "eating place B" 111a1 as the supply information 111a generated by the supply request registration, having the "12/5/2, 18:00-24:00" 111*b*0 as the time information 111*a*13, that is illustrated in (h) in FIG. 7A, on the basis of the acquired information. In this state, the "12/5/2, 18:00-24:00" 111*b*0 illustrated in (g) in FIG. 7A and the "eating place B" 111*a*1 illustrated in (h) in FIG. 7A are linked.

Then, the arbitrary supply information 111*a* illustrated in (h) in FIG. 7A is matched with the arbitrary demand information 112*a* illustrated in (i) in FIG. 7B (step S3'-1 in FIG. 7B), and linked. In the figure, the "eating place B" 111*a*1 included in the supply information 111*a* illustrated in (h) in FIG. 7A and the "restaurant" 112*a*1 included in the demand information 112*a* illustrated in (i) in FIG. 7B, for which the conditions of the date, time and contents are adapted to the "eating place B" 111*a*1 (the matching is established), are linked. Then, the "restaurant" 112*a*1 and the matching result information 112*aa* illustrated in (j) in FIG. 7B are linked, and the matching result information 112*aa* is displayed/notified to the supplier terminal 2 and/or the consumer terminal 3 (step S3'-2). The matching result information 112*aa* and the "new employee welcome party" 112*b*1 included in the schedule information 112*b* illustrated in (k) in FIG. 7B are linked. Thus, the supply information 111*a* is generated on the basis of the information of the schedule information 111*b* registered by the supplier or the supplier and the consumer, and the result of performing the matching with the demand information 112*a* is reflected on the schedule information 112*b* of the consumer or the supplier and the consumer.

As illustrated in FIG. 7A and FIG. 7B, the similar processing is performed also in steps S5' and S6' (step S5' in FIG. 7A, and steps S6'-1 and S6'-2 in FIG. 7B).

In FIG. 6B and FIG. 7B, the pieces of the matching result information 111*aa* and 112*aa* are each illustrated as one piece of data, however, the plurality of pieces of the matching result information 111*aa* and 112*aa* may be generated since they are generated every time the matching is established. Also, in FIG. 6B and FIG. 7B, the pieces of the matching result information 111*aa* and 112*aa* indicate states generated respectively on the side of the supply information 111*a* and on the side of the demand information 112*a*, however, a configuration may be such that the matching result information 111*aa* is generated only on the side of the supply information 111*a* or such that the matching result information 112*aa* is generated only on the side of the demand information 112*a*.

Figure 15:
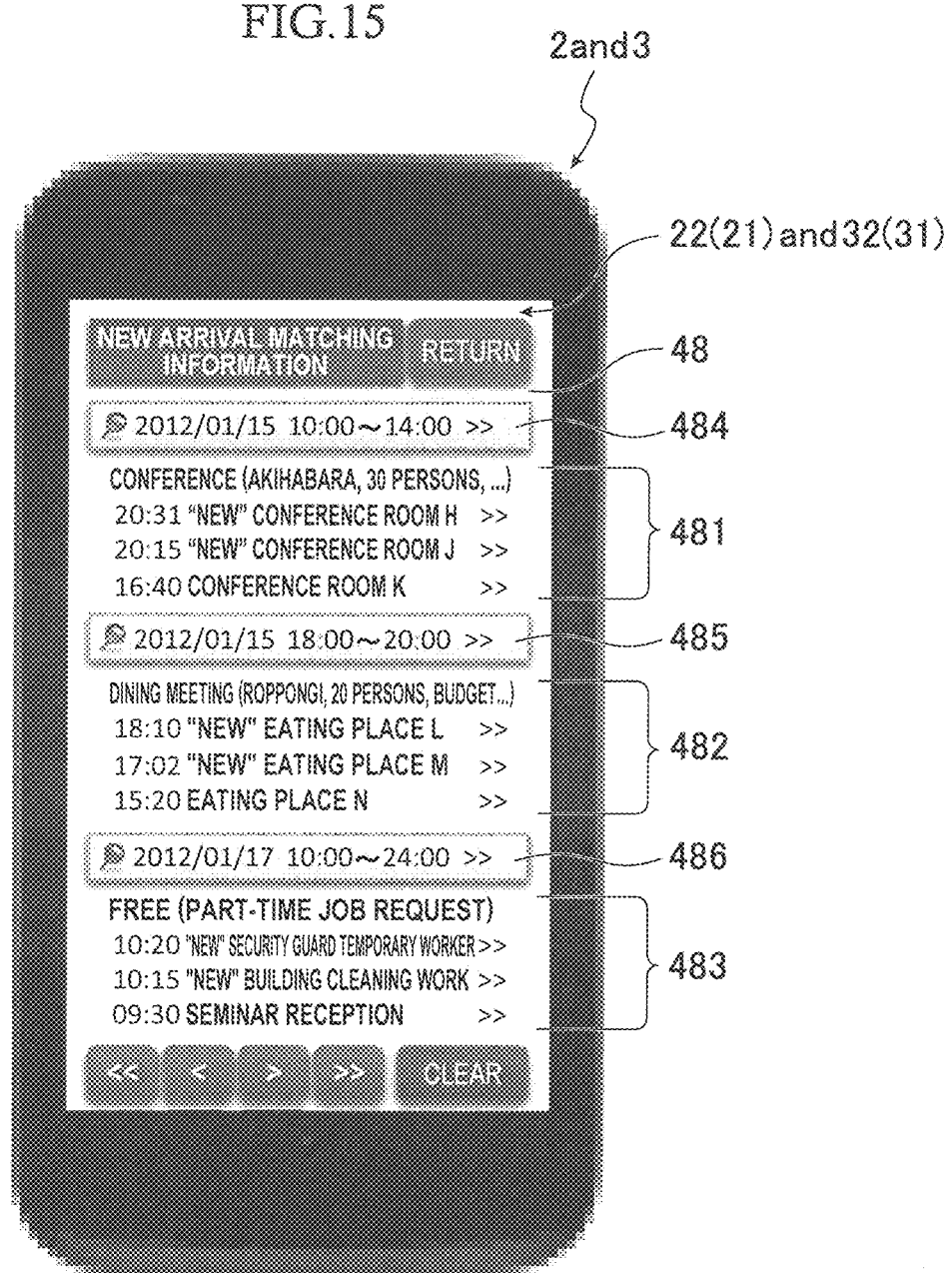
FIG. 15 is a conceptual diagram of a state of displaying a matching result new arrival information screen at the display unit of the consumer terminal and the supplier terminal, in the matching support device and the matching support system according to the embodiment.

When the matching in the matching unit 12 in FIG. 1 in step S3 is established by the above procedure, the result transmission unit 14 in FIG. 1 transmits, to the supplier terminal 2 and the consumer terminal 3, the result of the matching (that is, information on whether or not the matching is established, and with which supply information 111*a* the matching is established or the like). FIG. 15 is a conceptual diagram of a matching result new arrival information screen 48 to be displayed at the supplier terminal 2 and the consumer terminal 3. As illustrated in the figure, on the matching result new arrival information screen 48, of the results of the matching performed on the basis of one, two or more (two, in this case) request registrations (step S2 in FIG. 4) from the consumer terminal 3 or the supplier terminal 2 and the consumer terminal 3, the ones for which the matching is established are displayed as two consumer side matching result lists 481 and 482. Also, on the matching result new arrival information screen 48 illustrated in the figure, of the results of the matching performed on the basis of the registration of one, two or more (one, in this case) supply resource elements from the supplier terminal 2 or the supplier terminal 2 and the consumer terminal 3 in the preparation/storage of the information (step S1 in FIG. 4) and the request registration (step S2 in FIG. 4), the ones for which the date, time and contents are adapted (the matching is established) are displayed as one supplier side matching result list 483. Also when the processing of step S5 and step S6 in FIG. 4 is performed, the result transmission unit 14 performs the similar processing, and as illustrated in FIG. 15, on the matching result new arrival information screen 48, consumer side screen transition buttons 484 and 485 are displayed on the consumer side matching result lists 481 and 482, and a supplier side screen transition button 486 is displayed on the supplier side matching result list 483, respectively.

Also, in FIG. 15, while the matching result new arrival information screen 48 is displayed at the display unit 22 and the display unit 32 of the supplier terminal 2 and the consumer terminal 3, the matching result new arrival information screen 48 is displayed also at the display unit 22 of the supplier terminal 2 or the display unit 32 of the consumer terminal 3. Specifically, when displayed at the display unit 22 of the supplier terminal 2 for instance, on the matching result new arrival information screen 48, only the supplier side matching result list 483 and the supplier side screen transition button 486 illustrated in FIG. 15 are displayed. Also, for instance, when displayed at the display unit 32 of the consumer terminal 3, on the matching result new arrival information screen 48, only the consumer side matching result lists 481 and 482 and the consumer side screen transition buttons 484 and 485 illustrated in FIG. 15 are displayed. While the above description illustrates the state of displaying the matching result new arrival information screen 48 at the display unit 22 and/or the display unit 32 of the supplier terminal 2 and/or the consumer terminal 3 as the result of performing the matching by the processing in step S3, the matching result new arrival information screen 48 is displayed at the display unit 22 and/or the display unit 32 of the supplier terminal 2 and/or the consumer terminal 3 also when the matching is performed by the processing in step S5 and step S6 to be described later.

Figure 17:
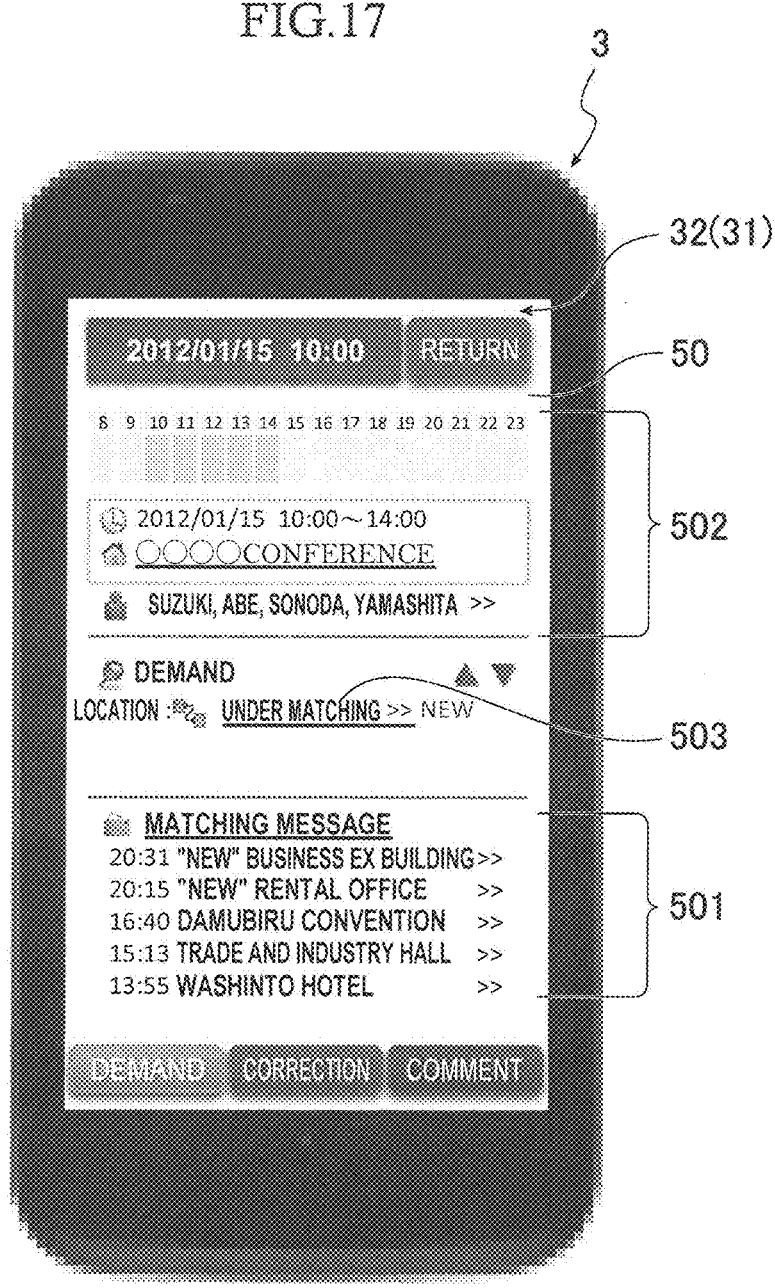
FIG. 17 is a conceptual diagram of a state of displaying the event unit schedule display screen at the display unit of the consumer terminal, in the matching support device and the matching support system according to the embodiment.

For instance, when the consumer side screen transition button 484 is tapped in the state that the matching result new arrival information screen 48 is displayed at the display unit 22 and the display unit 32 of the supplier terminal 2 and the consumer terminal 3, as illustrated in FIG. 15, the supplier terminal 2 and the consumer terminal 3 are to function as the consumer terminal 3 in the procedures after step S3 (however, when the supplier side screen transition button 486 is tapped on the matching result new arrival information screen 48 displayed at the terminal functioning only as the consumer terminal 3, the consumer terminal 3 continuously functions as the consumer terminal 3 in the procedures after step S3 (see FIG. 4)), and as illustrated in the conceptual diagram in FIG. 17, an event unit schedule display screen 50 is displayed at the display unit 32 of the consumer terminal 3. On the event unit schedule display screen 50, a matching result list 501 similar to the matching result new arrival information screen 48 (see FIG. 15) is displayed. On the event unit schedule display screen 50 in the figure, the state of displaying a holding time zone, participants' names, and holding location or the like of the conference at a schedule display part 502 is illustrated. Also, "Suzuki", "Abe", "Sonoda" and "Yamashita" indicated in FIG. 17 all indicate last names of individuals.

Figure 19:
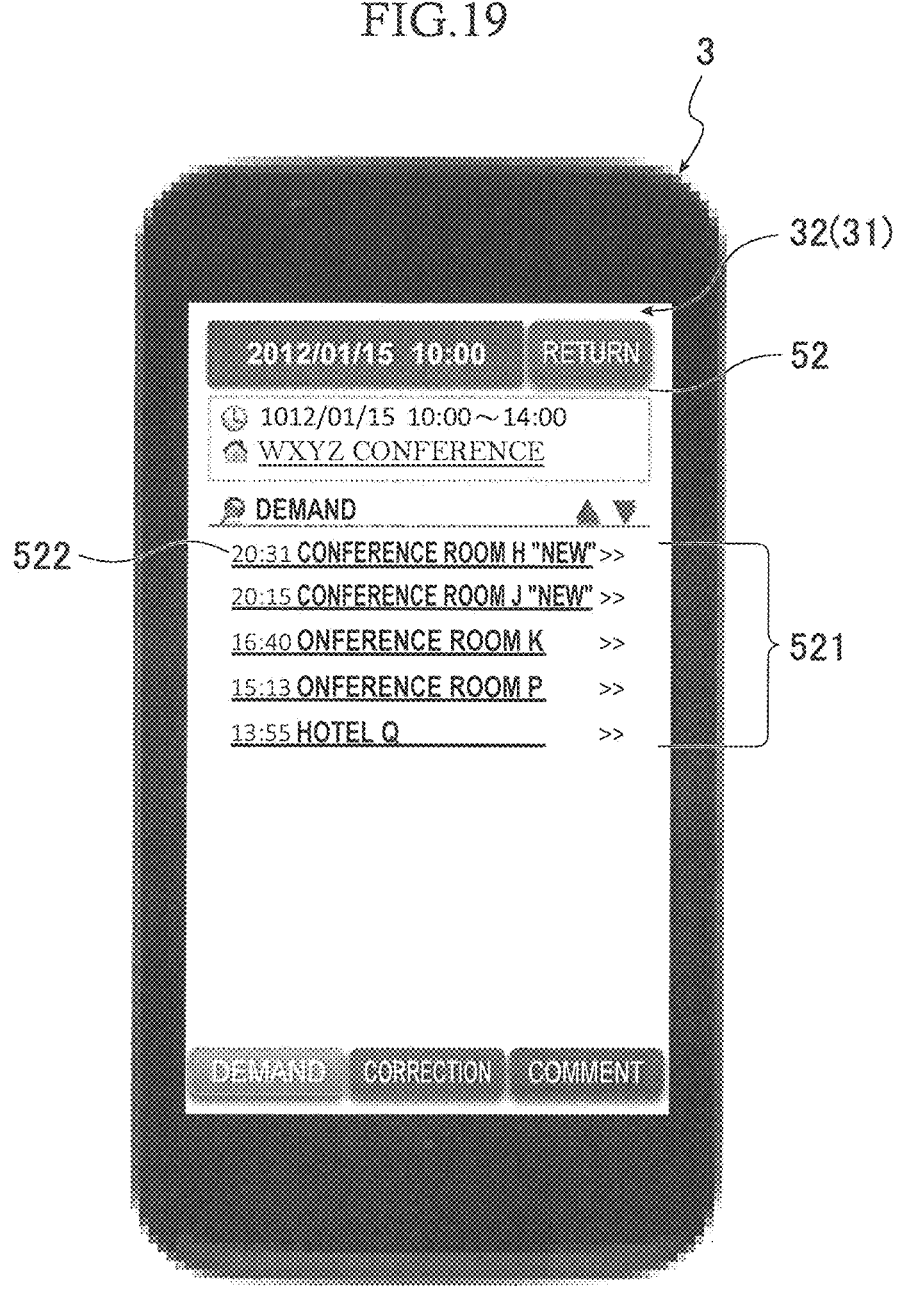
FIG. 19 is a conceptual diagram of a state of displaying the event unit matching result list screen at the display unit of the consumer terminal, in the matching support device and the matching support system according to the embodiment.
Figure 21:
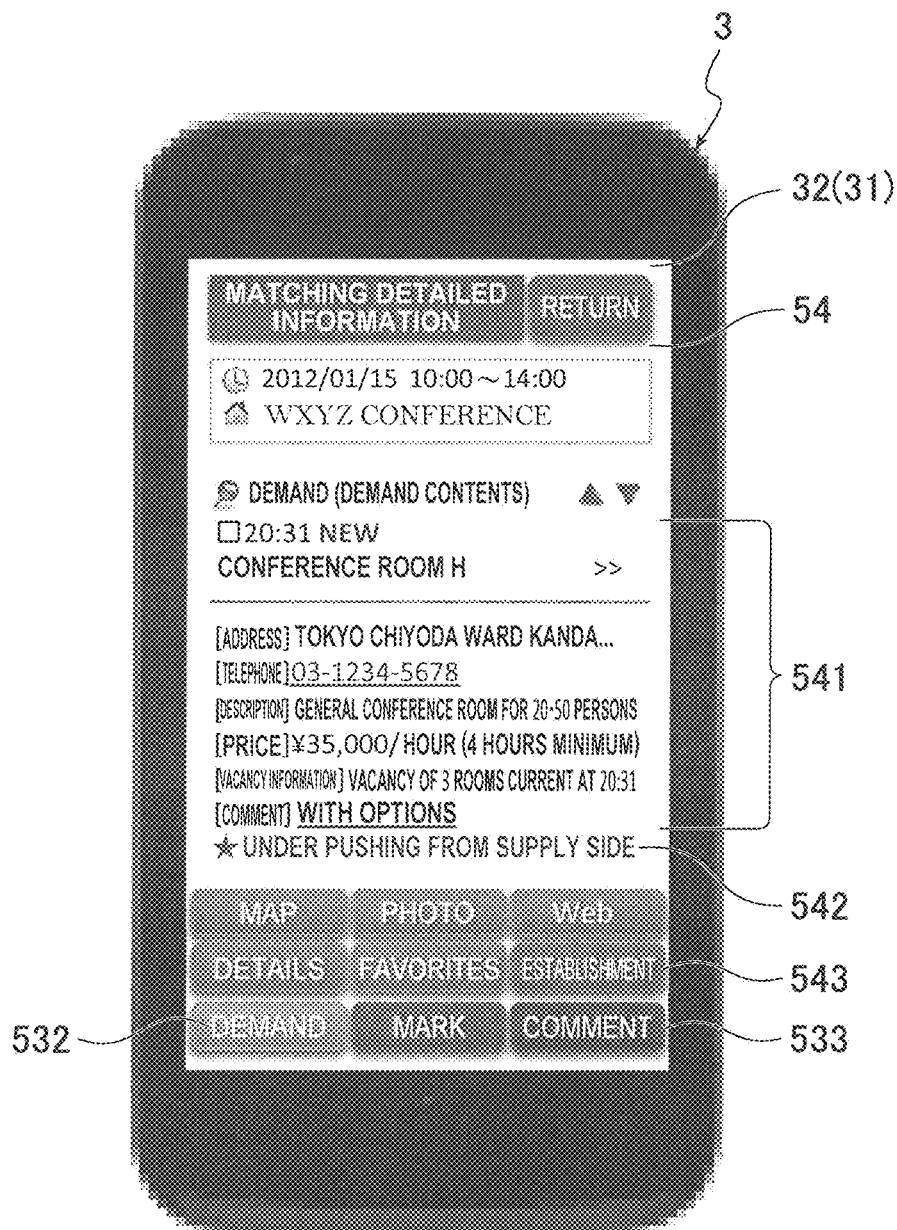
FIG. 21 is a conceptual diagram of a state of displaying the matching result individual information screen at the display unit of the consumer terminal, in the matching support device and the matching support system according to the embodiment.

When a screen transition button 503 is tapped on the event unit schedule display screen 50, an event unit matching result list screen 52 whose conceptual diagram is illustrated in FIG. 19 is displayed. On the event unit matching result list screen 52, differently from the event unit schedule display screen 50 (see FIG. 17), only a matching result list 521 is displayed. On the event unit matching result list screen 52 in FIG. 19, each display of the matching result list 521 is a tap button. For instance, when display 522 at the top in the matching result list 521 in FIG. 19 is tapped, the matching result individual information screen 54 whose conceptual diagram is illustrated in FIG. 21 is displayed. On the matching result individual information screen 54, detailed information 541 of the display 522 at the top of the matching result list 521, which is tapped on the event unit matching result list screen 52 in FIG. 19, is displayed. The consumer using the consumer terminal 3 looks at the information in FIG. 19 and FIG. 21, and can select a candidate preferred event (that is, selection of a conference room or the like).

Figure 16:
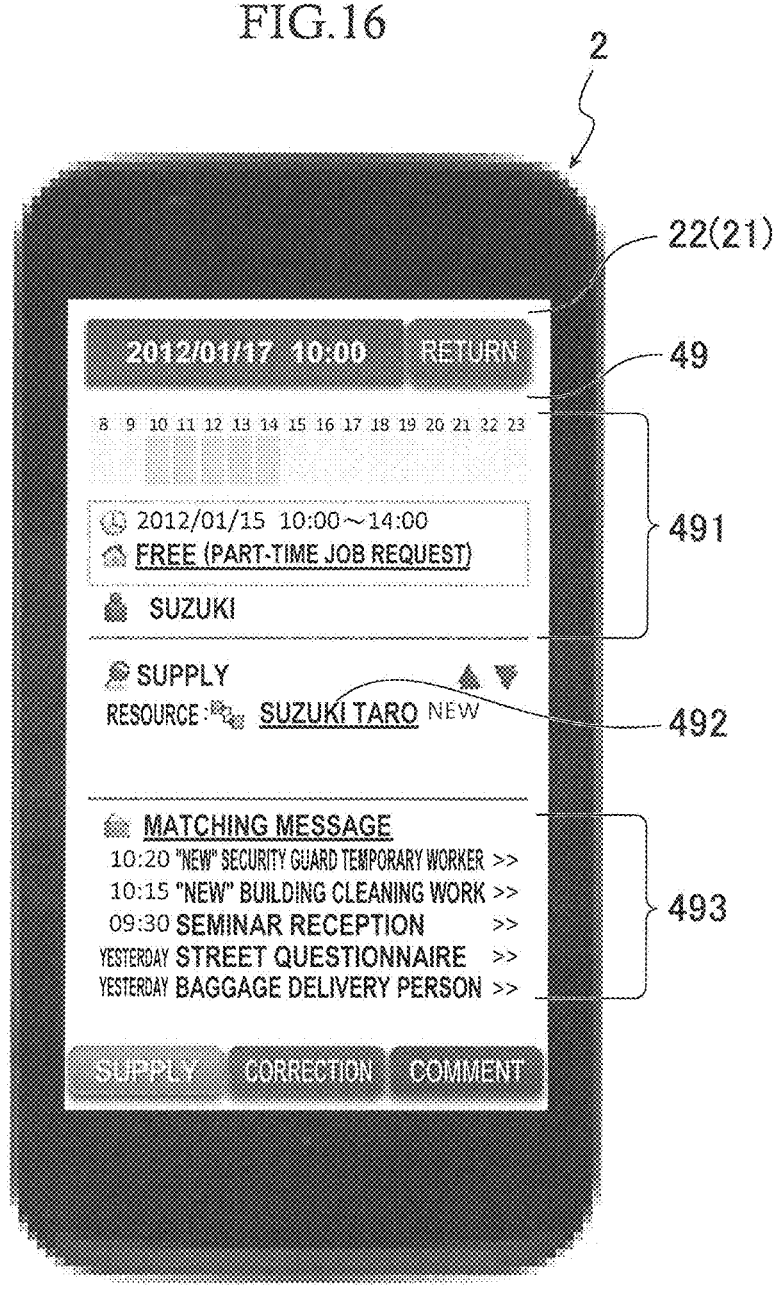
FIG. 16 is a conceptual diagram of a state of displaying an event unit schedule display screen at the display unit of the supplier terminal, in the matching support device and the matching support system according to the embodiment.
Figure 18:
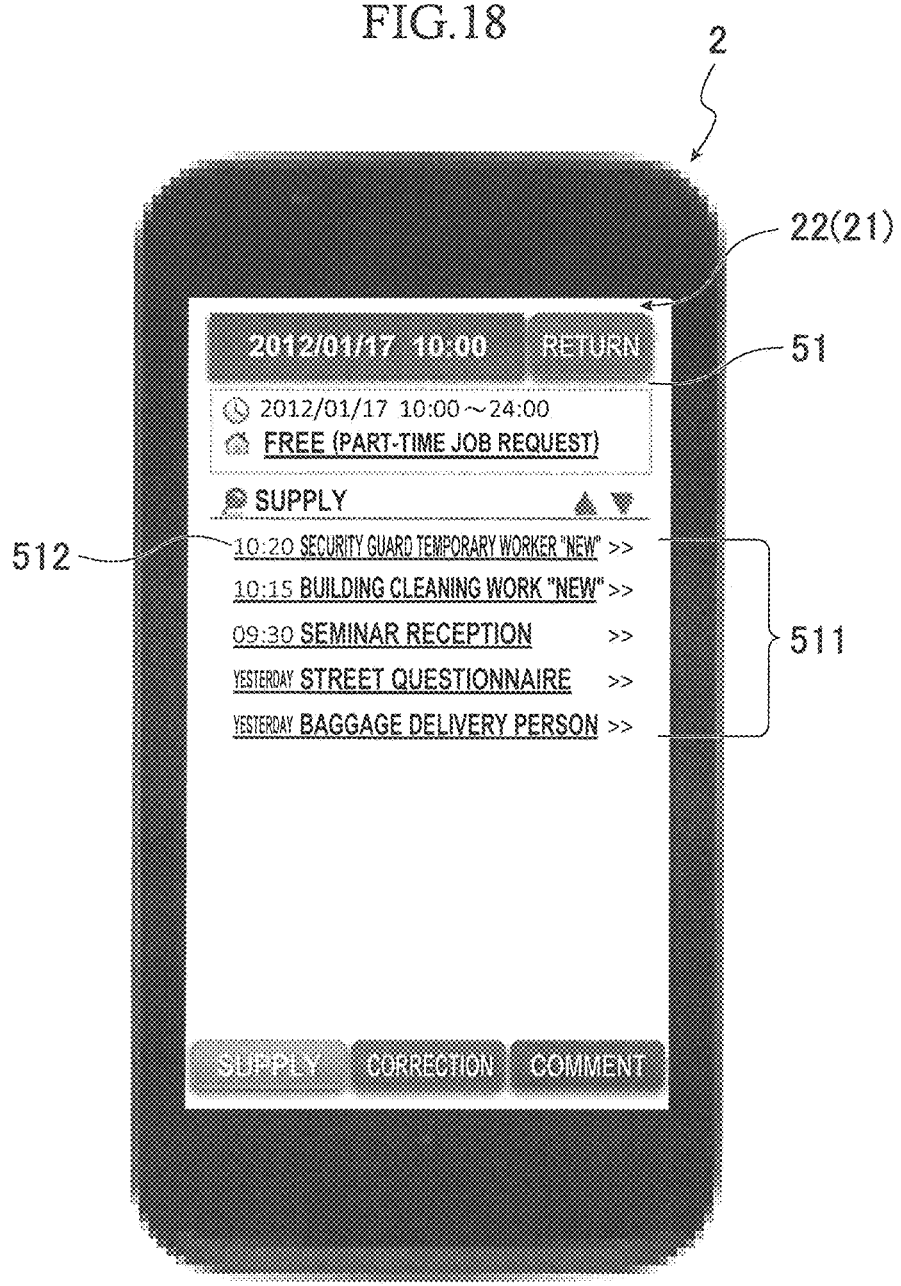
FIG. 18 is a conceptual diagram of a state of displaying an event unit matching result list screen at the display unit of the supplier terminal, in the matching support device and the matching support system according to the embodiment.
Figure 20:
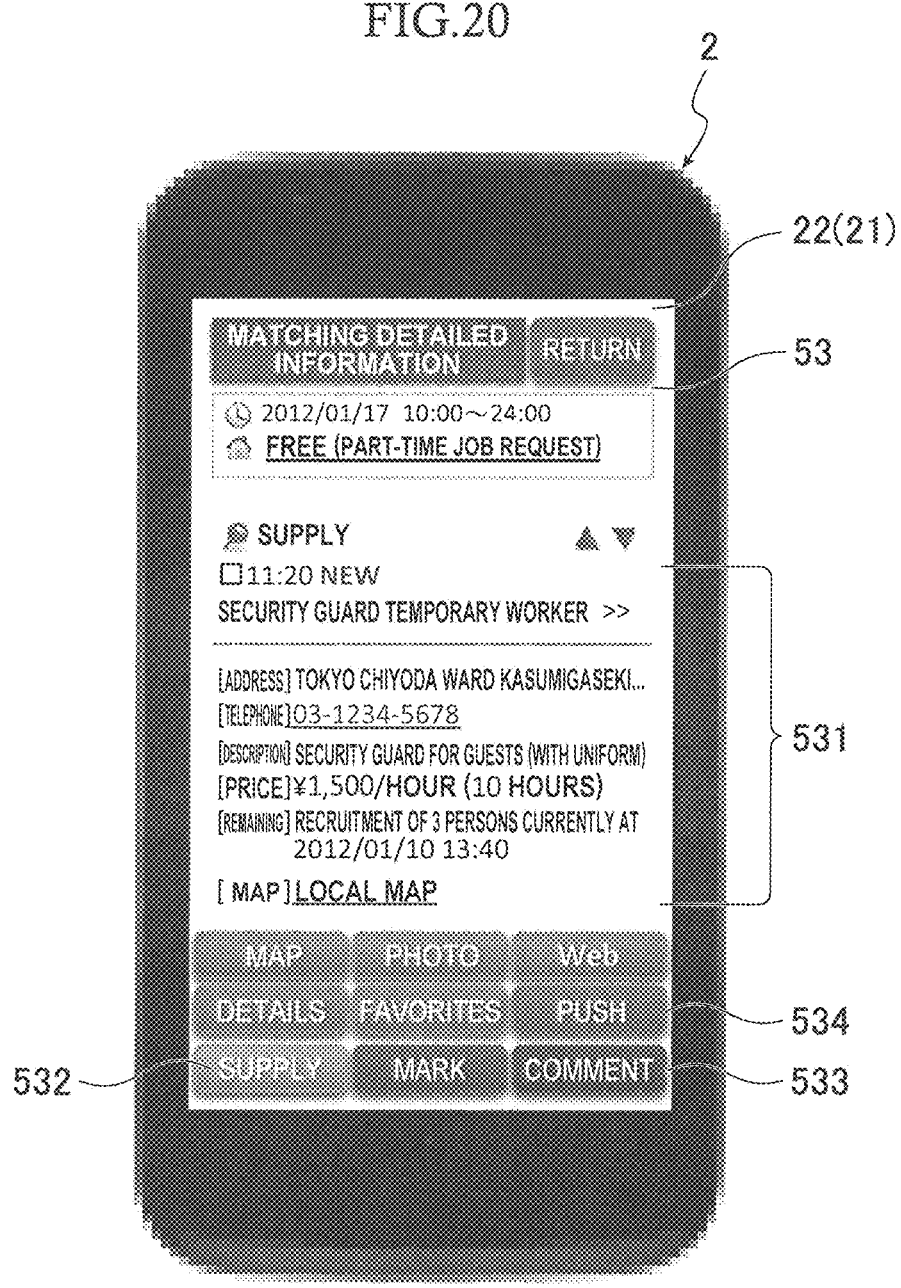
FIG. 20 is a conceptual diagram of a state of displaying a matching result individual information screen at the display unit of the supplier terminal, in the matching support device and the matching support system according to the embodiment.

In the meantime, for instance, when the supplier side screen transition button 486 of the supplier terminal 2 and the consumer terminal 3 is tapped on the matching result new arrival information screen 48 illustrated in FIG. 15, the supplier terminal 2 and the consumer terminal 3 are to function as the supplier terminal 2 in the procedures after step S3 (however, when the supplier side screen transition button 486 is tapped on the matching result new arrival information screen 48 displayed at the terminal functioning only as the supplier terminal 2, the supplier terminal 2 continuously functions as the supplier terminal 2 in the procedures after step S3), an event unit schedule display screen 49 illustrated in FIG. 16 is displayed at the display unit 22 of the supplier terminal 2, and a schedule display part 491, a screen transition button 492, and a matching result list 493 are displayed. Also, "Suzuki" indicated in FIG. 16 is a last name of an individual and "Suzuki Taro" is a full name of the individual. When the screen transition button 492 is tapped, an event unit matching result list screen 51 illustrated in FIG. 18 is displayed, and only a matching result list 511 is displayed. For instance, when display 512 at the top of the matching result list 511 in FIG. 18 is tapped, a matching result individual information screen 53 illustrated in FIG. 20 is displayed, and detailed information 531 is displayed. The supplier looks at the information in FIG. 18 and FIG. 20, and can select the candidate preferred event.

When there is not the supply information 111*a* adapted to the demand information 112*a* as the result of performing the matching in step S3, the demand information 112*a* is recorded in the information recording unit 11. A recording period is, in the case of the demand information 112*a*, until the date and time displayed at an information time limit 472 (see FIG. 14) of the demand information confirmation screen 47, or until the establishment of a transaction (to be described later). However, when periods corresponding to the "(period 4) demand element period" and "(period 5) information reception period" described above are set, a condition may be such that the recording period is until the end of the periods. In the case of the supply information 111*a*, the recording period is until the establishment of a transaction (to be described later), however, when the information time limit is set in [step S1], the condition may be such that the recording period is until the end of the information time period, and when the periods corresponding to the "(period 1) supply element period" and "(period 2) information reception period" described above are set, the condition may be such that the recording period is until the end of the periods.

The result transmission unit 14 transmits the result of the immediate matching to the supplier terminal 2 and the consumer terminal 3 whether the matching is established or not established (step S3). Thus, the supplier and the consumer can quickly confirm the result of the matching, and follow a transaction procedure (for instance, a procedure for establishing a transaction when the matching is established, or a procedure for correcting contents of the demand information 112*a* and the supply information 111*a* when the matching is not established or the like) based on the result of the matching. Also, the result transmission unit 14 can also simplify the processing by transmitting the result of the immediate matching only to either one of the supplier terminal 2 and the consumer terminal 3.

[Step S4. Utilization of Sum-Up Information]

After the immediate matching (step S3) is performed by the request registration (step S2) from the consumer terminal 3, the matching unit 12 prepares sum-up information by the result of the matching. The sum-up information is gathered as the sum-up information (for instance, for the demand information 112*a* and the supply information 111*a* regarding the reservation of a rental conference room, the sum-up information obtained as a result of collecting, for the past fixed period, the data such as the age, sex and address of the consumer and the supplier who have transmitted them, and the desired price zone and desired time zone of the demand information 112*a* and the supply information 111*a* or the like) of the information (for instance, the demand information 112*a* and the supply information 111*a* for which the matching is performed within the past fixed period in order to reserve the rental conference room) for each kind of services and commodities. The matching unit 12 appropriately records the sum-up information as the supply information 111*a*, the demand information 112*a* and the management information 113. The result transmission unit 14 transmits the sum-up information to the supplier terminal 2 as "needs sum-up information", and also transmits it to the consumer terminal 3 as "recommendation sum-up information" (step S4). Thus, the supplier can recognize needs of a market for the information for which the supplier himself/herself lets the matching be performed, examine the supply information 111*a* for which the matching is to be established more easily, and use it for the matching thereafter. Also, the consumer can recognize the contents and prize zone or the like of the service that the consumer himself/herself wants to be provided with. On the basis of the sum-up result, the result transmission unit 14 may transmit the "needs sum-up information" to the supplier terminal 2 only, or may transmit the "recommendation sum-up information" to the consumer terminal 3 only.

[Step S5. Change of Registration Information]

It is assumed that addition/updating/deletion of the supply information 111*a* and/or the demand information 112*a* is performed from the supplier terminal 2 and/or the consumer terminal 3 to the matching support device 1 after the end of the procedures of steps S1-S4 (step S5). It may occur when the demand information 112*a* and the supply information 111*a* for which a transaction is not established (to be described later) are recorded in the information recording unit 11 whether the matching in step S3 is established or not established. Specifically, it includes, for instance, the case when the supply information 111*a* and the demand information 112*a* for which a transaction is not established (to be described later) are present in the information recording unit 11 and there is the registration of new supply information 111*a* by the registration of a new supply resource element, for which the matching is desired, from the schedule registration screen (not shown in the figure) displayed at the display unit 22 and/or the display unit 32 of the arbitrary supplier terminal 2 and/or consumer terminal 3 for the supply information 111*a* and the demand information 112*a*, and the case when there is the registration of new demand information 112*a* by the registration of a new demand resource element. Also, it includes, for instance, the case when, for the already registered supply information 111*a* and demand information 112*a*, the supplier and the consumer who have registered them update or delete the supply information 111*a* and the demand information 112*a* registered by themselves from the schedule registration screen (not shown in the figure) displayed at the display unit 22 and/or the display unit 32 of the supplier terminal 2 and/or the consumer terminal 3.

[Step S6. Continuous Matching]

When the registration information is changed in step S5, with the change of the registration information, that is, the addition/updating/deletion of the supply information 111*a* or the demand information 112*a* performed from the supplier terminal 2 or the consumer terminal 3, as a trigger, the trigger unit 13 uses the trigger information 113*a*, and makes the matching unit 12 perform the matching between the supply information 111*a* and the demand information 112*a* (step S6). Specifically, when the supply information 111*a* is added/updated from the supplier terminal 2 or the demand information 112*a* is added/updated from the consumer terminal 3, the matching unit 12 performs the matching between the added/updated supply information 111*a* or demand information 112*a*, and the demand information 112*a* and the supply information 111*a* for which the matching is not established, and which are recorded in the information recording unit 11. On the other hand, when the supply information 111*a* is deleted from the supplier terminal 2 or the demand information 112*a* is deleted from the consumer terminal 3, the matching unit 12 performs the matching between the demand information 112*a* or the supply information 111*a* for which the matching has been established with the deleted supply information 111*a* or demand information 112*a*, and the demand information 112*a* and the supply information 111*a* for which the matching is not established, and which are recorded in the information recording unit 11, again.

The result transmission unit 14 transmits the result of the matching to the supplier terminal 2 and/or the consumer terminal 3 (step S6). Basically, when the matching is performed newly with the addition/updating of the demand information 112*a* from the consumer terminal 3 or the addition/updating of the supply information 111*a* from the supplier terminal 2 as a trigger, the matching result is transmitted respectively to the supplier terminal 2 and the consumer terminal 3 which have registered and added/updated the supply information 111*a* and the demand information 112*a* that are turned to matching objects. On the other hand, when the matching is performed newly with the deletion of the demand information 112*a* from the consumer terminal 3 or the deletion of the supply information 111*a* from the supplier terminal 2 as a trigger, the matching result is transmitted respectively to the supplier terminal 2 and the consumer terminal 3 which have registered the supply information 111*a* and the demand information 112*a* turned to the matching objects. However, a configuration may be such that the matching result is only for the supplier terminal 2 or only for the consumer terminal 3 which has added/updated the supply information 111*a* and the demand information 112*a*, a configuration may be such that the matching result is only for the supplier terminal 2 or the consumer terminal 3 which has registered the supply information 111*a* or the demand information 112*a* turned to the matching object as a result of the addition/updating of the supply information 111*a* and the demand information 112*a*, a configuration may be such that the matching result is only for the supplier terminal 2 at all times, or a configuration may be such that the matching result is only for the consumer terminal 3 at all times.

In this way, in the matching support system 1A, the matching can be performed in a mode similar to an actual negotiation with a human. Especially, by transmitting the result of the matching to both of the supplier terminal 2 and the consumer terminal 3 used by the interested parties of the matching at all times, the supplier and the consumer are expected to perform negotiations and condition correction so as to easily establish the matching while performing the negotiations on the matching support system 1A.

Further, the matching support system 1A may be configured to transmit the result of the negotiation to the supplier terminal 2 and/or the consumer terminal 3 used by someone other than the matching interested parties. In such a manner, by making the supplier and the consumer other than the interested parties newly participate in the matching and increasing the interested parties, it is made possible to more smoothly and efficiently perform a transaction or the like, and derivation of a better matching result can be expected.

[Step S7. Repetition]

The information recording unit 11, the matching unit 12, the trigger unit 13, and the result transmission unit 14 repeat the procedures of step S4 to step S6 during the information time limit 472 (see FIG. 14) of the demand information 112*a* inputted in step S2 (step S7).

That is, the matching unit 12 prepares the sum-up information on the basis of the result of performing the matching in step S6, and performs transmission of the "needs sum-up information" to the supplier terminal 2 and/or the transmission of the "recommendation sum-up information" to the consumer terminal 3 (step S4).

In the information recording unit 11, when the addition/updating/deletion of the demand information 112*a* by the consumer terminal 3 or the addition/updating/deletion of the supply information 111*a* by the supplier terminal 2 is performed during the information time limit of the supply information 111*a* and the information time limit 472 (see FIG. 14) of the demand information 112*a* (step S5), the trigger unit 13, with the addition/updating/deletion of the demand information 112*a* or the supply information 111*a* as a trigger, uses the trigger information 113*a*, makes the matching unit 12 perform the matching, and transmits the matching result to the supplier terminal 2 and/or the consumer terminal 3 (step S6).

Specifically, for instance, every time of receiving information newly presented at a lower price for the supply information 111*a* of the service or the commodity already presented at an arbitrary price from the supplier terminal 2, or information newly presented at a new desired price zone including a price zone of a higher amount for the demand information 112*a* of the service or the commodity already presented in an arbitrary desired price zone from the consumer terminal 3, or the like, with the reception as a trigger, the matching unit 12 is made to perform the matching (step S5, step S6). However, when the supply information 111*a* or the demand information 112*a* is added or corrected by the supplier or the consumer tapping the execution button 463 on the supply information confirmation screen 46 (FIG. 13) or the demand information confirmation screen 47 (FIG. 14), the matching unit 12 performs the immediate matching similar to step S3.

In the process of step S5 and step S6, the supplier and the consumer can achieve the actual negotiation with a human in a pseudo manner, in the state of displaying the matching result individual information screens 53 and 54 (see FIG. 20 and FIG. 21) or the like at the supplier terminal 2 and/or the consumer terminal 3. For instance, the matching result individual information screens 53 and 54 (see FIG. 20 and FIG. 21) or the like are displayed at the supplier terminal 2 and/or the consumer terminal 3, a correction screen (not shown in the figure) is displayed at the display unit 22 and/or the display unit 32 by tapping a correction button 532 (the button where "supply" is displayed in FIG. 20 and "demand" is displayed in FIG. 21), and the contents of the supply information 111*a* or the demand information 112*a* provided by the supplier or the consumer himself/herself can be corrected. Also, by tapping a comment button 533, a message transmission/reception screen (not shown in the figure) is displayed at the display unit 22 and/or the display unit 32, and a message is transmitted to the arbitrary supplier terminal 2 and/or the consumer terminal 3.

Further, as illustrated in FIG. 20, the matching result individual information screen 53 of the supplier terminal 2 is provided with a push button 534. By tapping the push button 534, the supplier can transmit a signal for notifying that there is a strong intention of the matching for the arbitrary demand information 112*a* displayed on the matching result individual information screen 53. When pushing by the push button 534 is performed, as illustrated in FIG. 21, push reception display 542 is displayed on the matching result individual information screen 54 of the consumer terminal 3.

The case of utilizing transmission by the push button 534 includes, for instance, the case that the demand information 112*a* is position offer information of "wanting a part-time worker" and the supplier using the supplier terminal 2 is a job hunter. That is, in this case, when the supplier finds the position offer information for which the supplier especially wants to work, the supplier taps the push button 534 as the display of the intention of "especially desiring employment" for the position offer information. Thus, the supplier can easily display the strong intention for the matching with the arbitrary demand information 112*a*, and the consumer can easily recognize the degree of the intention for transaction establishment for each supplier.

Every time the matching unit 12 performs the matching, the result transmission unit 14 transmits the result of the matching to the supplier terminal 2 and/or the consumer terminal 3 whether the matching is established or not established (step S6). Further, every time the matching unit 12 performs the matching, the result transmission unit 14 transmits the information similar to that in step S4 to the supplier terminal 2 and/or the consumer terminal 3. By transmitting the result of the matching to the supplier terminal 2 and/or the consumer terminal 3, an opportunity of transmitting the supply information 111*a* and the demand information 112*a* presented by the supplier and the consumer themselves again as updating information corrected into a form for easily establishing the matching can be given to the supplier and the consumer. Therefore, the opportunity of a pseudo transaction negotiation is provided for the consumer and the supplier who perform the matching, and the matching is easily established as the result of the pseudo transaction negotiation.

The result transmission unit 14 is also capable of transmitting the result of the matching obtained by repeating step S4 to step S6 to the supplier terminal 2 and/or the consumer terminal 3 satisfying an arbitrary condition, other than the supplier terminal 2 and/or the consumer terminal 3 which have transmitted the supply information 111*a* and the demand information 112*a* which are the matching objects.

For instance, when the supply information 111*a* which is the matching object is related to provision of a rental conference room, the result transmission unit 14 is capable of transmitting the information related to the result of the matching (information such as the desired date and time, the desired seating capacity of the room, desired conference room location and a desired price or the like that are desired conditions of the consumer related to the demand information 112*a* for which the matching is performed, and information such as the seating capacity, location and rental charge or the like of the conference room provided by the supplier related to the supply information 111*a* for which the matching is performed) to the supplier terminal 2 of the trader in the same business of the rental conference rooms in a neighboring area. Also, when the demand information 112*a* which is the matching object is related to the purchase desire of a specific commodity, the result transmission unit 14 is capable of transmitting the supply information 111*a* for which the matching is performed to the consumer terminal 3 of the consumer who desires the purchase of the same commodity. Thus, while causing competitions of the supply and the demand between the suppliers with each other or the consumers desiring the provision of the same service or commodity with each other and activating the transaction, the matching result of a preferable condition is easily obtained.

If the matching between the demand information 112*a* and the supply information 111*a* is established in the procedures of step S5 and step S6 during a period of the information time limit of the supply information 111*a* or the information time limit 472 (see FIG. 14) of the demand information 112*a* (except for the case that the processing of step S8 to be described later is performed), the matching unit 12 records established matching information in the information recording unit 11, and holds the established matching information. In this state of "holding the matching information", though the matching is established, it is not the state that the consumer and/or the supplier establishes a transaction on the basis of the result of the matching. That is, in the state of "holding the matching information", the matching unit 12 handles the supply information 111*a* and/or the demand information 112*a* which is the result of the matching establishment in the state of tentatively holding it as a candidate to establish the transaction finally by the consumer and/or the supplier.

In such a manner, the matching unit 12 continuously performs the matching for at least either one of the demand information 112*a* and the supply information 111*a* related to the established matching information. That is, during the information time limit of the supply information 111*a* or the information time limit 472 (see FIG. 14) of the demand information 112*a*, or before the transaction is established by the processing of the consumer or the supplier, for the demand information 112*a* or the supply information 111*a* for which the matching is established, every time the addition/updating is performed to the demand information 112*a* or the supply information 111*a* or other supply information 111*a* or demand information 112*a* (step S5) or the other supply information 111*a* or demand information 112*a* is deleted (step S5), the matching unit 12 repeats (step S7) the continuous matching with the supply information 111*a* or the demand information 112*a* (step S6) with the addition/updating/deletion of the supply information 111*a* or the demand information 112*a* as a trigger. Then, every time the matching by the matching unit 12 is performed, the result transmission unit 14 repeats (step S7) the transmission of the matching result to the supplier terminal 2 and/or the consumer terminal 3 (step S6). Also, every time the matching unit 12 performs the matching, the matching unit 12 gathers the sum-up information, and the result transmission unit 14 repeats (step S7) the transmission of the "needs sum-up information" to the supplier terminal 2 and/or the transmission of the "recommendation sum-up information" to the consumer terminal 3 (step S4). At the time, for the supply information 111a in the state that the matching is already established and the matching information is held, the matching unit 12 may inhibit new matching with the other demand information 112a during the information time limit 472 (see FIG. 14).

In this way, by tentatively holding the supply information 111a and the demand information 112a related to the matching information for which the matching is established during the information time limit of the supply information 111a and the information time limit 472 (see FIG. 14) of the demand information 112a, and making the further matching be performed on the basis of the supply information 111a and the demand information 112a, the consumer and/or the supplier can select the best one suited to his/her preference from the held supply information 111a and demand information 112a during the period of the information time limit of the supply information 111a and the information time limit 472 (see FIG. 14) of the demand information 112a and/or after the end of the information time limit of the supply information 111a and the information time limit 472 (see FIG. 14) of the demand information 112a, as described later. Thus, the consumer or the supplier can be provided with an opportunity to select the best one from the services and the commodities or the like adapted to the conditions of the matching and perform a better transaction.

The processing of step S4-step S6 is repeated (step S7) until the matching unit 12 receives an instruction to end the matching based on the supply information 111a and the demand information 112a transmitted from the supplier terminal 2 and/or the consumer terminal 3, or until the period of the information time limit of the supply information 111a and/or the information time limit 472 (see FIG. 14) of the demand information 112a is ended, or until the transaction is established.

[Step S8. Completion of Matching]

It is assumed that, after the matching is established by the processing of steps S3-S7, a transaction is established during the period of the information time limit of the supply information 111a and the information time limit 472 (see FIG. 14) of the demand information 112a or after the end of the period.

Here, "transaction establishment", "the establishment of a transaction", and "the fact that a transaction is established" mean that one of the following (establishment condition 1) and (establishment condition 2) is satisfied.

(Establishment Condition 1) the Consumer Indicates the intention of transaction application by selecting the one most suited to his/her own needs from the supply information 111a for which the matching is established, and simultaneously with the point of time when the intention of the transaction application is indicated, or after the point of time when the intention of the transaction application is indicated, the intention of the transaction application or the intention of application acceptance is indicated to the consumer from the supplier who has registered the supply information 111a.

(Establishment condition 2) The supplier indicates the intention of transaction application by selecting the one most suited to his/her own needs from the demand information 112a for which the matching is established, and simultaneously with the point of time when the intention of the transaction application is indicated, or after the point of time when the intention of the transaction application is indicated, the intention of the transaction application or the intention of application acceptance is indicated to the supplier from the consumer who has registered the demand information 112a.

Specifically, for instance, it includes the case of being adapted to the following (pattern 1) and (pattern 2) when two or more pieces of the demand information 112a and supply information 111a (for which the matching is established with the supply information 111a and the demand information 112a registered by supplier and the consumer themselves) are presented respectively on both of the supplier side and the consumer side as the matching result.

(Pattern 1) One side of the supplier and the consumer indicates the intention of the transaction application to the other side, the other side which receives the transaction application indicates the intention of the application acceptance to the one side in the form of receiving it (that is, recognizing that the intention of the transaction application is indicated from the one side), and thus the supplier and the consumer agree with the transaction. It corresponds to "after the point of time when the intention of the transaction application is indicated, . . . the intention of application acceptance is indicated . . . " in the (establishment condition 1) and (establishment condition 2).

(Pattern 2) Both of the supplier and the consumer indicate the intention of the transaction application in the same time period (that is, within an arbitrary time zone set beforehand), and the supplier and the consumer agree with the transaction without confirming the intention of the application acceptance from an opposite side to which the intention of the transaction application is indicated. It corresponds to "simultaneously with the point of time when the intention of the transaction application is indicated . . . , the intention of the transaction application . . . is indicated . . . " in the (establishment condition 1) and (establishment condition 2).

In the meantime, the case not pertinent to the (establishment condition 1) and (establishment condition 2) is handled as "transaction non-establishment" or "non-establishment of a transaction".

The intention of the transaction application and the intention of the application acceptance of the consumer and the supplier are indicated by tapping various kinds of buttons displayed at the consumer terminal 3 and the supplier terminal 2, such as tapping a transaction application button 543 displayed at the consumer terminal 3 and a transaction application button (not shown in the figure) displayed at the supplier terminal 2. However, it may be indicated by the other methods, for instance, by communication by telephones or mail or the like or face-to-face communication of the supplier and the consumer or the like.

Concrete descriptions will be given for "transaction establishment", "the establishment of a transaction", and "the fact that a transaction is established". For instance, when the matching is established, on the matching result individual information screen 53 of the supplier terminal 2, that is illustrated in FIG. 20, and the matching result individual information screen 54 of the consumer terminal 3, that is illustrated in FIG. 21, a combination of the supply information 111a and the demand information 112a, for which the matching is established, is displayed. In the state, when the intention of the transaction application and the intention of the application acceptance are displayed from the supplier and the consumer as illustrated in the following <case 1> to <case 4>, a transaction is established.

<Case 1> The consumer using the consumer terminal 3 taps the transaction application button 543 to indicate the intention of the transaction application to arbitrary supply information 111a, and simultaneously with the indication of the intention of the transaction application, or after the point of time when the intention of the transaction application is indicated, the intention of the application acceptance of the supplier is automatically indicated by the processing of the matching unit 12, regardless of the presence/absence of the tapping of the transaction application button (not shown in the figure).

<Case 2> The consumer using the consumer terminal 3 taps the transaction application button 543 to indicate the intention of the transaction application to the arbitrary supply information 111a, and simultaneously with the indication of the intention of the transaction application, or after the point of time when the intention of the transaction application is indicated, the intention of the transaction application or the intention of the application acceptance of the supplier is indicated by the tapping of the transaction application button (not shown in the figure) displayed at the supplier terminal 2 or the like by the supplier who has registered the supply information 111a.

<Case 3> The supplier using the supplier terminal 2 taps the transaction application button (not shown in the figure) to indicate the intention of the transaction application to arbitrary demand information 112a, and simultaneously with the indication of the intention of the transaction application, or after the point of time when the intention of the transaction application is indicated, the intention of the application acceptance of the consumer is automatically indicated by the processing of the matching unit 12, regardless of the presence/absence of the tapping of the transaction application button 543.

<Case 4> The supplier using the supplier terminal 2 taps the transaction application button (not shown in the figure) to indicate the intention of the transaction application to arbitrary demand information 112a, and simultaneously with the indication of the intention of the transaction application, or after the point of time when the intention of the transaction application is indicated, the intention of the transaction application or the intention of the application acceptance of the consumer is indicated by the tapping of the transaction application button 543 displayed at the consumer terminal 3 or the like by the consumer who has registered the demand information 112a.

Also, "automatically . . . the intention of the transaction application is indicated" in the <case 1> and <case 3> is the setting in which, when the matching unit 12 acquires information indicating the intention of the transaction application to the supply information 111a and the demand information 112a, the matching unit 12 automatically returns the information indicating the intention of the application acceptance of the supplier who has registered the supply information 111a and the information indicating the intention of the application acceptance of the consumer who has registered the demand information 112a under an arbitrary condition (for instance, until the number of the intentions of the transaction application acquired by the matching unit 12 for each supply information 111a and demand information 112a reaches a preset arbitrary number) (hereinafter, the same applies in the present description). The matching support device 1 of the present embodiment can be configured so that the supplier and the consumer can select such setting by using the supplier terminal 2 and the consumer terminal 3.

The <case 1> and <case 2> will be described in more detail. When the consumer uses the consumer terminal 3 and taps the transaction application button 543 in the state that arbitrary detailed information 541 is displayed on the matching result individual information screen 54, the supply information 111a to be the origin of the detailed information 541 is selected. The matching unit 12 records the information indicating that the selection is made from the consumer in the selected supply information 111a. However, the matching unit 12 may record the information indicating that the supply information 111a is selected from the consumer, as the data other than the supply information 111a. In this state, when the intention of the application acceptance of the supplier is automatically indicated by the processing of the matching unit 12 (the <case 1>) or when the intention of the transaction application or the intention of the application acceptance of the supplier is indicated by the tapping of the transaction application button (not shown in the figure) displayed at the supplier terminal 2 by the supplier who has registered the supply information 111a (the <case 2>), handling is performed assuming that the transaction is established between the supplier and the consumer. Specifically, when receiving a signal transmitted from the supplier terminal 2 by the tapping of the transaction application button (not shown in the figure) of the supplier terminal 2, the matching unit 12 performs the processing assuming that the transaction is established between the supplier and the consumer (for instance, the processing of displaying character information indicating that the transaction is established at the display unit 22 of the supplier terminal 2 and the display unit 32 of the consumer terminal 3, or the processing of recording the information indicating that the transaction is established in the supply information 111a and the demand information 112a, or the like). However, the processing assuming that the transaction is established between the supplier and the consumer may be performed in a configuration other than the matching unit 12 or a configuration other than the matching support device 1. Also, the intention of the transaction application or the intention of the application acceptance of the supplier and the consumer is displayed by acquiring the information transmitted from the supplier terminal 2 and the consumer terminal 3 by the matching unit 12 of the matching support device 1 in principle, and matching unit 12 of the matching support device 1 performs the processing for assuming that the transaction is established by automatic processing in principle, however, instead, an operator who manages and operates the matching support device 1 may acquire the information indicating the intention of the transaction application or the intention of the transaction acceptance by oral communication by a telephone or the like or communication through communication means of FAX or mail or the like from the supplier and the consumer, and the operator may perform handling assuming the transaction is established by inputting the acquired information to the matching support device 1 by a manual operation. By the establishment of the transaction, the transaction or the like is ended.

Also, in the case that the push button 534 is tapped on the matching result individual information screen 53 of the supplier terminal 2 illustrated in FIG. 20 and push reception display 542 is displayed for the arbitrary supply information 111a on the matching result individual information screen 54 of the consumer terminal 3 as illustrated in FIG. 21, when the consumer taps the transaction application button 543 on the matching result individual information screen 54 of the consumer terminal 3 illustrated in FIG. 21 and the intention of the application acceptance of the supplier is automatically indicated by the processing of the matching unit 12 (the <case 1>) or when the intention of the transaction application or the intention of the application acceptance of the supplier is indicated by the tapping of the transaction application button (not shown in the figure) displayed at the supplier terminal 2 by the supplier who has registered the supply information 111*a* (the <case 2>), handling is performed assuming that the transaction is established between the supplier and the consumer.

The <case 3> and <case 4> will be described in more detail. For instance, it is assumed that, during the period of the information time limit of the supply information 111*a* and the information time limit 472 (see FIG. 14) of the demand information 112*a* or after the end of the period, in the state that the matching is already established and one, two or more pieces of matching information are held, the supplier taps the transaction application button (not shown in FIG. 20) on the matching result individual information screen 53 illustrated in FIG. 20 and the supplier selects the one most adapted to his/her own needs from the demand information 112*a* for which the matching is established.

In this case, on the matching result individual information screen 53, the demand information 112*a* related to the matching information in the state of being recorded and held in the information recording unit 11 in step S3 to step S7 is displayed. The supplier selects one piece of the demand information 112*a* most adapted to his/her own needs from these pieces of the demand information 112*a* using the supplier terminal 2, and when the intention of the application acceptance of the consumer is automatically indicated by the processing of the matching unit 12 (the <case 3>) and when the intention of the transaction application or the intention of the application acceptance of the consumer is indicated by the tapping of the transaction application button 543 displayed at the consumer terminal 3 by the consumer who has registered the demand information 112*a* (the <case 4>), the matching unit 12 records the information indicating that the selection is made from the supplier in the selected demand information 112*a* and the demand information 112*a* for which the intention of the transaction application or the intention of the application acceptance is indicated. However, the matching unit 12 may record the information indicating that the demand information 112*a* is selected from the supplier as the data other than the demand information 112*a*. By the above-described processing being performed, handling is performed assuming that the transaction is established between the supplier and the consumer.

That is, when the supplier uses the supplier terminal 2 and taps the transaction application button (not shown in FIG. 20) in the state that arbitrary detailed information 531 is displayed on the matching result individual information screen 53, the demand information 112*a* to be the origin of the detailed information 531 is selected. In the state, when the intention of the application acceptance of the consumer is automatically indicated by the processing of the matching unit 12 (the <case 3>) and when the intention of the transaction application or the intention of the application acceptance of the consumer is indicated by the tapping of the transaction application button 543 displayed at the consumer terminal 3 by the consumer who has registered the demand information 112*a* (the <case 4>), handling is performed assuming that the transaction is established between the supplier and the consumer. Specifically, when receiving a signal transmitted from the consumer terminal 3 by the tapping of the transaction application button 543 of the consumer terminal 3, the matching unit 12 performs the processing assuming that the transaction is established between the supplier and the consumer (for instance, the processing of displaying character information indicating that the transaction is established at the display unit 22 of the supplier terminal 2 and the display unit 32 of the consumer terminal 3, or the processing of recording the information indicating that the transaction is established in the supply information 111*a* and the demand information 112*a*, or the like). However, the processing assuming that the transaction is established between the supplier and the consumer may be performed in a configuration other than the matching unit 12 or a configuration other than the matching support device 1. Also, the intention of the transaction application or the intention of the application acceptance of the supplier and the consumer is displayed by acquiring the information transmitted from the supplier terminal 2 and the consumer terminal 3 by the matching unit 12 of the matching support device 1 in principle, and matching unit 12 of the matching support device 1 performs the processing for assuming that the transaction is established by automatic processing in principle, however, instead, an operator who manages and operates the matching support device 1 may acquire the information indicating the intention of the transaction application or the intention of the transaction acceptance by oral communication by a telephone or the like or communication through communication means of FAX or mail or the like from the supplier and the consumer, and the operator may perform handling assuming the transaction is established by inputting the acquired information to the matching support device 1 by a manual operation.

After the arbitrary supply information 111*a* is selected in the consumer terminal 3 and the arbitrary demand information 112*a* is selected in the supplier terminal 2, the matching unit 12 deletes the supply information 111*a* not selected by the consumer terminal 3 and the demand information 112*a* not selected by the supplier terminal 2 from the information recording unit 11 to dissolve the state that they are held, and returns the state to the state before the matching is performed in the procedures of step S3 to step S7. That is, the matching unit 12 returns the supply information 111*a* not selected by the consumer terminal 3 and the demand information 112*a* not selected by the supplier terminal 2 to the state that the matching is not performed with the selected demand information 112*a* and supply information 111*a*. Specifically, in the state illustrated in FIG. 6A and FIG. 6B for instance, when the "eating place B" 111*a*1 included in the supply information 111*a* illustrated in (c) in FIG. 6B is not selected by the consumer, the state that the "eating place B" 111*a*1 and the "restaurant" 112*a*1 included in the demand information 112*a* illustrated in (b) in FIG. 6A are linked is returned to the state that the link is canceled. Similarly, when the arbitrary demand information 112*a* is not selected by the supplier, the state that the arbitrary demand information 112*a* and the supply information 111*a* of the supplier are linked is returned to the state that the link is canceled. Thus, the matching is ended (step S8).

It is assumed that, before the end of the information time limit 472 (see FIG. 14) of the demand information 112*a* and the information time limit of the supply information 111*a*, for the supply information 111*a* and the demand information 112*a* for which the matching is not established and which are recorded in the information recording unit 11 and are within the range of the information time limit of the supply information 111*a* and the information time limit 472 (see FIG. 14) of the demand information 112*a*, the supplier using the supplier terminal 2 and the consumer using the consumer terminal 3 transmit an instruction to end the matching based on the demand information 112*a* and the supply information 111*a*. When the matching unit 12 acquires the instruction, the matching unit 12 ends the matching based on the supply information 111a and the demand information 112a. However, when the matching unit 12 acquires the instruction to end the matching for only one of the supply information 111a and the demand information 112a for which the matching is established, the matching unit 12 cancels the matching, and uses the supply information 111a or the demand information 112a for which the instruction to end the matching is not acquired continuously for the matching with the other demand information 112a and supply information 111a.

Further, when the supply information 111a and the demand information 112a for which the matching is not established and which are recorded in the information recording unit 11 exceed the range of the information time limit 472 (see FIG. 14) of the demand information 112a and the information time limit of the supply information 111a, the matching unit 12 ends the matching processing based on the supply information 111a and the demand information 112a.

[Step S9. Start of Provision and Utilization of Service]

When the transaction is established by the result of the matching in step S8, the matching unit 12 excludes the supply information 111a and the demand information 112a for which the transaction is established from the matching objects. Then, the supplier using the supplier terminal 2 provides the service based on the supply information 111a for which the transaction is established or the article based on the supply information 111a, and the consumer using the consumer terminal 3 utilizes the service provided from the supplier or purchases or transfers the article or the like (step S9).

Here, when the transaction is established by the result of the matching, the supply information 111a and/or the demand information 112a related to the matching for which the transaction is established is sent from the matching unit 12 through the result transmission unit 14 to the schedule management unit 15. Then, the schedule management unit 15 incorporates the acquired supply information 111a and/or demand information 112a in the schedule information 111b and/or the schedule information 112b prepared or managed by the schedule management unit 15 itself, and prepares the schedule information 111b and/or the schedule information 112b. As a result, at the display unit 22 and/or the display unit 32 of the supplier terminal 2 and/or the consumer terminal 3, the supply information 111a and/or the demand information 112a for which the transaction is established as the result of the matching is displayed on the monthly schedule display screen (see FIG. 22) for displaying a monthly schedule, the weekly schedule display screen (see FIG. 11) for displaying a weekly schedule, or the daily schedule display screen (see FIG. 12) for displaying a daily schedule. For instance, on the daily schedule display screen 45 illustrated in FIG. 12, the information such as the name, location and contact or the like of the conference room for which the transaction is established (that is, a reservation is made) by being selected by the consumer from the consumer terminal 3 is displayed.

<Operation Procedure 2: The Case that Registration from the Consumer Terminal 3 is Performed First>

It is a procedure of starting the matching by registering the demand information 112a from the consumer terminal 3 in step S1 and registering the supply information 111a from the supplier terminal 2 in step S2.

This <operation procedure 2> is basically similar to <operation procedure 1> except that the order of the registration of the demand information 112a and the supply information 111a in step S1 and step S2 is opposite, the description will be given below in a simple manner.

That is, in the procedure illustrated in FIG. 4, first, the resource element information 112c which is the demand resource element is registered from the consumer terminal 3 to the matching support device 1, and the registration of the demand information 112a by that is performed (an arrow B1 in step S1). Next, the supply information 111a is registered by the supply request registration from the supplier terminal 2 to the matching support device 1 (an arrow B2 in step S2), and the trigger unit 13 makes the matching unit 12 perform the matching with the supply request registration as a trigger (step S3). The result transmission unit 14 transmits the matching result to the supplier terminal 2 and/or the consumer terminal 3 (step S3). The result transmission unit 14 prepares the sum-up information of the matching, and performs the transmission to the supplier terminal 2 as the "needs sum-up information" and/or the transmission to the consumer terminal 3 as the "recommendation sum-up information" (step S4). When acquiring the addition/updating/deletion request of the demand information 112a from the consumer terminal 3 or the addition/updating/deletion request of the supply information 111a from the supplier terminal 2 (step S5), the information recording unit 11, the matching unit 12 and the trigger unit 13 perform, with it as a trigger, the matching between the demand information 112a and the supply information 111a, the result transmission unit 14 transmits the matching result to the supplier terminal 2 and/or the consumer terminal 3, and the information recording unit 11 holds matching establishment information (step S6). The matching support device 1 repeats the procedures of steps S4-S6 (step S7). During the period of the information time limit of the supply information 111a or after the end of the period, or during the period of the information time limit 472 (see FIG. 14) of the demand information 112a or after the end of the period, the consumer uses the consumer terminal 3 and/or the supplier uses the supplier terminal 2 to indicate the intention of the transaction application or the intention of the application acceptance for the supply information 111a and/or the demand information 112a most adapted to his/her own needs from the held matching result information so that the transaction is established and the matching is ended (step S8), and the provision of the service and article or the like by the supplier using the supplier terminal 2 and the utilization of the service and the purchase of the article or the like by the consumer using the consumer terminal 3 are started (step S9).

As illustrated above, in the present embodiment, the matching unit 12 records, during the arbitrary period, the established matching information in the information recording unit 11, holds the established matching information, and continues the matching for at least one of the demand information 112a and the supply information 111a related to the established matching information, and the matching unit 12 performs processing assuming that the transaction is established for at least one of the demand information 112a and the supply information 111a, that is transmitted to at least one of the supplier terminal 2 and the consumer terminal 3 by the result transmission unit 14 during the arbitrary period or after the end of the arbitrary period, and selected by at least one of the supplier terminal 2 and the consumer terminal 3, and/or, at least one of the supplier using the supplier terminal 2 and the consumer using the consumer terminal 3, so that the supplier and the consumer can tentatively hold the demand information 112a and the supply information 111a for which the matching is established during the arbitrary period, and select the best one from the held demand information 112a and supply information 111a during the arbitrary period or after the end of the arbitrary period, and the transaction can be established for the demand information 112a and the supply information 111a selected by the supplier and the consumer. Thus, it is possible to provide the supplier and the consumer with an opportunity to select the best one from the services and the commodities or the like adapted to the condition of the matching and establish the traction.

In the present embodiment, the matching unit 12 ends the matching at the point of time when the matching is established even within the arbitrary period, thereby preventing the situation that the matching is performed again for the supply information 111a and the demand information 112a for which the matching is established and the information processing and the transaction are obstructed. Thus, it is possible to achieve the accurate information processing and transaction, and surely achieve the matching between the demand information 112a and the supply information 111a quickly and accurately reflecting the changes in the information.

In the present embodiment, the matching unit 12 ends the matching at the point of time of acquiring the instruction to end the matching from at least one of the supplier terminal 2 and the consumer terminal 3 even within the arbitrary period, thereby preventing the situation that the matching is performed again for the supply information 111a and the demand information 112a for which the matching is not desired by the supplier and the consumer of the services and the commodities and information processing and transaction are obstructed. Thus, it is possible to achieve the accurate information processing and transaction, and surely achieve the matching between the demand information 112a and the supply information 111a quickly and accurately reflecting the changes in the information.

In the present embodiment, the matching between the demand information 112a and the supply information 111a can be performed with the set arbitrary condition as a trigger. Also, the trigger unit 13, when at least one of the new supply information 111a, the new demand information 112a and the updating information which updates the already acquired supply information 111a and/or the already acquired demand information 112a is acquired from at least one of the supplier terminal 2 and the consumer terminal 3, makes the matching unit 12 perform the matching with at least one of the supply information 111a, the demand information 112a and the updating information as a trigger, so that the matching quickly reflecting the changes generated in the information transmitted from at least one of a supplier side and a consumer side is performed, and a quick transaction opportunity can be given to the supplier and the consumer who have provided the information. Also, by transmitting the result of the matching to at least one of the consumer terminal 3 and the supplier terminal 2 successively, a further transaction opportunity based on establishment or non-establishment of the matching can be quickly and accurately given to the consumer and the supplier.

In the present embodiment, the matching unit 12 sends the result of the matching to the schedule management unit 15, and the schedule management unit 15 prepares the schedule using the result of the matching, so that the schedule management of the consumer and the supplier and the matching are linked, and the schedule of the consumer and the supplier can be prepared using the result of the matching. Thus, it is possible to improve convenience when preparing the schedule on the basis of the result of the matching between the demand information 112a and the supply information 111a.

In the present embodiment, the matching unit 12 performs the matching on the basis of the request of the schedule management unit 15 so that it is made possible to perform the matching for the demand information 112a and the supply information 111a required in the process of preparing the schedule and establish the matching. In particular, when setting is such that the matching can be requested from a schedule preparation screen displayed at the consumer terminal 3 and the supplier terminal 2, the consumer and the supplier can request the matching between the demand information 112a and the supply information 111a to the matching support device 1 from the schedule preparation screen. Thus, it is possible to further improve the convenience when requesting the matching between the demand information 112a and the supply information 111a on the basis of schedule contents.

Also, in the embodiment, in step S1, the supply information 111a and/or the demand information 112a to be the matching object is generated and registered on the basis of the information transmitted from the supplier terminal 2 and/or the consumer terminal 3, registered as the resource element information 111c and/or the resource element information 112c and recorded in the information recording unit 11, however, the matching can be also performed on the basis of the supply information 111a and/or the demand information 112a which is transmitted from the supplier terminal 2 and/or the consumer terminal 3 (not as the resource element information 111c and/or the resource element information 112c but as the supply information 111a and/or the demand information 112a), and is not registered as the supply information 111a and/or the demand information 112a or recorded in the information recording unit 11. Also, in step S1, the matching can be performed on the basis of the information transmitted from the supplier terminal 2 and/or the consumer terminal 3 as the supply information 111a and/or the demand information 112a, registered as the supply information 111a and/or the demand information 112a and recorded in the information recording unit 11.

<Application 1>

The matching support system 1A and the matching support device 1 of the embodiment illustrate the case that the matching is performed between the supply information 111a registered from one terminal (the supplier terminal 2 of one supplier, or the supplier terminal 2 and the consumer terminal 3 of the one supplier and consumer) and the demand information 112a registered from one terminal (the consumer terminal 3 of one consumer, or the supplier terminal 2 and the consumer terminal 3 of the one supplier and consumer), and only the supplier or the supplier and the consumer using the one terminal (the supplier terminal 2 of one supplier, or the supplier terminal 2 and the consumer terminal 3 of the one supplier and consumer) and the consumer or the supplier and the consumer using the one terminal (the consumer terminal 3 of one consumer, or the supplier terminal 2 and the consumer terminal 3 of the one supplier and consumer) use the matching result. However, it is not limited to this case, and one matching result can be shared by the supplier terminal 2 and/or the consumer terminal 3 other than the supplier terminal 2 and/or the consumer terminal 3 for which the matching is performed.

For instance, a configuration may be such that, when the matching is established as a result of the matching (step S3) and a conference room is reserved, the result transmission unit 14 transmits the conference room reservation situation by the matching result to the consumer terminal 3 used by the consumer, or the supplier and the consumer (employees of the same company, for instance), or the supplier terminal 2 and the consumer terminal 3 used by the supplier and the consumer (employees of the same company, for instance) belonging to the same category as the consumer of the consumer terminal 3, or the supplier and the consumer of the supplier terminal 2 and the consumer terminal 3, using the matching support device 1. By such a configuration, the result of the matching is easily shared among the plurality of consumers and suppliers and the convenience of the consumer and the supplier can be improved.

<Application 2>

By utilizing the recommendation engine provided in the result transmission unit 14 of the matching support system 1A and the matching support device 1 of the embodiment, and transmitting the supply information 111*a* for which the matching is not established and/or the demand information 112*a* for which the matching is not established to the consumer terminal 3 and/or the supplier terminal 2, the possibility of establishing the matching can be increased.

For instance, in step S4, it is assumed that the supply information 111*a* which is not adapted to the condition as the result of the matching but has a close condition (for instance, the conference room for which the "location" is at a distance within a preset distance (500 m, for instance) from the "location" desired by the demand information 112*a* but the "nearest station" is at a location different from the "nearest station" desired by the demand information 112*a*) is recorded in the information recording unit 11. In this case, the result transmission unit 14 may transmit the supply information 111*a* to the consumer terminal 3, or the supplier terminal 2 and the consumer terminal 3 as "recommendation information" separately from the information of the matching establishment result. Similarly, the result transmission unit 14 may transmit the demand information 112*a* transmitted from the consumer terminal 3, or the supplier terminal 2 and the consumer terminal 3 as "reference information" separately from the result of the matching to the supplier terminal 2, or the supplier terminal 2 and the consumer terminal 3 which have transmitted the supply information 111*a* as well.

In such a manner, by transmitting at least one of the supply information 111*a* for which the matching is not established and the demand information 112*a* for which the matching is not established to the consumer terminal 3 and/or the supplier terminal 2, the result transmission unit 14 can report the contents of the services and the commodities for which the matching establishment is waited for at present and the desires of the consumers waiting for the matching establishment at present or the like to both of the consumer using the consumer terminal 3, or the supplier and the consumer using the supplier terminal 2 and the consumer terminal 3, who have has registered the demand information 112*a*, and the supplier using the supplier terminal 2, or the supplier and the consumer using the supplier terminal 2 and the consumer terminal 3, who have registered the supply information 111*a*, and accelerate the notification of the supply information 111*a* and the transmission of the supply information 111*a* according to the demand information 112*a*. Thus, the possibility of establishing the matching can be increased.

<Application 3>

By linking the matching unit 12 and the schedule management unit 15 of the matching support system 1A and the matching support device 1 of the embodiment, it is possible to determine not only a one-shot event but also the event that is periodically generated by the matching and prepare the schedule information 111*b* and/or the schedule information 112*b*.

FIG. 22 is a conceptual diagram of a state that the monthly schedule display screen 55 is displayed at the display unit 32 of the consumer terminal 3, in the matching support system 1A and the matching support device 1 of the present embodiment. In the figure, the display of the consumer terminal 3 itself and the display of various kinds of buttons are omitted. As illustrated in the figure, on the monthly schedule display screen 55, in addition to the one-shot events such as "trip to Hokkaido" and "ski", there exist, as the events that are periodically generated every week, a first periodical event 551 of "golf practice" on every Sunday and a second periodical event 552 of "grocery shopping" on every Saturday or the like, for instance.

By the request of the consumer from the consumer terminal 3, the schedule management unit 15 makes the matching in the matching unit 12 be performed not only for a first one-shot event 553 of "trip to Hokkaido" and a second one-shot event 554 of "ski" but also for the first periodical event 551 and the second periodical event 552, prepares the schedule using the transactions (that is, a reserved golf course and an online supermarket to make a purchase or the like) established on the basis of the result of the matching, and makes the prepared schedule be displayed on the monthly schedule display screen 55.

Here, for instance, in the case of the reservation of a golf course, the case that only a country club A can be reserved on a certain specific date (for instance, November 4 in FIG. 22) and only a country club B near the country club A can be reserved on another specific date (for instance, November 11 in FIG. 11), that is, the situation that a transaction establishment condition is different for each date and time, is possible to occur. Then, even in such a case that the transaction establishment condition is different for each date and time, the matching unit 12 is capable of transmitting the supply information 111*a* for which the transaction can be established to the consumer terminal 3, or the supplier terminal 2 and the consumer terminal 3 for every date and time to make the consumer, or the supplier and the consumer perform the transaction, or transmitting the demand information 112*a* for which the transaction can be established to the supplier terminal 2, or the supplier terminal 2 and the consumer terminal 3 for every date and time to make the supplier, or the supplier and the consumer perform the transaction. Thus, the convenience of the transaction of the schedule including the periodical events can be improved.

<Application 4>

In the matching support system 1A and the matching support device 1 of the embodiment, by generalizing two or more pieces of the demand information 112*a* and the supply information 111*a*, a highly convenient system can be provided for the plurality of consumers having similar demand elements and the plurality of suppliers having similar supply elements.

Specifically, for instance, the matching support system 1A and the matching support device 1 are capable of making the plurality of consumers, and/or the suppliers and the consumers having the similar demand elements, using the consumer terminal 3, or the supplier terminal 2 and the consumer terminal 3, know the presence of the similar demand elements with each other and gathering the demand elements, thereby establishing the individual demand elements as a group demand element.

Also, for instance, the matching support system 1A and the matching support device 1 are capable of making the plurality of suppliers, and/or the suppliers and the consumers having the similar supply elements, using the supplier terminal 2, or the supplier terminal 2 and the consumer terminal 3, know the presence of the similar supply elements with each other and gathering the supply elements, thereby establishing the individual supply elements as a group supply element.

By such a configuration, it becomes possible to gather the demand information 112a of the consumers, and/or the suppliers and the consumers with each other, and gather the supply information 111a of the suppliers, and/or the suppliers and the consumers with each other, and as a result, the condition with the high possibility of the establishment can be presented for the transaction whose condition is not agreed by the demand elements of the individual demand information 112a and the supply elements of the individual supply information 111a.

<Application 5>

The matching support system 1A and the matching support device 1 of the embodiment can provide various transaction opportunities to the supplier and the consumer using a behavior plan variable.

Here, the "behavior plan variable" is a variable indicating a schedule-to-result difference ratio calculated by a different comparison between the transaction plan of the consumer and the result of the transaction, and/or, a difference comparison between the transaction plan of the supplier and the result of the transaction, and plan reliability calculated on the basis of the schedule-to-result difference ratio.

An acquisition procedure of the behavior plan variable will be specifically described below.

First, the case of obtaining the behavior plan variable of the consumer is considered. In the matching support system 1A and the matching support device 1 of the embodiment, the matching unit 12 registers the information of the transaction plan inputted by the consumer from the consumer terminal 3 (for instance, the plan information of purchasing an arbitrary commodity or receiving the provision of an arbitrary service or the like) as a part of consumer side information 112, in [preliminary procedure 2. Prior registration] or the like for instance. For the information of the transaction plan, the entire transaction (for instance, the entire transaction of "purchasing the arbitrary commodity") may be a unit, or an individual element item configuring the entire transaction (for instance, the individual element item such as "purchase time period", "name of the commodity to be purchased", and "purchase quantity" configuring the transaction of "purchasing the arbitrary commodity") may be the unit. Also, for the information of the transaction plan inputted by the consumer, the matching unit 12 may make the schedule management unit 15 perform the processing of registering it as the schedule information 112b or the like, or the matching unit 12 may register it as the information different from the schedule information 112b or the like. Then, after the transaction is established in [step S8. Completion of matching], the matching unit 12 acquires the demand information 112a for the time when the transaction is established.

Then, the matching unit 12 compares the registered information of the transaction plan and the acquired demand information 112a, and confirms whether or not the information of the transaction plan and the information corresponding to the information of the transaction plan in the acquired demand information 112a (for instance, when the information of the transaction plan is the entire transaction, it is the corresponding entire transaction, and when the information of the transaction plan is the individual element item, it is the corresponding individual element item. It is called "corresponding information", hereinafter.) match.

When the information of the transaction plan and the corresponding information of the demand information 112a match, the matching unit 12 registers the corresponding information in a part of the consumer side information 112 assuming that the transaction is established on the basis of the transaction plan. On the basis of an arbitrary numerical value obtained on the basis of the information, the matching unit 12 performs arbitrary calculation (for instance, "the number of pieces of the corresponding information in the transaction established on the basis of the transaction plan"÷"the number of the transaction plans inputted from the consumer terminal 3" or the like), and calculates the schedule-to-result difference ratio. Then, the matching unit 12 defines the calculated schedule-to-result difference ratio as the behavior plan variable of the consumer. The matching unit 12 may calculate the schedule-to-result difference ratio and define it as the behavior plan variable of the consumer every time the transaction is established, or calculate the schedule-to-result difference ratio and define it as the behavior plan variable of the consumer for all of the plurality of transactions established in the arbitrary period in the past (that is, before an arbitrary point of time).

Next, the case of obtaining the behavior plan variable of the supplier is considered. In this case as well, the basic procedure is the same as the case of obtaining the behavior plan variable of the consumer. That is, in the matching support system 1A and the matching support device 1 of the embodiment, the matching unit 12 registers the information of the transaction plan inputted by the supplier from the supplier terminal 2 (for instance, the plan information of providing an arbitrary commodity or providing an arbitrary service or the like) as a part of supplier side information 111, in [preliminary procedure 2. Prior registration] or the like for instance. For the information of the transaction plan, the entire transaction (for instance, the entire transaction of "providing the arbitrary commodity") may be a unit, or an individual element item configuring the entire transaction (for instance, the individual element item such as "provision time period", "name of the commodity to be provided", and "provision quantity" configuring the entire transaction of "providing the arbitrary commodity") may be the unit. Also, for the information of the transaction plan inputted by the supplier, the matching unit 12 may make the schedule management unit 15 perform the processing of registering it as the schedule information 111b or the like, or the matching unit 12 may register it as the information different from the schedule information 111b or the like. Then, after the transaction is established in [step S8. Completion of matching], the matching unit 12 acquires the supply information 111a for the time when the transaction is established.

Then, the matching unit 12 compares the registered information of the transaction plan and the acquired supply information 111a, and confirms whether or not the information of the transaction plan and the information corresponding to the information of the transaction plan in the acquired supply information 111a match.

When the information of the transaction plan and the corresponding information of the supply information 111a match, the matching unit 12 registers the corresponding information in a part of the supplier side information 111 assuming that the transaction is established on the basis of the transaction plan. On the basis of an arbitrary numerical value obtained on the basis of the information, the matching unit 12 performs arbitrary calculation (for instance, "the number of pieces of the corresponding information in the transaction established on the basis of the transaction plan "÷" the number of the transaction plans inputted from the supplier terminal 2" or the like), and calculates the schedule-to-result difference ratio. Then, the matching unit 12 defines the calculated schedule-to-result difference ratio as the behavior plan variable of the supplier. The matching unit 12 may calculate the schedule-to-result difference ratio and define it as the behavior plan variable of the supplier every time the transaction is established, or calculate the schedule-to-result difference ratio and define it as the behavior plan variable of the supplier for all of the plurality of transactions established in the arbitrary period in the past (that is, before an arbitrary point of time).

By using the behavior plan variable obtained as described above, the matching support system 1A and the matching support device 1 of the embodiment can form statistical information for measuring reliability and a trend value of demand plan information in the future (that is, after the arbitrary point of time) of the consumer, and/or supply plan information in the future (that is, after the arbitrary point of time) of the supplier, and provide it for the supplier and the consumer. Also, the matching unit 12 can also form the statistical information including the information other than the behavior plan variable, for instance, an evaluation by a third person on the past transaction of the consumer and/or the past transaction of the supplier (for instance, a numerical value indicating the degree of reliability of the consumer, that is provided from the supplier who has performed various kinds of transactions including the transaction based on the matching with the consumer, or a numerical value indicating the degree of reliability of the supplier, that is provided from the consumer who has performed various kinds of transactions including the transaction based on the matching with the supplier, or the like).

Specifically, for instance, when displaying the demand information 112a registered from the consumer terminal 3 to the matching support device 1 by the consumer at the supplier terminal 2, the matching unit 12 is capable of displaying the behavior plan variable formed on the basis of the past transaction of the consumer together. Thus, the supplier using the supplier terminal 2 can obtain an index for determining the reliability of the transaction of the consumer (that is, an index to be a reference for determining how much of the possibility there is that the transaction is to be established when the matching is performed with the demand information 112a of the consumer).

Similarly, for instance, when displaying the supply information 111a registered from the supplier terminal 2 to the matching support device 1 by the supplier at the consumer terminal 3, the matching unit 12 is capable of displaying the behavior plan variable formed on the basis of the past transaction of the supplier together. Thus, the consumer using the consumer terminal 3 can obtain an index for determining the reliability of the transaction of the supplier (that is, an index to be a reference for determining how much of the possibility there is that the transaction is to be established when the matching is performed with the supply information 111a of the supplier).

Also, by utilizing the behavior plan variable as a segmentation variable in consumer purchase behavior analysis and segmentation analysis for analyzing the tendency and preference of the consumer and planning a strategy by the supplier, the accuracy and efficiency of the analysis can be improved.

While conventional predictive analysis in the consumer purchase behavior analysis and the segmentation analysis is the predictive analysis based on the past purchase result utilizing a behavior variable or the like, since the predictive analysis by the behavior plan variable is the predictive analysis based on the future purchase plan of the consumer himself/herself backed up by the plan reliability of each consumer derived from a difference between the past purchase plan and the purchase result of the consumer himself/herself, more accurate recognition of the consumer purchase behavior and segmentation with high accuracy are made possible.

In such a manner, by providing the consumer and the supplier with the statistical information using the behavior plan variable, the convenience when the consumer and the supplier make the transaction plan can be improved. That is, the predictive analysis with high accuracy and high probability is made possible on what kind of purchase and supply are to be actually performed for the transaction plans registered by the individual consumer and the individual supplier. Also, since the supplier can obtain the time period of the transaction and the tendency of the transaction of the consumer as prediction information with the plan reliability, formulation of a surer transaction plan and development plan or the like is made possible. Also, since the consumer can obtain the time period of the transaction and the tendency of the transaction of the supplier as the prediction information with the plan reliability, formulation of a surer transaction plan is made possible.

<Concrete Example of Utilization 1>

For instance, the case of use in real estate purchase and sale is considered. That is, it includes the case that a person who wants to buy a house (consumer) and a person who wants to sell a house (supplier) perform the matching using the matching support device 1 and perform the transaction or the like.

<Concrete Example of Utilization 2>

For instance, the case of use in job offer, job hunting and employment is considered. That is, it includes the case that a person who desires to look for a job (supplier) and an employer or an employing company (consumer) perform the matching using the matching support device 1 and secure an employer and an employee or the like.

<Concrete Example of Utilization 3>

For instance, the case of use in securing a vacant seat of a shop or means of transportation is considered. That is, it includes the case that a person who wants to reserve a vacant seat of a restaurant or a seat of an airplane (consumer) and the restaurant or an airline company perform the matching using the matching support device 1 and secure the vacant seat and the reservation or the like.

In the above embodiment, basically, in the procedures in [preliminary procedure 1. Menu screen display] to [preliminary procedure 3. Schedule registration to scheduler] and the procedures illustrated in [step S1 (arrow A1). Preparation/storage of information] to [step S9. Start of provision and utilization of service] or the like, the matching support device 1 automatically performs transmission and reception of the information to/from the supplier terminal 2 and the consumer terminal 3 and the processing of the information transmitted from the supplier terminal 2 and the consumer terminal 3. However, regardless of that, in the embodiment, for at least some of the procedures indicated above, an operator who manages and operates the matching support device 1 can transmit and receive the information by oral communication by a telephone or the like or communication means of FAX or mail or the like from the supplier and the consumer, input the acquired information to the matching support device 1 by a manual operation, and perform the processing of the acquired information or the like by the manual operation.

The above embodiment is an exemplification of the present invention, and the present invention is of course not limited to the above embodiment.

INDUSTRIAL APPLICABILITY

The matching support system 1A and the matching support device 1 of the embodiment are used in various fields with the need of performing the matching between the demand information 112a and the supply information 111a for the services and the articles or the like. For instance, in a so-called B-to-B field, human resource matching, the matching of a rental conference room or a rental seminar site or the like, and the matching of business and solutions are considered. Also, in a so-called B-to-C field, applications to the matching of a restaurant or a bar or the like, the matching of a beauty parlor, the matching of a hotel, a Japanese-style hotel, or a tour company or the like, the matching of rental properties or a remodeling contractor or the like, and the matching of an EC site for shopping or the like are considered. Further, in a so-called C-to-C field, applications to an auction and a reverse auction in purchase and sale of used articles between individuals or the like are considered.

REFERENCE SIGNS LIST

1A . . . Matching support system
1 . . . Matching support device
2, 2₁, . . . , 2ₙ . . . Supplier terminal
3, 3₁, . . . , 3ₘ . . . Consumer terminal
11 . . . Information recording unit (information recording means)
12 . . . Matching unit (matching means)
13 . . . Trigger unit (trigger means)
14 . . . Result transmission unit (result transmission means)
15 . . . Schedule management unit (schedule management means)
111a . . . Supply information
112a . . . Demand information

The invention claimed is:

1. A matching support device formed communicably between a supplier terminal used by a supplier and a consumer terminal used by a consumer, the matching support device comprising:
    one or more processors; and
    one or more memories,
    wherein the one or more memories are configured to store:
        resource information indicating a matching requirement by a supplier and a consumer; and
        supply information about a service or an article to be supplied sent from the supplier terminal and/or demand information about a service or an article that is demanded sent from the consumer terminal,
    the one or more processors are configured to:
        perform a matching, upon receiving supply information or demand information, between the supply information or the demand information that is newly received and the demand information or the supply information that is already stored in the one or more memories, and
        when the matching is established between a supply information and a demand information, send a matching result to:
            a first supplier terminal of a first supplier and a first consumer terminal of a first consumer that sent the supply information and the demand information between which the matching is established; and
            a supplier terminal, other than the first supplier terminal, of a supplier that provides a resource information including a same matching requirement as a matching requirement that is provided by the first supplier, for which the matching is not performed, and/or a consumer terminal, other than the first consumer terminal, of a consumer that provides a resource information including a same matching requirement as a matching requirement that is provided by the first consumer, for which the matching is not performed.

2. The matching support device according to claim 1,
wherein the resource information includes a category of a supplier and/or a consumer, and
the one or more processors are further configured to send the matching result to a supplier terminal of a supplier that belongs to a same category of the first supplier and/or a consumer terminal of a consumer that belongs to a same category of the first consumer.

3. The matching support device according to claim 1,
wherein the one or more processors are further configured to:
generate a supplier group from among a plurality of suppliers and/or a consumer group from among a plurality of consumers, by grouping suppliers and/or consumers to which the matching result is sent such that group supply information of an entirety of the supplier group and/or group consumer information of an entirety of the consumer group is generated, and
perform a matching based on the group supply information and the group consumer information.

4. The matching support device according to claim 1,
wherein the one or more processors are further configured to, when a matching between a demand information and a supply information is established, store a matching result thereof in the one or more memories, and further perform a matching based at least one of a demand information and a supply information in relation to the matching result, and
the one or more processors are further configured to determine that a matching is established on at least one of the demand information and the supply information that is sent to at least one of the supplier terminal and the consumer terminal and selected by at least one of the supplier terminal and the consumer terminal and/or at least one of a supplier using the supplier terminal and a consumer using the consumer terminal.

5. The matching support device according to claim 1,
wherein the one or more processors are further configured to terminate a matching when an instruction to terminate the matching is received from at least one of the supplier terminal and the consumer terminal.

6. The matching support device according to claim 1,
wherein the one or more processors are further configured to:
initiate a matching when at least one of a supply information that is newly received, a demand information that is newly received, a supply information that is newly received, and an update information to update a supply information that is already received and a supply information that is already received, from at least one of the supplier terminal and the consumer terminal; and send a matching result to at least one of the consumer terminal and the supplier terminal.

7. The matching support device according to claim 1, wherein the one or more processors are further configured to send at least one of a supply information on which a matching is not established and a demand information on which a matching is not established to at least one of the consumer terminal and the supplier terminal.

8. The matching support device according to claim 1, wherein the one or more processors are further configured to generate and manage a schedule for at least one of the consumer and the supplier based on the matching result.

9. The matching support device according to claim 8, wherein the one or more processors are further configured to perform a matching based on the schedule.

10. A matching support method performed by a computer formed communicably between a supplier terminal used by a supplier and a consumer terminal used by a consumer, wherein the computer comprising:
   one or more processors; and
   one or more memories,
   wherein the one or more memories are configured to store:
      resource information indicating a matching requirement by a supplier and a consumer; and
      supply information about a service or an article to be supplied sent from the supplier terminal and/or demand information about a service or an article that is demanded sent from the consumer terminal,
   the matching support method comprising:
   performing, by the one or more processors, a matching, upon receiving supply information or demand information, between the supply information or the demand information that is newly received and the demand information or the supply information that is already stored in the one or more memories, and
   when the matching is established between a supply information and a demand information, sending a matching result to:
   a first supplier terminal of a first supplier and a first consumer terminal of a first consumer that sent the supply information and the demand information between which the matching is established; and
   a supplier terminal, other than the first supplier terminal, of a supplier that provides a resource information including a same matching requirement as a matching requirement that is provided by the first supplier, for which the matching is not performed, and/or a consumer terminal, other than the first consumer terminal, of a consumer that provides a resource information including a same matching requirement as a matching requirement that is provided by the first consumer, for which the matching is not performed.

11. A computer program product comprising a non-transitory storage medium that stores a program allowing one or more processors of a computer formed communicably between a supplier terminal used by a supplier and a consumer terminal used by a consumer to perform a matching support method,
   wherein the computer being capable of accessing one or more memories, and
   the one or more memories are configured to store:
      resource information indicating a matching requirement by a supplier and a consumer; and
      supply information about a service or an article to be supplied sent from the supplier terminal and/or demand information about a service or an article that is demanded sent from the consumer terminal,
   the program allows the one or more processors to:
   perform a matching, upon receiving supply information or demand information, between the supply information or the demand information that is newly received and the demand information or the supply information that is already stored in the one or more memories, and
   when the matching is established between a supply information and a demand information, send a matching result to:
   a first supplier terminal of a first supplier and a first consumer terminal of a first consumer that sent the supply information and the demand information between which the matching is established; and
   a supplier terminal, other than the first supplier terminal, of a supplier that provides a resource information including a same matching requirement as a matching requirement that is provided by the first supplier, for which the matching is not performed, and/or a consumer terminal, other than the first consumer terminal, of a consumer that provides a resource information including a same matching requirement as a matching requirement that is provided by the first consumer, for which the matching is not performed.

* * * * *